Feb. 28, 1956  G. C. ELLERBECK  2,736,493
SQUARE ROOT CALCULATING MACHINE
Filed Aug. 31, 1951  21 Sheets-Sheet 1
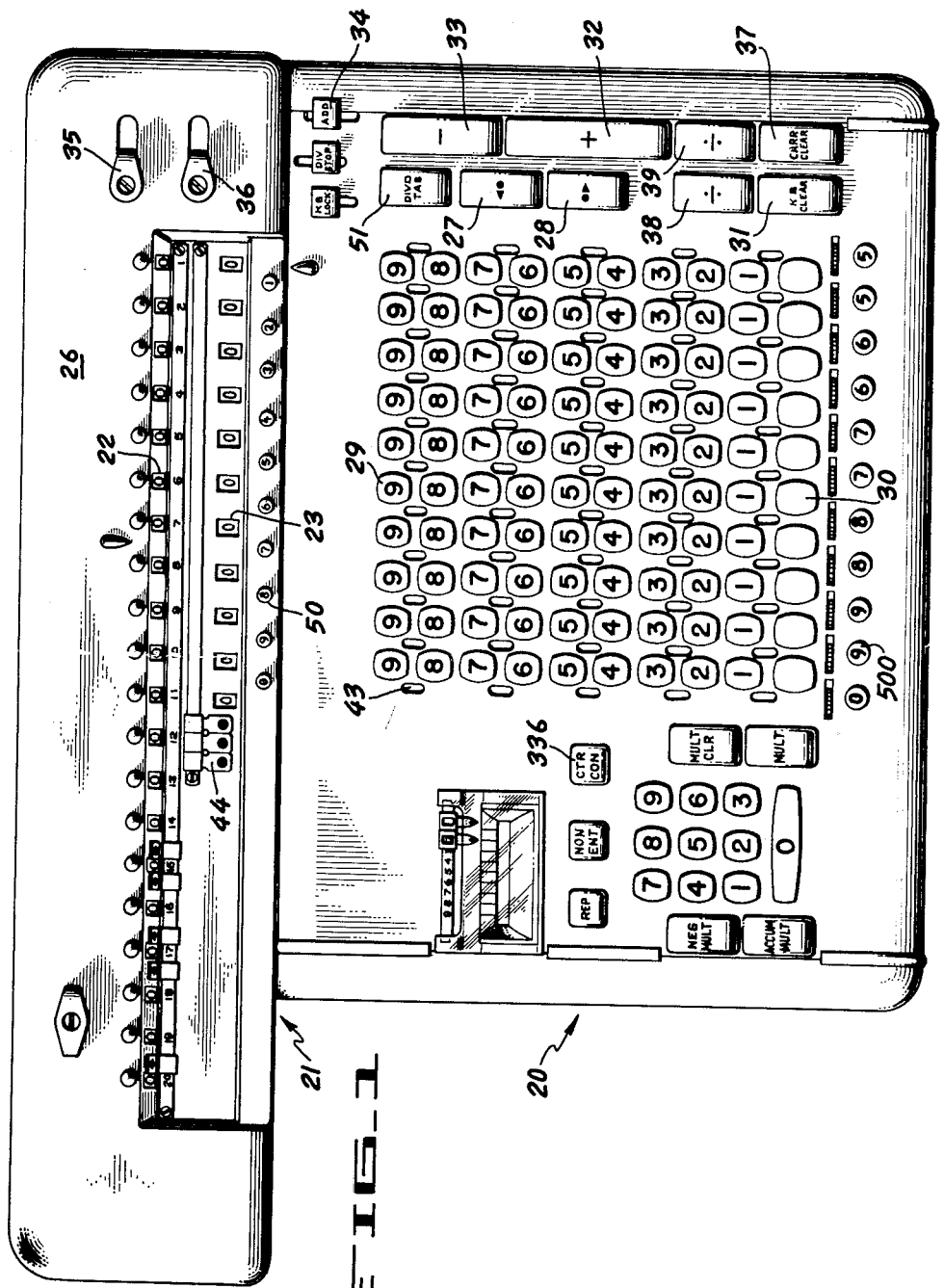
GRANT C. ELLERBECK
INVENTOR
BY
ATTORNEY Feb. 28, 1956 G. C. ELLERBECK 2,736,493
SQUARE ROOT CALCULATING MACHINE
Filed Aug. 31, 1951 21 Sheets-Sheet 2
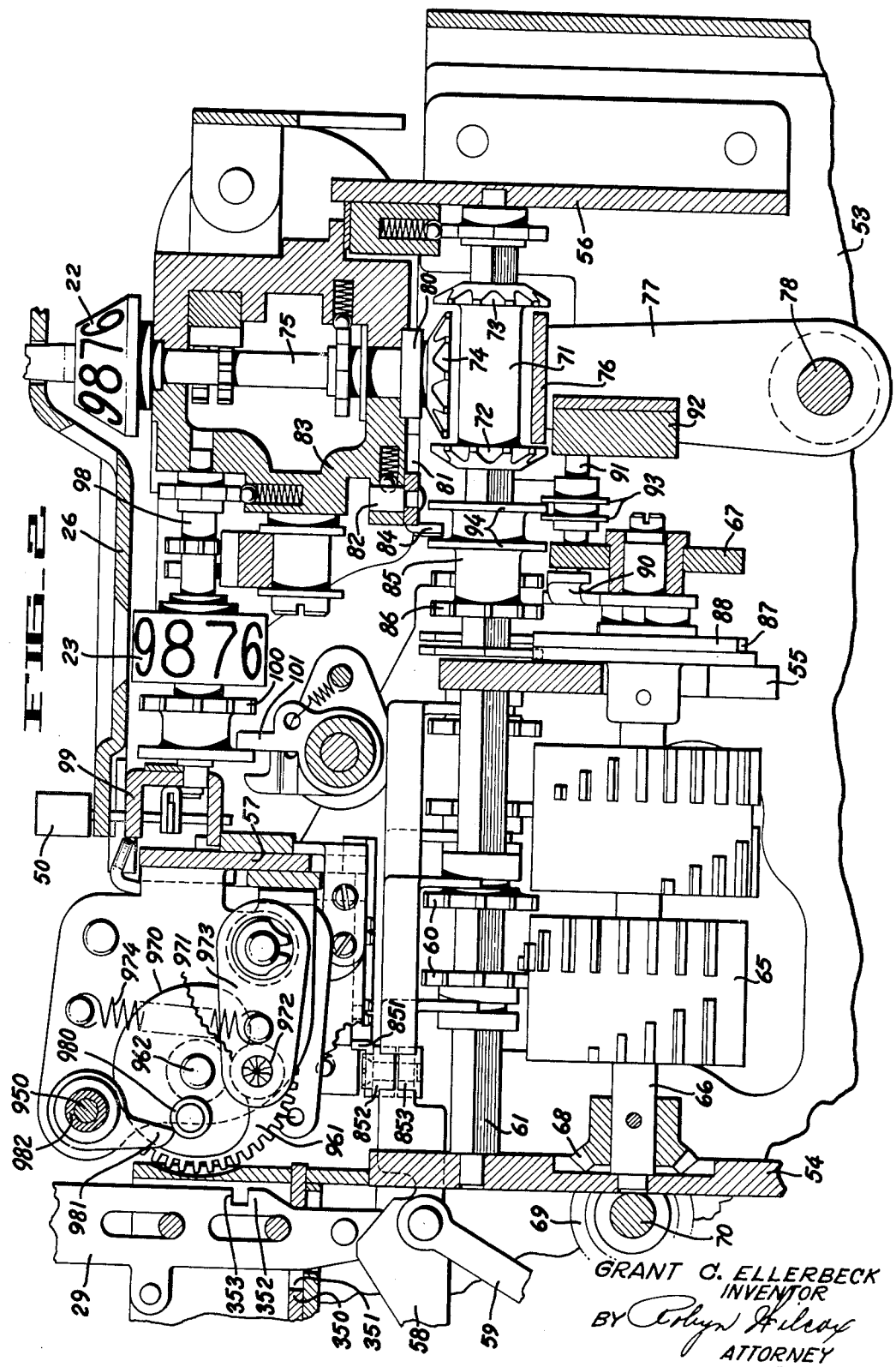
GRANT C. ELLERBECK
INVENTOR
BY
ATTORNEY

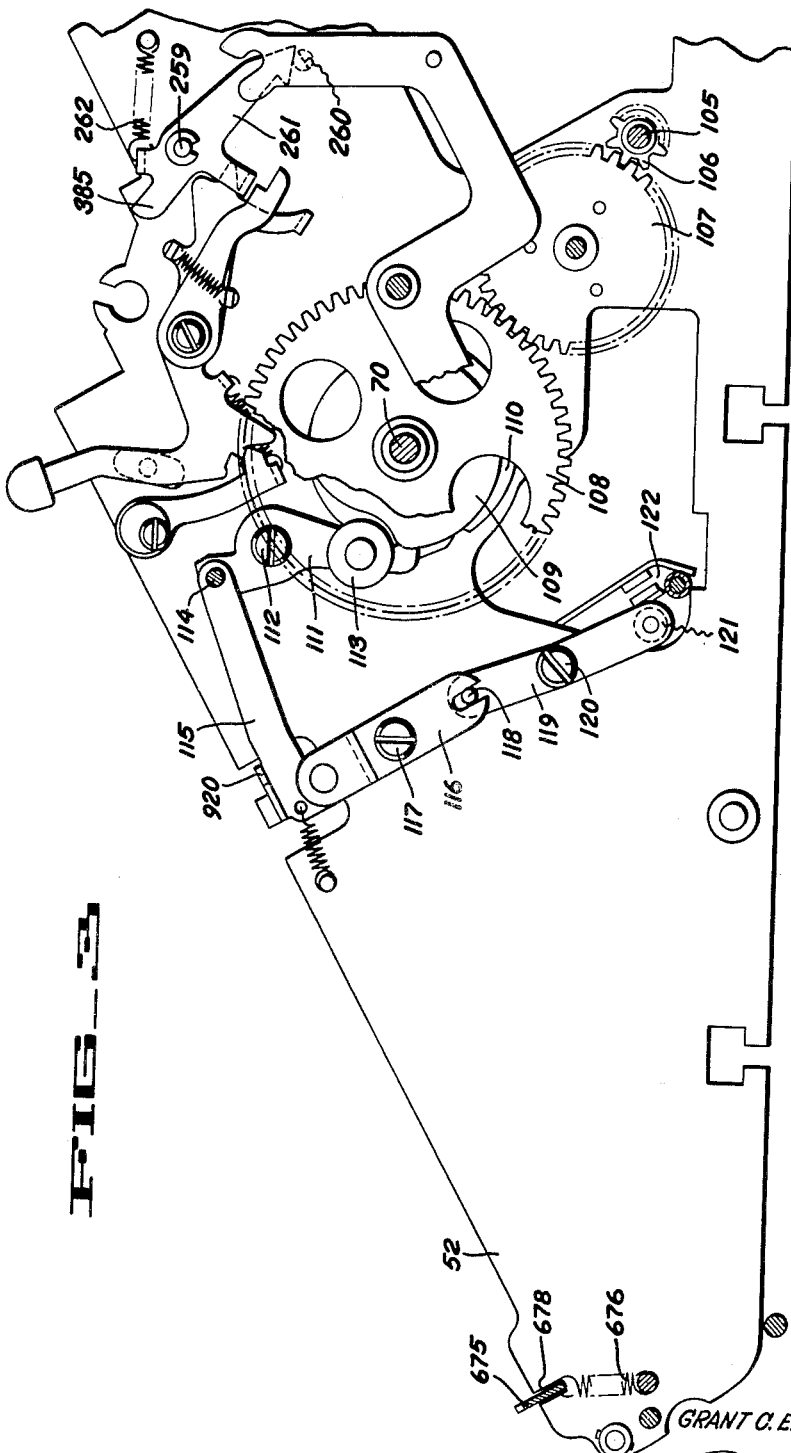

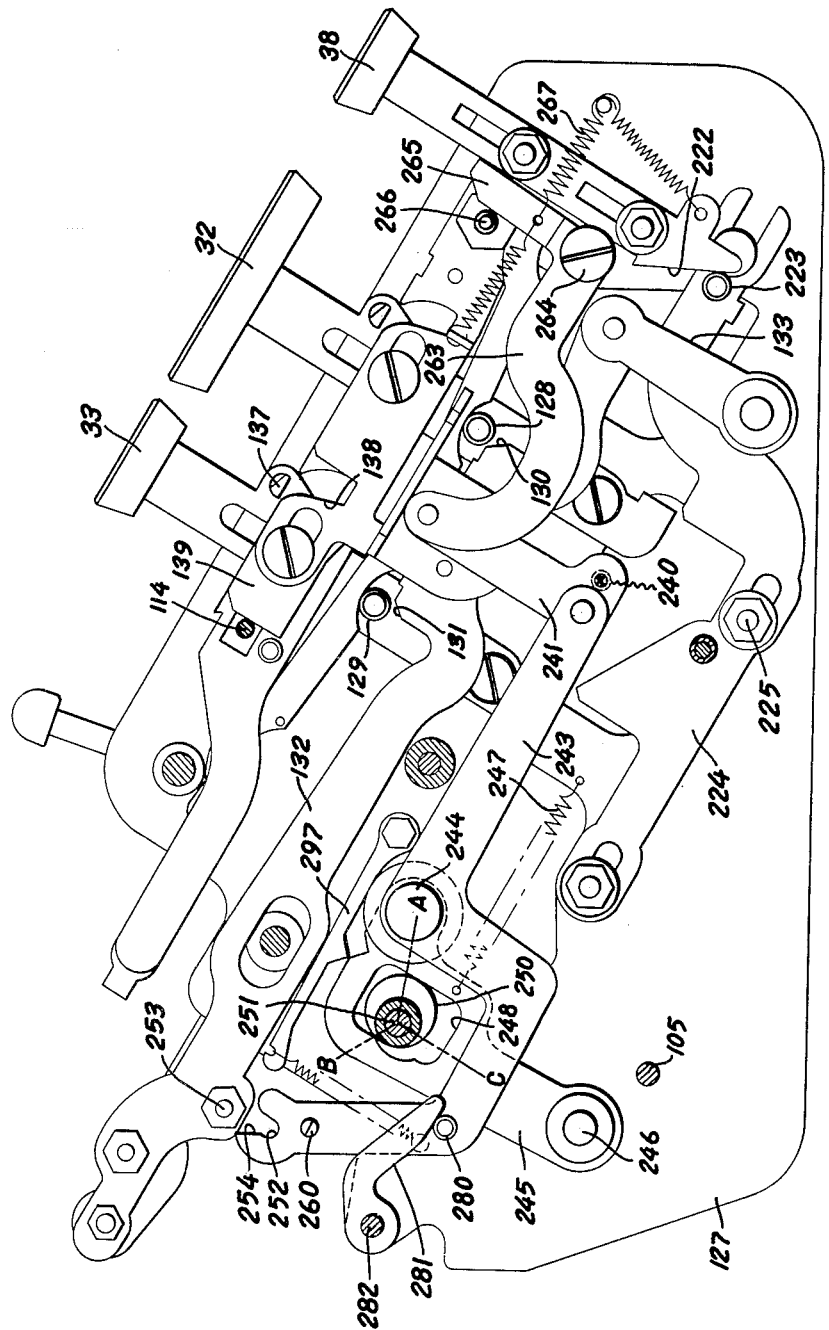

Feb. 28, 1956 G. C. ELLERBECK 2,736,493
SQUARE ROOT CALCULATING MACHINE
Filed Aug. 31, 1951 21 Sheets-Sheet 5
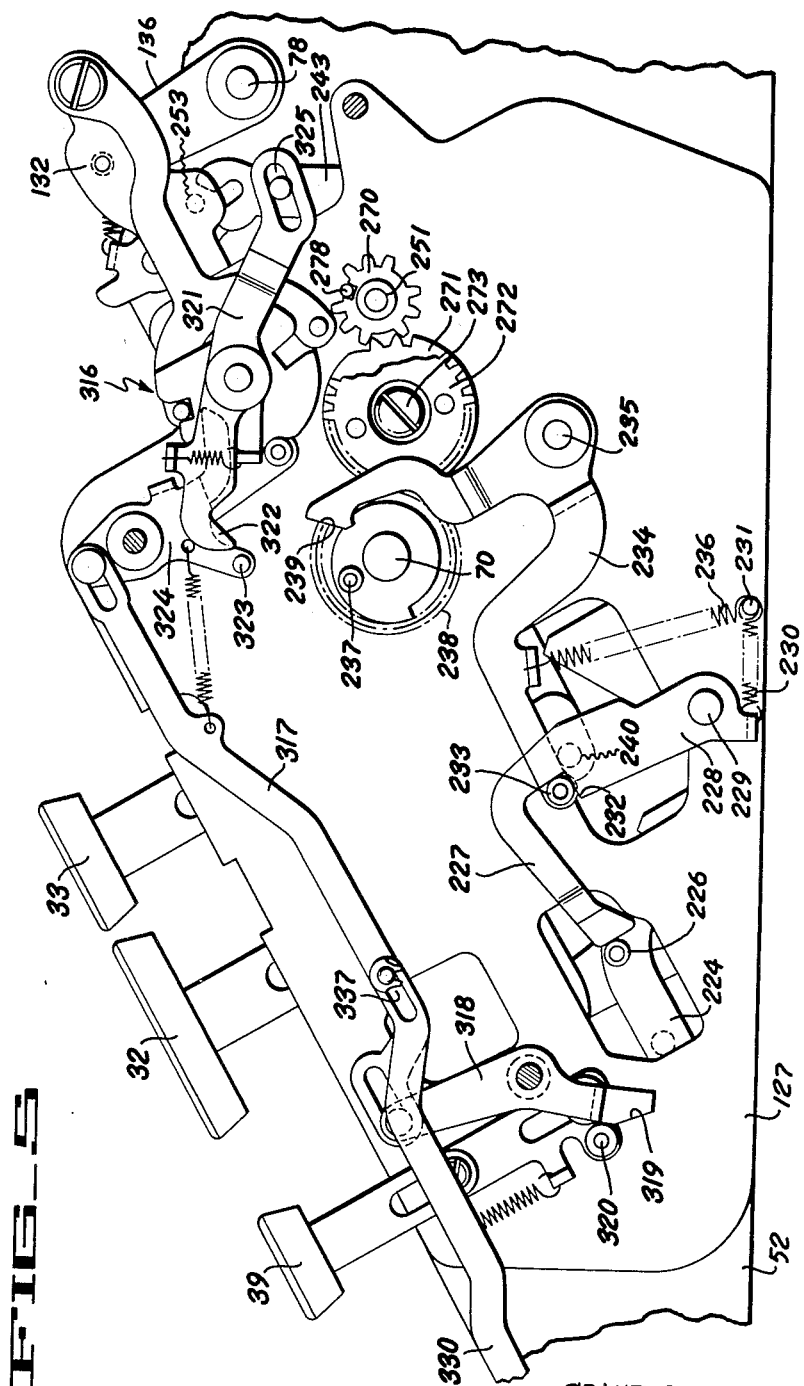
GRANT C. ELLERBECK
INVENTOR
BY Robyn Hilcox
ATTORNEY

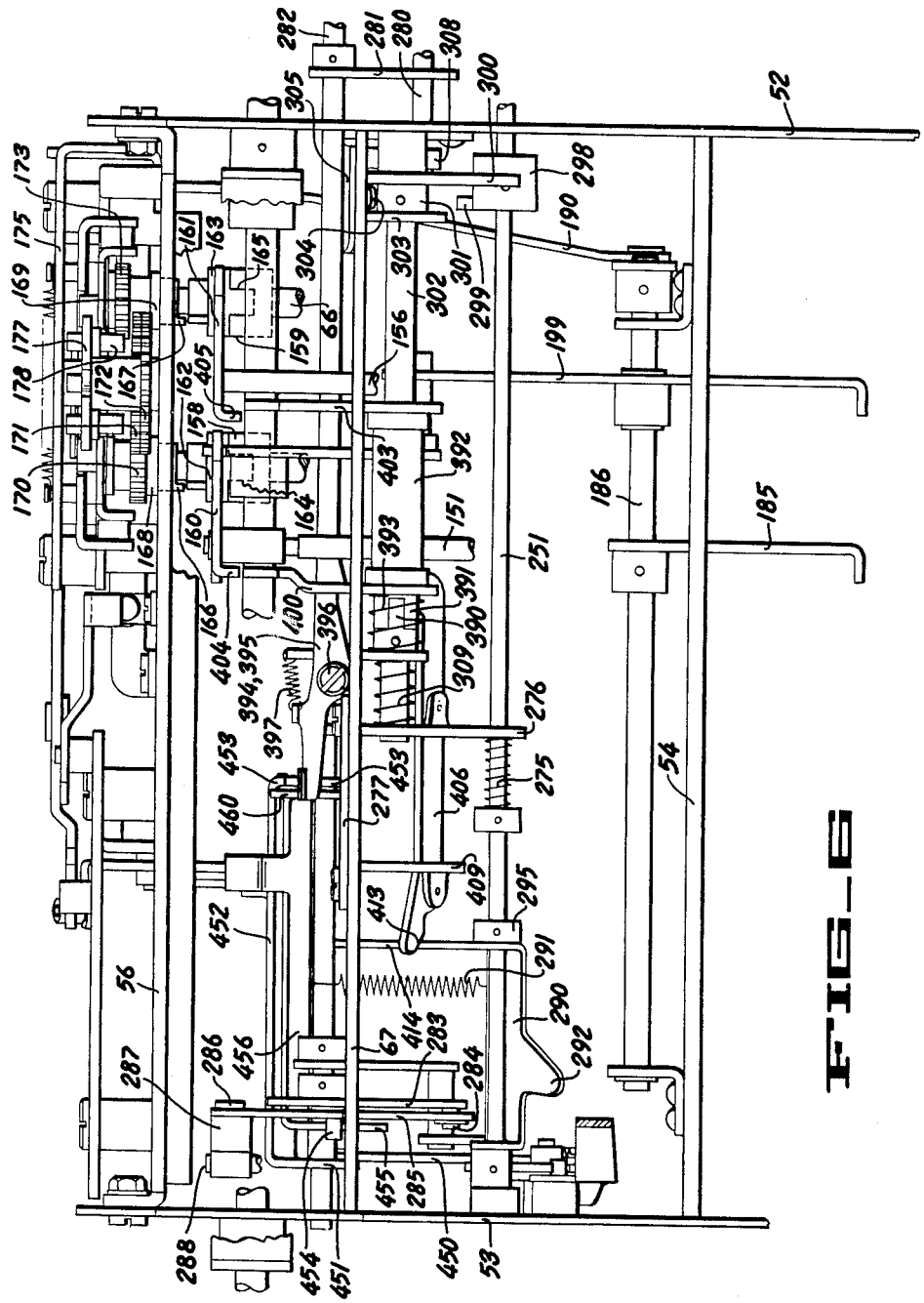
FIG_6

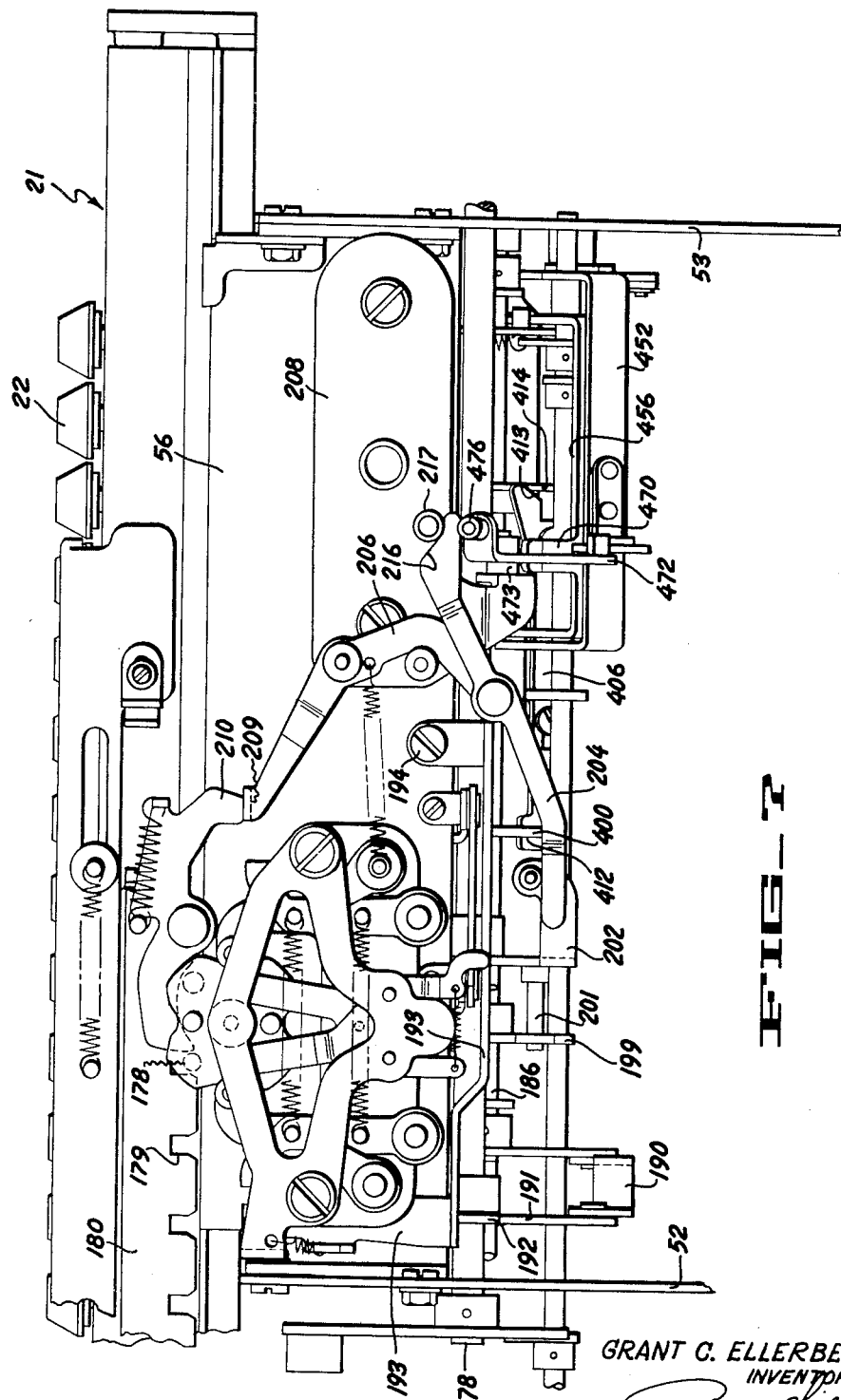

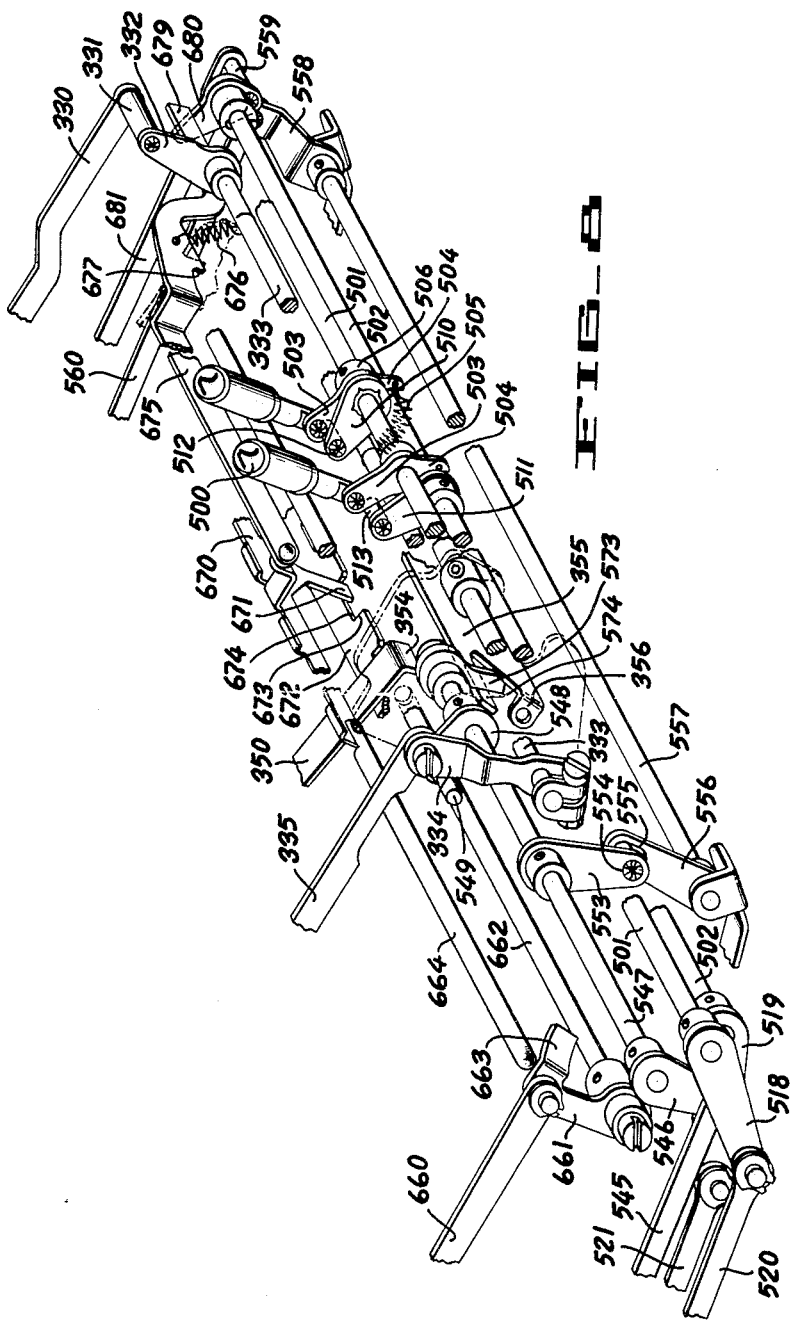

Feb. 28, 1956  G. C. ELLERBECK  2,736,493
SQUARE ROOT CALCULATING MACHINE
Filed Aug. 31, 1951  21 Sheets-Sheet 9
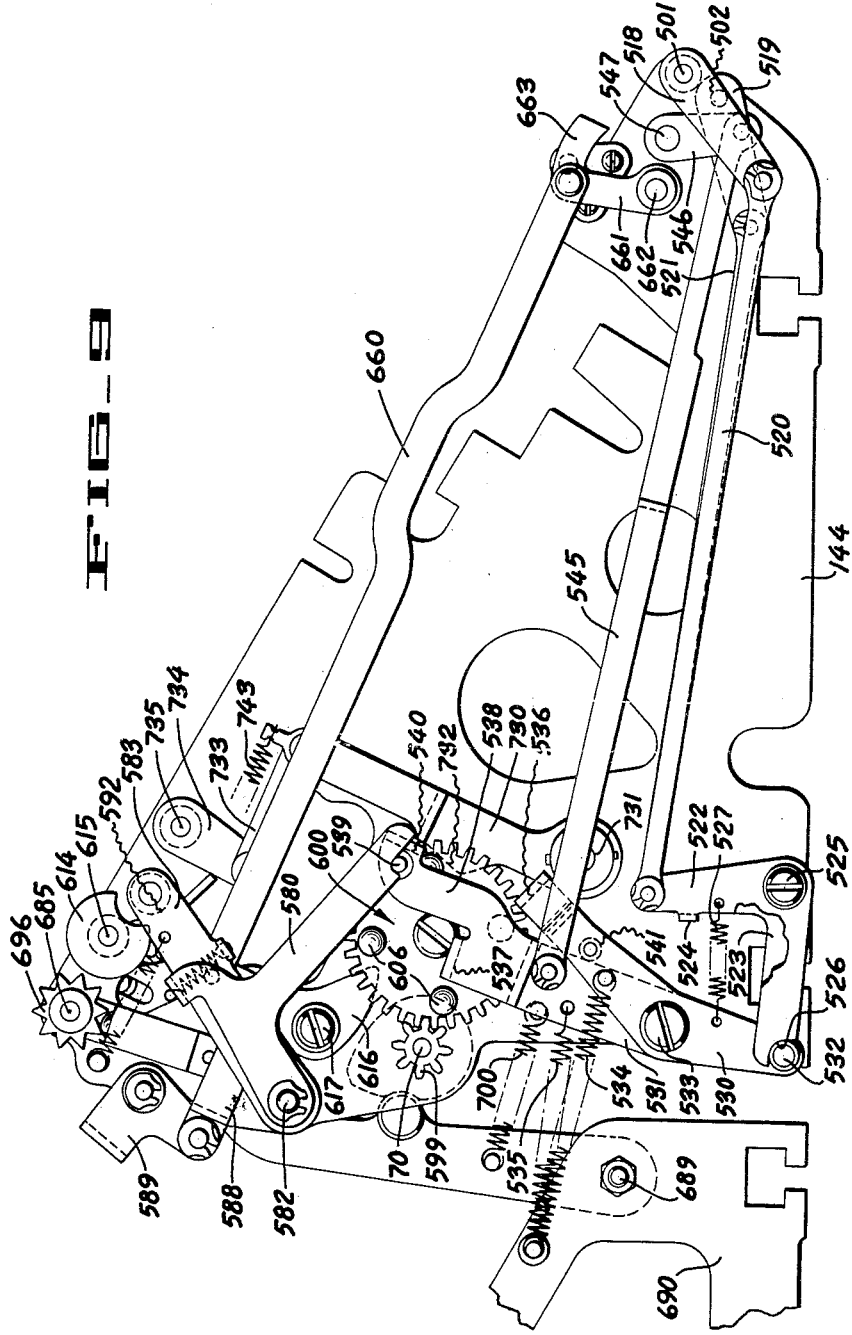
GRANT C. ELLERBECK
INVENTOR
BY Robyn Hilcox
ATTORNEY

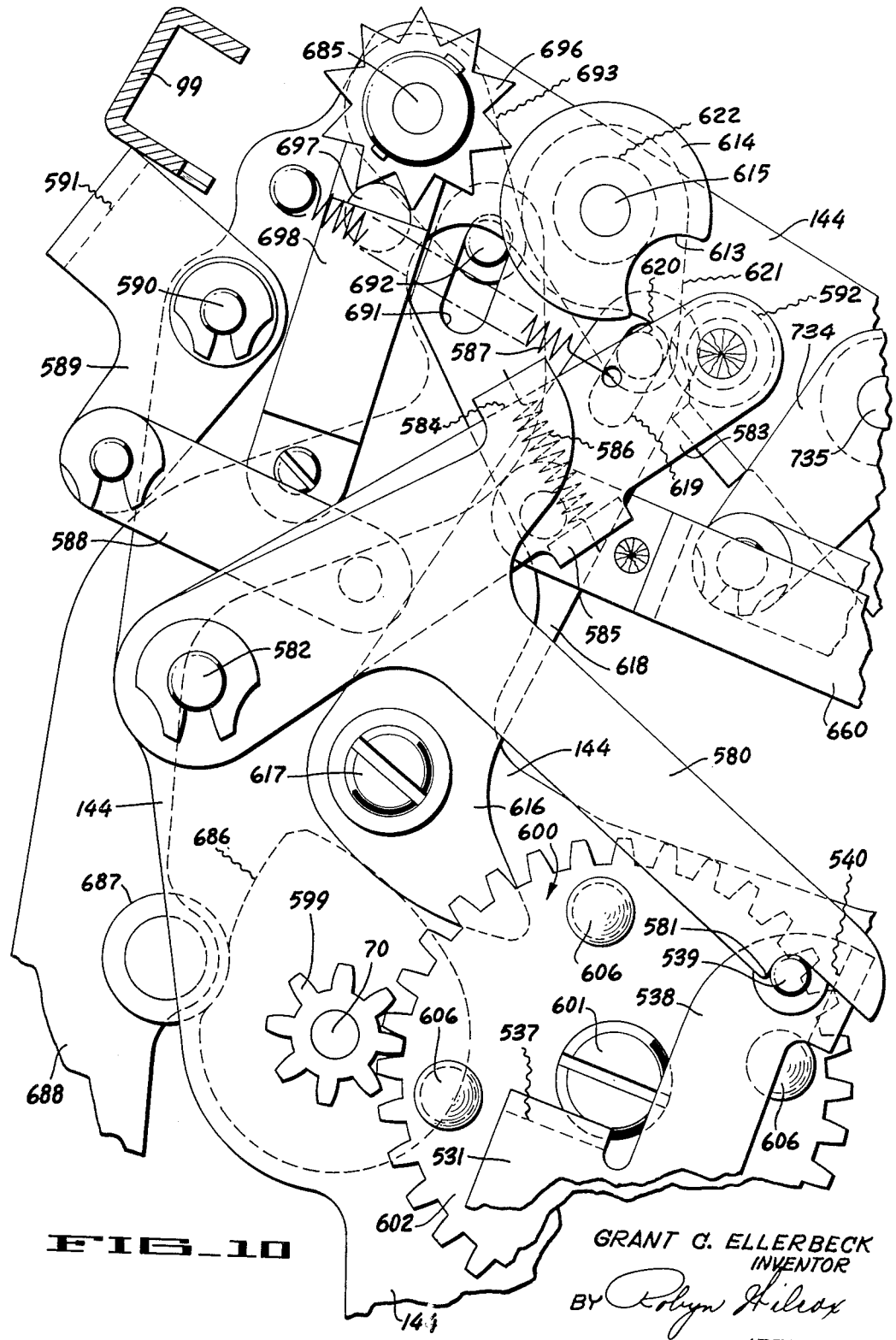

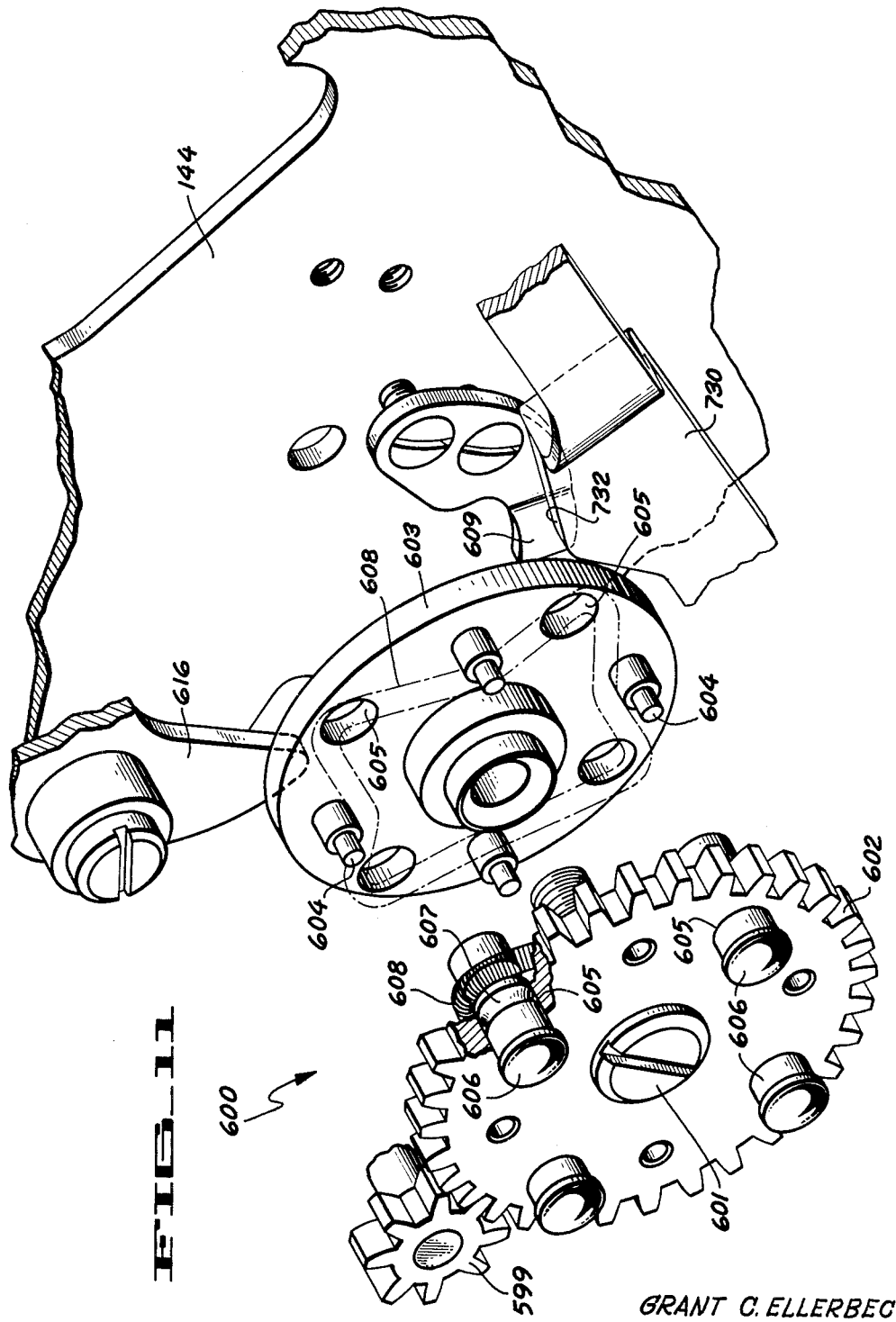

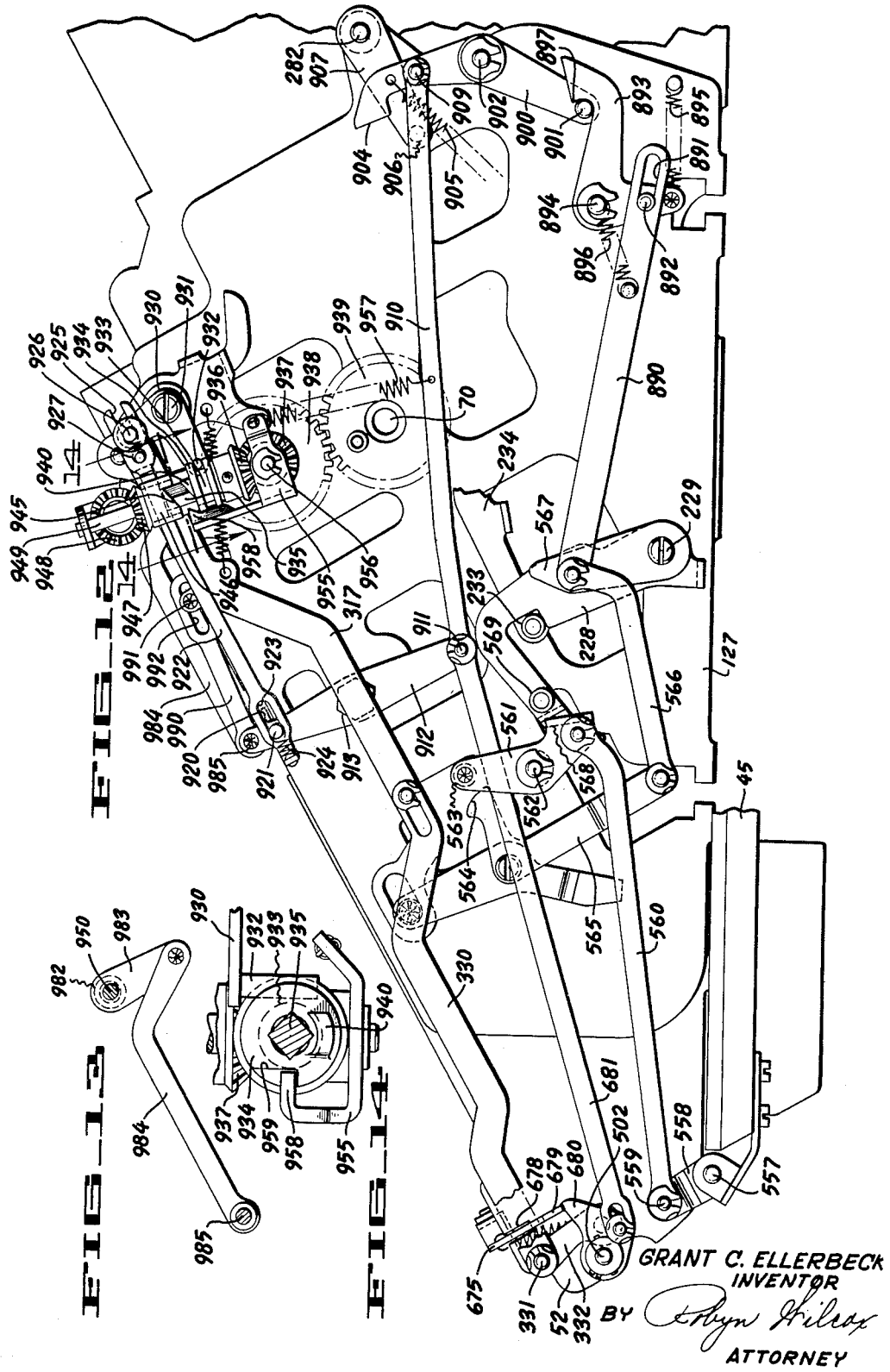

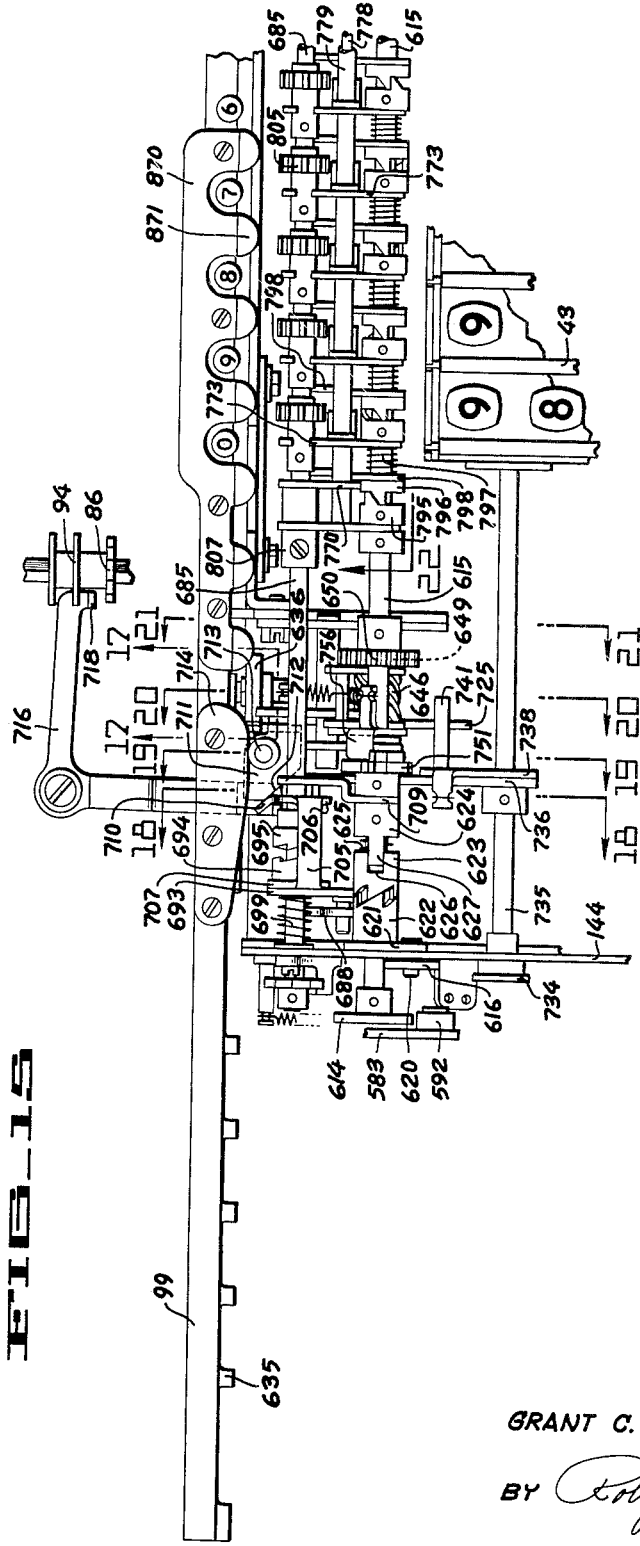

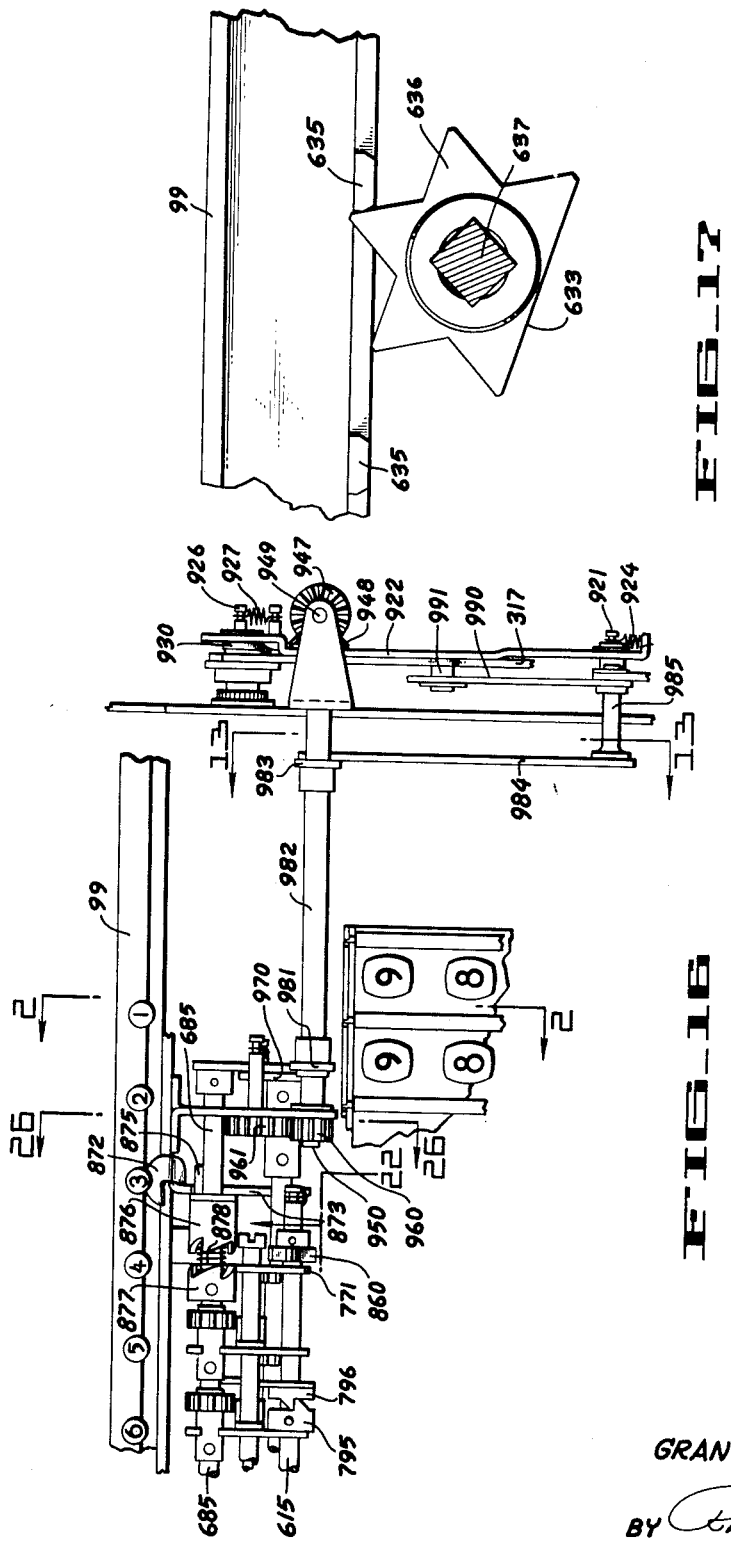

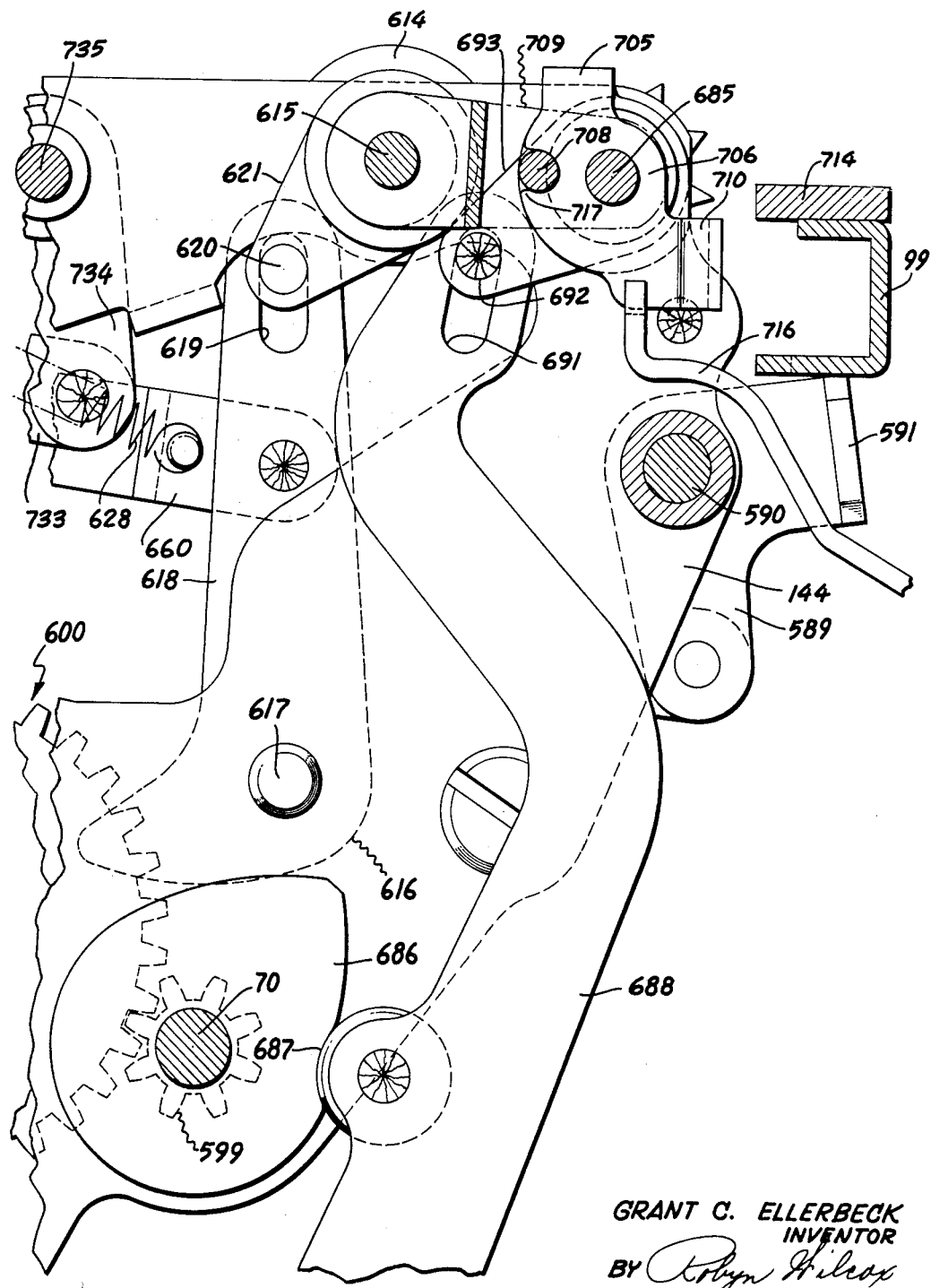

Feb. 28, 1956 G. C. ELLERBECK 2,736,493
SQUARE ROOT CALCULATING MACHINE
Filed Aug. 31, 1951 21 Sheets-Sheet 16
FIG_19
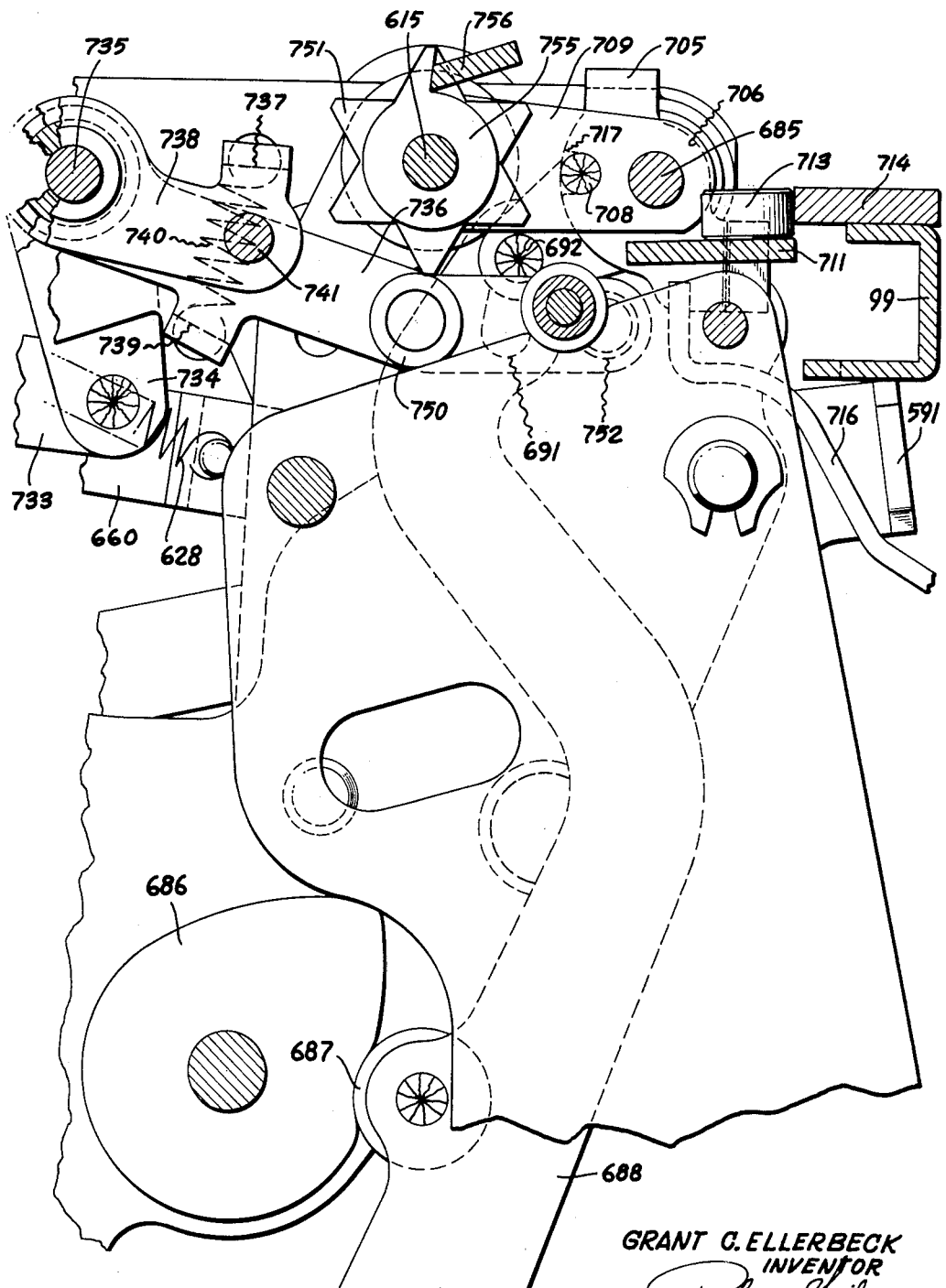
GRANT C. ELLERBECK
INVENTOR
BY Robyn Hilcox
ATTORNEY

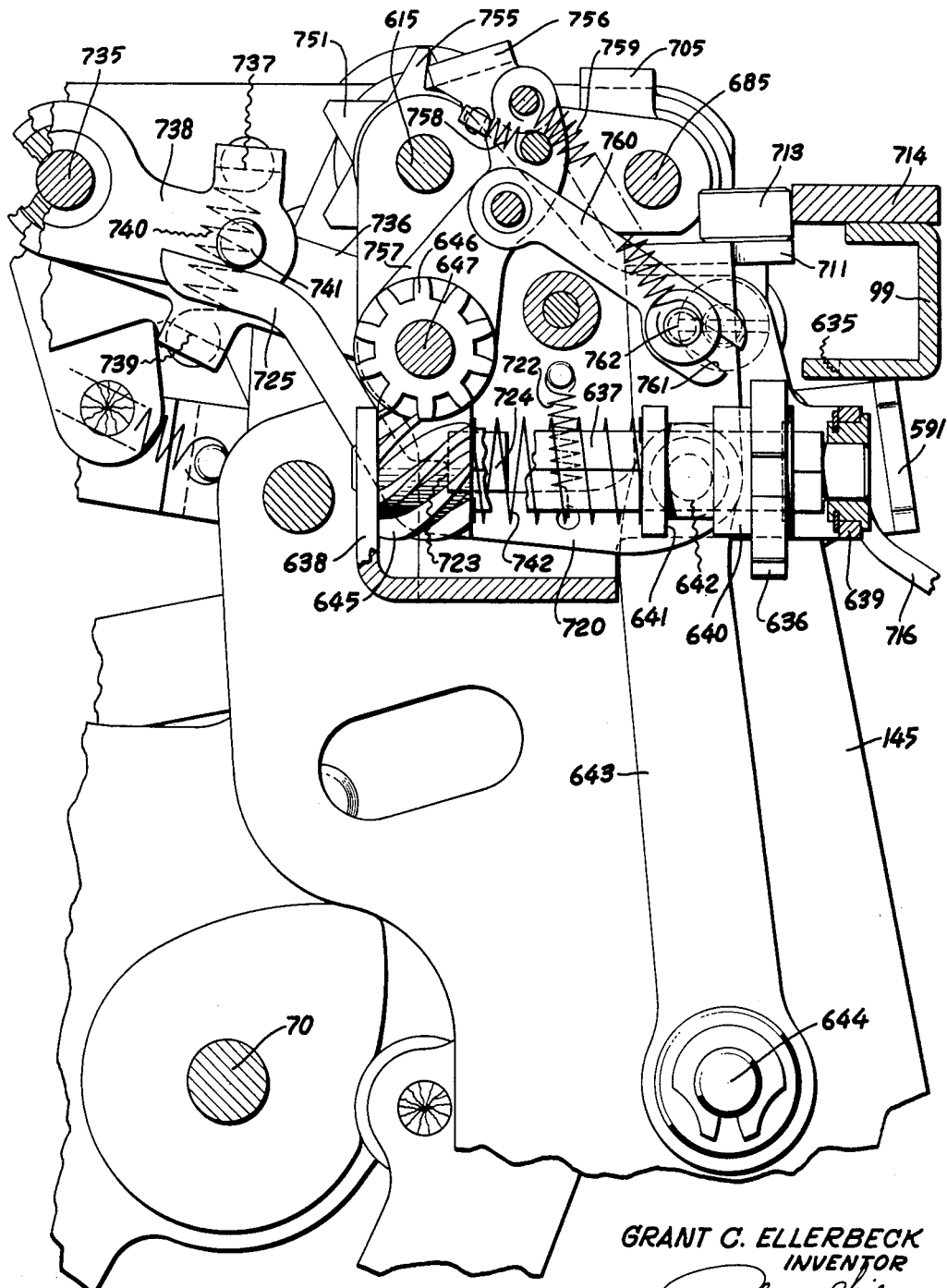

Feb. 28, 1956 G. C. ELLERBECK 2,736,493
SQUARE ROOT CALCULATING MACHINE
Filed Aug. 31, 1951 21 Sheets-Sheet 18
FIG_21
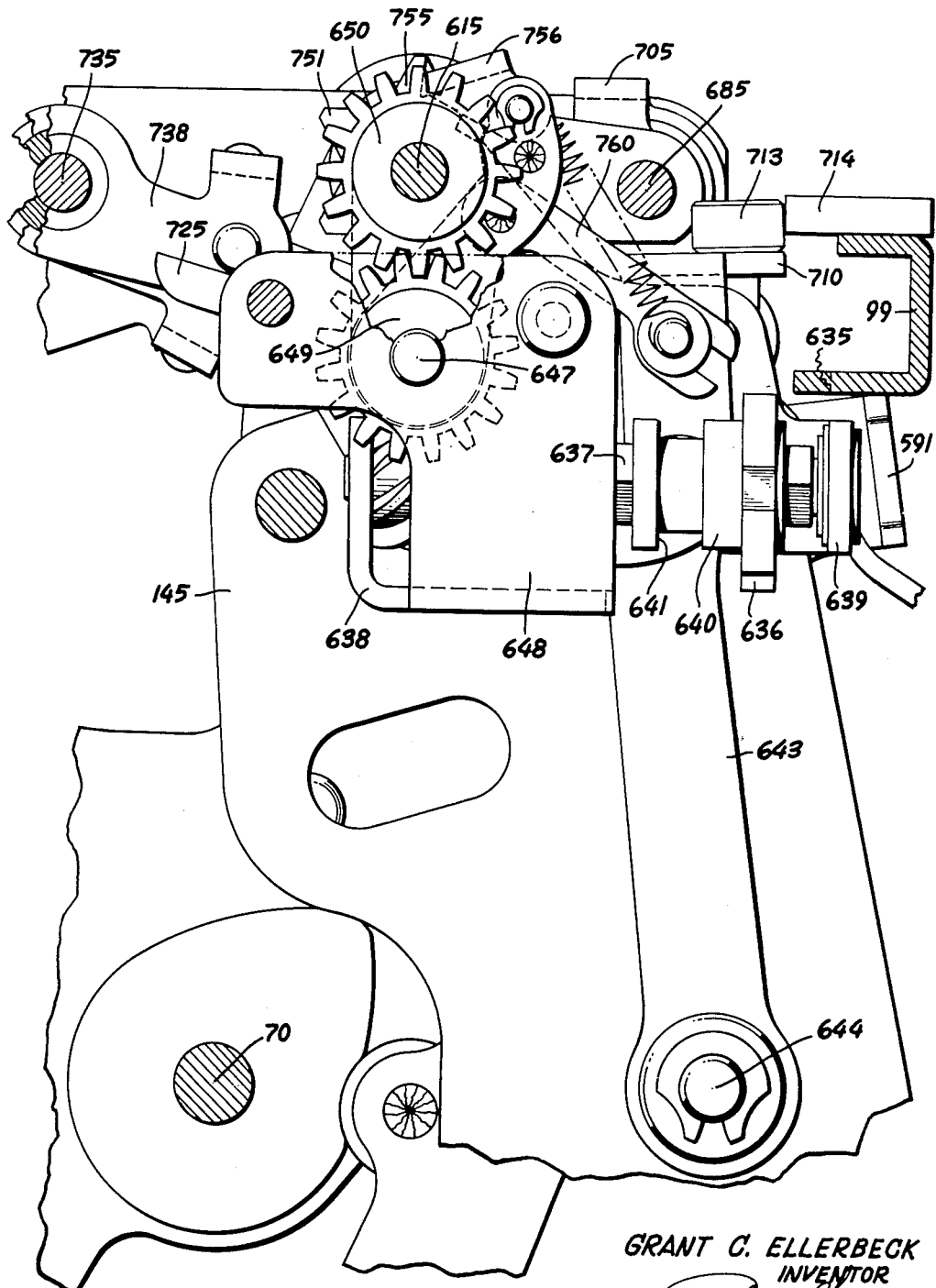
GRANT C. ELLERBECK
INVENTOR
BY *Arlyn Wilcox*
ATTORNEY

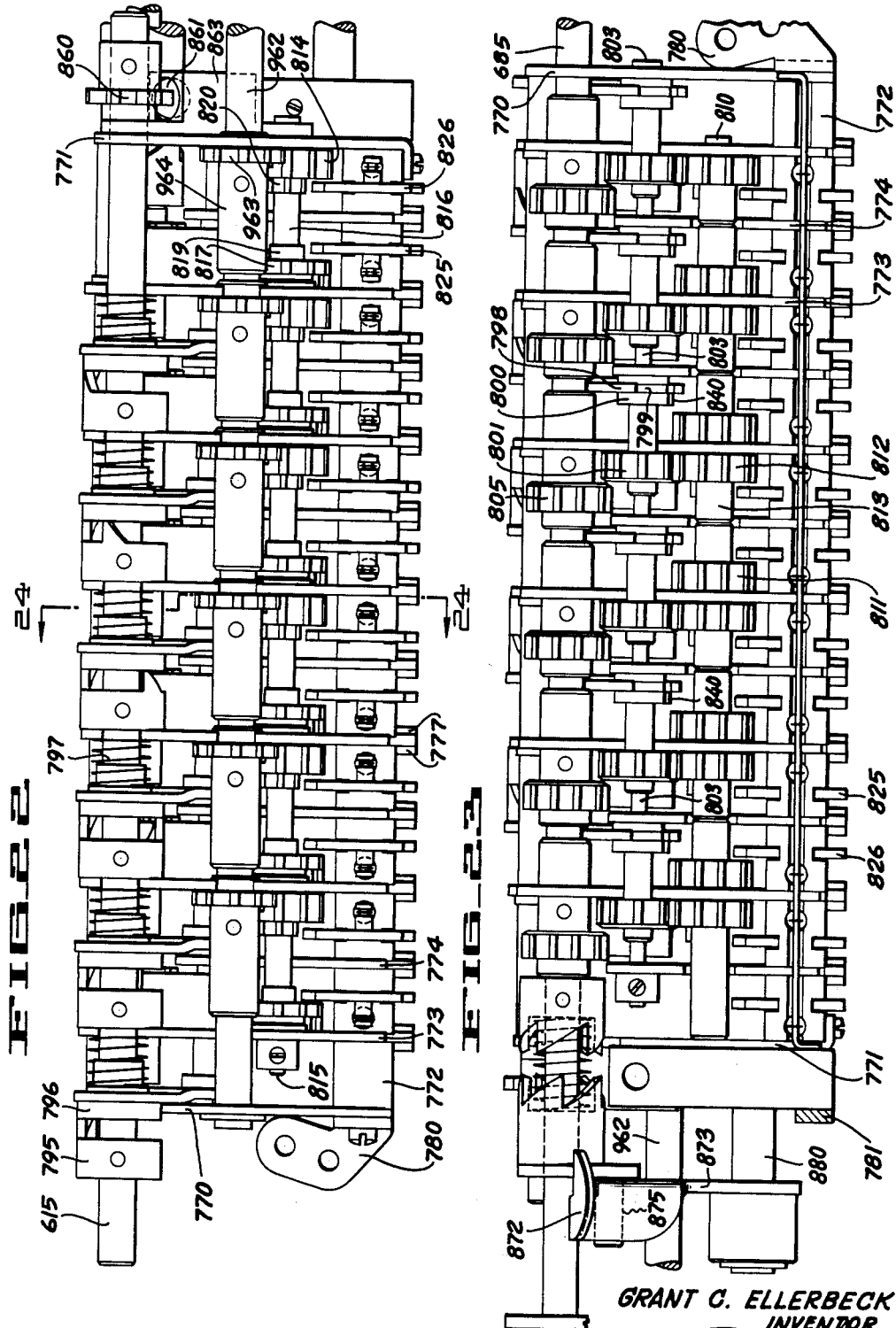

Feb. 28, 1956  G. C. ELLERBECK  2,736,493
SQUARE ROOT CALCULATING MACHINE
Filed Aug. 31, 1951  21 Sheets-Sheet 20
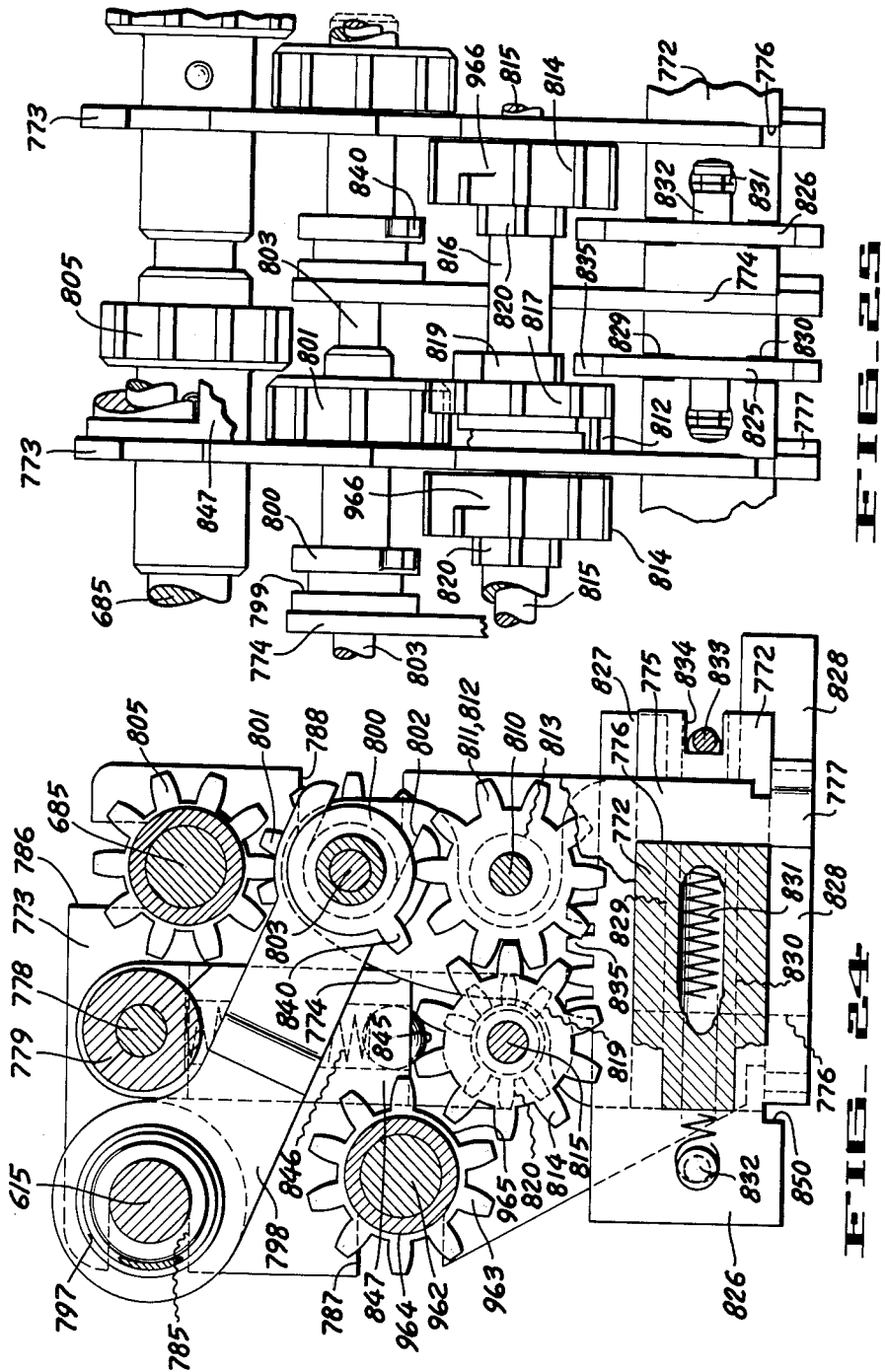
GRANT C. ELLERBECK
INVENTOR
BY Robyn Wilcox
ATTORNEY Feb. 28, 1956      G. C. ELLERBECK      2,736,493
SQUARE ROOT CALCULATING MACHINE
Filed Aug. 31, 1951      21 Sheets-Sheet 21
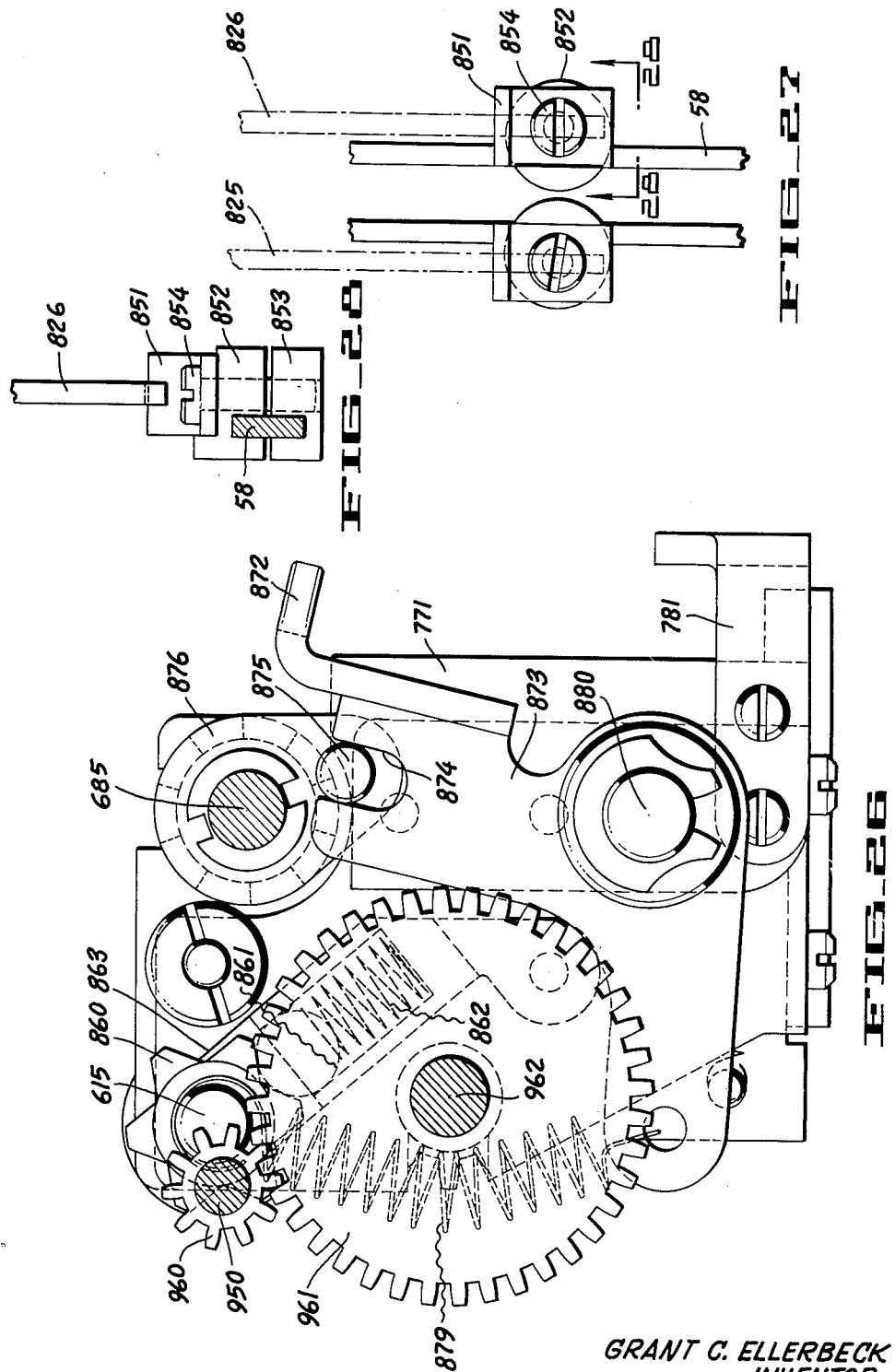
GRANT C. ELLERBECK
INVENTOR
BY Robyn Wilcox
ATTORNEY

United States Patent Office 2,736,493
Patented Feb. 28, 1956

2,736,493

SQUARE ROOT CALCULATING MACHINE

Grant C. Ellerbeck, San Leandro, Calif., assignor to Friden Calculating Machine Co., Inc., a corporation of California Application August 31, 1951, Serial No. 244,518

46 Claims. (Cl. 235—63)

I. General description
  a. Selecting and actuating mechanism
  b. Tens-transfer mechanism
  c. Revolutions counter
  d. Motor drive
  e. Plus and minus keys
  f. Carriage shift mechanism
  g. Automatic division mechanism
  h. Division aligner mechanism
II. Square root mechanism
  1. Initiating keys
  2. Pin setting levers
  3. Counter-control setting
  4. Initiating of division
  5. Keyboard clear
  6. Safety latches
  7. Pin wheel
  8. Cam shaft feed
  9. Keyboard lock
  10. Selection mechanism drive
  11. Square root programming mechanism
    A. Cam shaft operation
    B. Drive shaft mechanism
  12. Clearing square root programming mechanism
III. Operation This invention relates to calculating machines and particularly to one which, in adition to performing the usual four calculations of addition, subtraction, multiplication and division, will automatically extract the square root of a radicand (either whole, decimal, or mixed) registered in the accumulator.

The primary object of this invention is to provide a calculating machine capable of automatically extracting the square root of any given number.

Another object of this invention is to provide a control mechanism for a calculating machine which, when set to operative position, will automatically change the setting of the selection mechanism cyclically in a predetermined progression, so that a constantly changing value may be entered therein.

A further object of this invention is to provide a calculating machine with a manually positioned control mechanism which, when set to an operative condition, controls the operation of the machine to progressively and positively change the value of the factor being subtracted from a value in the accumulator register in order to subtract consecutive odd numbers therefrom, beginning with 1 and continuing through 3, 5, etc., and thereby extract the square root of a radicand registered in the accumulator register.

Square root can be extracted manually in a calculating machine such as the well-known "Friden automatic calculator." Heretofore, such extraction required a rather long and complicated process, which required considerable skill on the part of the operator and also strict attention to the work being done as the possibility of error was great. The extraction of square root is performed in a calculating machine by the successive subtractions of odd numbers from the radicand registered in the accumulator. Essentially this is the method of performing square root by hand. This process is based upon the fact that the square of the consecutive numbers is always the sum of the equal number of odd numbers added in their consecutive order. This is illustrated by the following table:

| Consecutive Nos. | Odd Nos. | Sum of Odd Nos. in Consecutive Order |
|---|---|---|
| 1 | 1 | 1 |
| 2 | 3 | 4 |
| 3 | 5 | 9 |
| 4 | 7 | 16 |
| 5 | 9 | 25 |
| 6 | 11 | 36 |
| 7 | 13 | 49 |
| 8 | 15 | 64 |
| 9 | 17 | 81 |
| 10 | 19 | 100 |
| * | * | * |
| 49 | 97 | 2401 |
| 50 | 99 | 2500 |
| etc. | etc. | etc. |

The normal manual method of extracting square root provides certain short cuts by working from the left side of the number, and this is also true of the extraction by a calculating machine. Just as division is essentially the repeated subtraction of the divisor from the dividend, so is the extraction of square root the subtraction of consecutive odd numbers from the original factor, and registering the number of operative cycles in the counter to secure the correct answer. This theory, or rule, for the extraction of square root has been applied to manual operation of a calculating machine. As an example, the extraction of square root on the commercial Friden automatic calculating machine, such as described in U. S. Patent No. 2,229,889, will be described. This process includes the following steps:

A. The machine is conditioned for extracting the square root by having the carriage at its extreme right-hand position, the counter-control mechanism is set to actuate the counter in an unlike sign character with respect to the accumulator (the counter counts positively during subtractive operations), and the automatic keyboard clearing mechanism is disabled.

B. The number is entered in the upper left-hand dials, preferably with the left-hand digit directly over the left-hand column of keys. This can be done through the keyboard in the usual manner, or by entering the value directly into the accumulator register by means of the conventional twirlers placed on the dial shafts.

C. The decimal point marker is then placed in its proper position. This is determined by setting off the radicand in groups of two, as is done in manual square root extraction, and the decimal point moved one place for each group of two in the radicand.

D. Starting in the column under the right-hand figure of the leftmost group of numbers (i. e., under the leftmost digit if the leftmost group has only one number or under the second from the leftmost digit if the leftmost group has two digits) the value of "1" is subtracted. Next, the consecutive odd numbers 3, 5, 7, 9, etc., are subtracted in order until the amount on the keyboard reaches the point where the keyboard value (next odd number) cannot be subtracted from the left-hand group.

E. The last odd number is raised to the next higher even number, and the carriage shifted one order to the left. In the event that last odd number should be "9," then "1" is inserted in the next higher order and the "9" is erased, thereby changing the value of "9" to "10", as indicated by the rule.

F. In the first order to the right of the keys previously depressed, and locked in the depressed position, start subtracting the consecutive odd numbers, 1, 3, 5, 7, 9, etc. In the event more than five subtractions occur (i. e., the values substracted go beyond "9") the "9" is changed to "11" by changing the "9" to "1" in that order, and adding "1" to whatever value was previously in the order to the left.

G. Again when the keyboard value reaches the point where it can no longer be subtracted from the corresponding orders in the accumulator, the last odd number is raised to the next higher even number (i. e., raise the rightmost digit by "1") and the carriage is shifted one column to the left.

This process of subtraction of consecutive odd numbers and shifting of the carriage to the right is repeated until the square root has been extracted. As a practical matter, when the process has been carried through five orders of the answer, the division keys may be depressed and a regular division operation initiated. In other words, when the normal ten-order keyboard is considered, the extraction of the square root through the first five orders, counting from the left, is sufficient for all practical purposes. When regular division is initiated after this point has been reached, the answer is correct through all the orders above the first and usually is correct in the lowest, or right-hand order. When errors do occur, it will be limited to one number in the right-hand counter, which error becomes insignificant in a nine or ten-order answer.

An example of the extraction of square root is given below using the radicand of 390937.5625 as illustrative of the process:

| Step | Keyboard Value | Accumulator Dial Reading | Counter Dial Reading |
|---|---|---|---|
| 1. Insert factor into accumulator. (Carriage in extreme right-hand position.) | | 390937.5625 | (Clear)** |
| 2. Subtract | 0100000000 | 380937.5625 | 100.0000000 |
| 3. Subtract | 0300000000 | 350937.5625 | 200.0000000 |
| 4. Subtract | 0500000000 | 300937.5625 | 300.0000000 |
| 5. Subtract | 0700000000 | 230937.5625 | 400.0000000 |
| 6. Subtract | 0900000000 | 140937.5625 | 500.0000000 |
| 7. Subtract | 1100000000 | 030937.5625 | 600.0000000 |
| 8. Raise | 1100000000 to 1200000000 | | |
| 9. Shift carriage one space to left | | *30937.56250 | 600.0000000 |
| 10. Subtract | (12)10000000 | 18837.56250 | 610.0000000 |
| 11. Subtract | (12)30000000 | 06537.56250 | 620.0000000 |
| 12. Raise | (12)30000000 to (12)40000000 | | |
| 13. Shift carriage one space to left | | *6537.562500 | |
| 14. Subtract | (124)1000000 | 5296.562500 | 621.0000000 |
| 15. Subtract | (124)3000000 | 4053.562500 | 622.0000000 |
| 16. Subtract | (124)5000000 | 2808.562500 | 623.0000000 |
| 17. Subtract | (124)7000000 | 1561.562500 | 624.0000000 |
| 18. Subtract | (124)9000000 | 0312.562500 | 625.0000000 |
| 19. Raise | (124)9000000 to (12)50000000 | | |
| 20. Shift carriage one space to left | | *312.5625000 | |
| 21. Subtract | (1250)100000 | 187.5525000 | 625.1000000 |
| 22. Subtract | (1250)300000 | 062.5225000 | 625.2000000 |
| 23. Raise | (1250)300000 to (1250)400000 | | |
| 24. Shift carriage one space to left | | *62.52250000 | |
| 25. Subtract | (12504)10000 | 50.01840000 | 625.2100000 |
| 26. Subtract | (12504)30000 | 37.51410000 | 625.2200000 |
| 27. Subtract | (12504)50000 | 25.00960000 | 625.2300000 |
| 28. Subtract | (12504)70000 | 12.50490000 | 625.2400000 |
| 29. Subtract | (12504)90000 | 00.00000000 | 625.2500000 |

* Indicates values in accumulator dials above keyboard after a carriage shift.
( ) Indicates numbers in the keyboard to the left of the order in which values are being changed manually.
** Place decimal marker three places to right of highest active counter dial, i. e., at "7" in machine used for exemplification.
(It will be noted that at the completion of operation in each order, the keyboard, or selection, value is twice the value standing in the counter.)

It will be understood that as far as the mechanics of extracting square root is concerned, the steps under paragraphs D, E, and G above, may be modified by subtracting the consecutive odd numbers until an overdraft occurs, which is signalled in the Friden machine by the ringing of a bell. Thereupon the last value subtracted is added to the remainder in a single additive corrective cycle. This restores the accumulator dials to the value which stood in them prior to the last subtracting which caused the overdraft. However, the last consecutive odd number placed in the machine has not been changed so that in this case the value standing on the keyboard is reduced to the next lower even number before, during, or after the carriage is shifted to the left and the process repeated.

| Step | Keyboard Value | Accumulator Dials Reading | Counter Dials Reading |
|---|---|---|---|
| 8a Subtract | 13 | 900937.5625 (bell) | 700 |
| 8b Add | 13 | 030937.5625 (bell) | 600 |
| 8c Reduce | 13 to 12 | | |

The same procedure would occur in steps 12, 19 and 23. However, it is apparent that with such a procedure the result is the same. This method permits the operator to disregard values in the accumulator so that operation will be approximately twice as fast as that outlined. The first method is generally used by operators as it is simpler to understand, but it will be understood that, mechanically, the second is simpler. This alternative process is mentioned at this point as, mechanically, it is more convenient to mechanically sense an overdraft in an automatic machine than it is to mechanically sense the difference between the value standing on the keyboard and that standing in the register. This method is therefore used in the present machine for extracting square root. Again it can be noted that this method gives a final keyboard value of twice the root, or counter value.

My invention is directed to doing, in an automatic manner, the sequence of steps described above, which, briefly stated, comprises:

1. Automatically changing the value set in the selection mechanism to progressively subtract consecutive odd numbers from the value standing in the register.

2. Sensing an overdraft.

3. Initiating a corrective additive cycle.

4. Reducing the value standing in the selection mechanism by "1."

5. Initiating a single left shift of the carriage (steps 8a, 8b, and 9).

6. Again initiating a series of subtractive cycles in which the value standing in the selection mechanism is progressively changed to subtract consecutive odd numbers, to the end that the square root of the value placed in the register may be automatically and accurately secured.

A further object of the present invention is to provide a foolproof mechanism by means of which square root can be subtracted automatically, quickly and accurately, the operation being initiated by depression of a key which conditions the machine for control by the square root mechanism and initiates the operation thereof in the proper order.

Broadly stated, an object of this invention is to provide means for automatically controlling operation of a calculating machine so as to continuously subtract squares in their consecutive order from the value standing in the register.

When viewed from another angle, an object of my invention is to provide a mechanism for a calculating machine which is operative, when desired, to automatically and progressively change the divisor in a division operation.

Another object of the present invention is to provide, in a calculating machine, a mechanism for subtracting consecutive odd numbers in a continuous operation.

It is another object of my invention to provide a means to automatically initiate the sequential subtraction of consecutive odd numbers in either the leftmost or the next order thereto, depending upon the place of the decimal point in the original factor, or radicand.

Another object of the present invention is to provide a mechanism for the automatic subtraction of the sum of consecutive odd numbers from a value registered in the accumulator of the machine to an overdraft and then correcting the overdraft by reducing the selection mechanism value that caused the overdraft by the square of "1."

Another object of the present invention is to provide a mechanism operative to effect a carry from "9" to "11" in the selection mechanism during the operation of the machine.

Still another object of the present invention is to provide a mechanism suitably designed to facilitate the placing of the decimal point of the root during the extraction of square root.

Still a further object of the present invention is to provide a mechanism adapted to initiate the extraction of square root of all decimal numbers from a common key.

Another important object of the present invention is to provide means for the ready and accurate location of the decimal point in the root, in the extraction of square root from a preselected radicand.

These and other objects of my invention will be apparent from the description and claims which follow. For purposes of disclosure, the invention will be shown and described as embodied in a machine of the type disclosed in the patent issued to Carl M. F. Friden on January 28, 1941, No. 2,229,890, as modified by the copending application of Anthony B. Machado S. N. 207,782, filed January 25, 1951, subsequently abandoned in favor of the continuation application of Anthony B. Machado, S. N. 251,311, filed October 15, 1951 (Patent No. 2,714,990 issued August 9, 1955), and the copending application of Anthony B. Machado et al. S. N. 66,688, filed January 22, 1948, now issued as Patent No. 2,653,765. It will be understood, however, that the invention is not limited to incorporation in such a machine, for that it can be incorporated or applied to other commercial calculating machines on the market. It will be understood, therefore, that the machine shown in the accompanying drawings and described herein, is for purposes of exemplification only, and that the invention is not limited thereto.

Parts of the mechanism disclosed in the above patents associated with the mechanism of this invention are disclosed herein in order to show the environment of the novel structure. It will be understood that in these views, many mechanisms and parts not associated with the mechanism of my invention are eliminated for simplification, only those parts being retained which cooperate with the novel mechanism of my machine. For a full disclosure of any of these mechanisms shown and herein briefly described, or for related mechanisms not shown or described, reference is made to the aforementioned patent and applications, or others which may be referred to particularly hereafter.

It is believed that the invention will be more readily understood by a reference to the drawings which form a part of this specification and in which:

Fig. 1 is a plan view of the calculating machine in which, for purposes of exemplification, the present invention is incorporated, showing particularly the eleven buttons across the front of the machine (between the ordinal rows of keys of the keyboard) by means of which the automatic extraction of square root is initiated.

Fig. 2 is a longitudinal cross-sectional view of the machine such as taken between the first and second orders of the machine, along the plane indicated by the line 2—2 of Fig. 16, showing the conventional selection and actuating mechanism and the carriage containing the accumulator and counter dials, and showing in addition, a right end view of the square root control mechanism of my invention.

Fig. 3 is a right side view of the right frame plate of the machine, with many parts removed for simplification, showing the clutch and motor switch, and a portion of the automtaic keyboard locking means associated with my invention.

Fig. 4 is a left side view of the right-hand auxiliary, or control, plate, showing particularly a portion of the division control mechanism of the machine with which my invention is associated.

Fig. 5 is a right side view of the right-hand auxiliary, or control, plate, showing particularly the counter-control mechanism and the balance of the division mechanism of the machine used for purposes of exemplification.

Fig. 6 is a plan view of a portion of the machine showing additional features of the division control mechanism and a portion of the division aligner mechanism shown in the above-mentioned patent of Anthony B. Machado No. 2,653,765, with certain mechanisms removed.

Fig. 7 is a rear view of a portion of the machine showing additional features of the division aligning mechanism just mentioned.

Fi. 8 is an isometric view of the initiating mechanism of my invention, which is preferably located across the front of the machine, in front of the keyboard (with conventional parts of the machine omitted).

Fig. 9 is a left side view of the left control plate showing the mechanism of my invention (with conventional parts of the machine not necessary for the operation of my mechanism omitted, but it will be understood that the parts here shown can be superimposed over the mechanism shown in Fig. 11 of the patent of Carl M. Friden No. 2,399,917).

Fig. 10 is an enlarged view of the mechanism shown in the upper left-hand portion of Fig. 9.

Fig. 11 is a perspective view of the pin wheel and associated mechanisms shown in Figs. 9 and 10.

Fig. 12 is a right side elevation of the right-hand control plate (as superimposed over the mechanism shown in Fig. 5) showing particularly the means for initiating operation of the machine in square root, and the means for automatically clearing the automatically selected values after the extraction of the root.

Fig. 13 is a detailed drawing of a linkage lying in the upper right-hand corner of Fig. 12 but covered by mechanisms there shown, such as taken along the plane indicated by the line 13—13 of Fig. 16.

Fig. 14 is a plan view of the clearing clutch such as taken along the plane indicated by the line 14—14 of Fig. 12.

Fig. 15 is a plan view of the lefthand portion of the square root control mechanism, showing also the front carriage rail of the carriage.

Fig. 16 is a plan view of the right-hand end of the square root mechanism, in effect constituting the right-hand portion of Fig. 15.

Fig. 17 is an enlarged front view of the drive mechanism that conditions the ordinal control mechanism from the carriage position, taken along the plane indicated by the line 17—17 of Fig. 15.

Fig. 18 is a cross-sectional view of the drive for the square root control mechanism taken on a vertical plane lying to the right of the left control plate, such as is indicated by the line 18—18 in Fig. 15.

Fig. 19 is a cross-sectional view taken along a longitudinal vertical plane through the square root control mechanism immediately to the right of that shown in Fig. 18, as indicated by the line 19—19 in Fig. 15.

Fig. 20 is a cross-sectional view of the square root control mechanism taken on a longitudinal vertical plane slightly to the right of that shown in Fig. 19, as indicated by the line 20—20 of Fig. 15.

Fig. 21 is a cross-sectional view of the square root control mechanism taken on a longitudinal vertical plane slightly to the right of that shown in Fig. 20, as indicated by the line 21—21 of Fig. 15.

Fig. 22 is a front view of the main operating mechanism of my invention, such as indicated by the lines 22—22 on Figs. 15 and 16.

Fig. 23 is a rear elevation of the mechanism shown in Fig. 22.

Fig. 24 is a vertical cross-sectional view, on an enlarged scale of one order of the main control mechanism, such as along the plane indicated by the line 24—24 of Fig. 22.

Fig. 25 is an enlarged front view of approximately two orders of the control mechanism shown in Fig. 21, with the clearing mechanism removed in order to show more clearly the drive for the ordinal selection mechanism.

Fig. 26 is a longitudinal cross-sectional view taken on a plane to the right of the main control mechanism shown in Fig. 22, such as indicated by the line 26—26 of Fig. 16.

Fig. 27 is an enlarged plan view of a detail of a means for connecting the square root control mechanism shown particularly in Figs. 24 and 25 to the regular selection slides.

Fig. 28 is a vertical cross-sectional view of the mechanism shown in Fig. 26, taken on a transverse vertical plane, such as indicated by the line 28—28 of Fig. 27.

I. GENERAL DESCRIPTION

The present invention, in its preferred form, is an improvement on a calculating machine of the type disclosed in U. S. Patent No. 2,229,889, issued to Carl M. F. Friden on January 28, 1941, and is illustrated as applied to the present commercial machine made according to the teachings of that patent. Various mechanisms will be referred to herein which are improvements on that patent, and in such cases the patents will be specifically mentioned by name. In order to simplify this disclosure, such mechanisms as are conventional in the mentioned patents will be referred to as briefly as possible to explain the novel mechanism of my invention, or to illustrate its operation.

Referring to Fig. 1, the calculating machine incorporating the present invention includes a main body portion 20 containing the actuating, selecting and control mechanisms of the machine, and an accumulator and revolutions counter carriage 21 which is mounted for endwise shifting movement transversely of the body portion 20. The carriage 21 has mounted therein a series of accumulator dials 22 and also a group of revolutions counter dials 23 which are viewable through suitable openings provided in the cover of the carriage. The carriage may be shifted by power in either direction across the machine by manipulation of a left shift key 27 and a right shift key 28 located on the right-hand side of the machine.

Numerical values may be entered in the machine by depression of appropriate numeral keys 29 of a conventional amount keyboard, the keys in each order being releasable individually by depression of an ordinal clear key 30 situated at the forward end of each order of keys, or the simultaneous release of all of the keys may be accomplished by depression of a clear key 31. The various values set up on the keyboard may be registered additively or subtractively on the accumulator wheels 22 by the depression of a plus key 32 or a minus key 33, respectively. If it is desired that the keyboard be cleared after each registration of a number in the accumulator, an add key 34 may be operated and latched in the well-known manner.

The accumulator wheels 22 and the revolutions counter wheels 23 may be cleared or reset to zero by manipulation of manually operable reset knobs 35 and 36 respectively, these knobs being mounted for lateral sliding movement in the framework of the carriage. Alternatively, the wheels 22 and 23 may be zeroized by power through the depression of a register clearing key 37.

The machine is adapted to perform automatic division operations by manipulation of a pair of division keys 38 and 39 which control a division mechanism similar to the type described in U. S. Patent No. 2,327,981.

The machine is also provided with a group of ordinally arranged tabulator keys 50 and a dividend entry key 51 for effecting the entry of a dividend set up on the amount keys 29 into the accumulator wheels 22 in any selected ordinal position of the carriage. This mechanism is fully shown and described in U. S. Patent No. 2,403,273 issued to Carl M. Friden et al. on July 2, 1946, and reference is made to this patent for a detailed explanation of the dividend entry mechanism. It can be mentioned here that the preferred form of my invention will be operative only when the carriage 21 is in the extreme right-hand position, so that ordinarily the radicand will be set into the accumulator dials by depression of the dividend entry key 51 with the number "9" tabulator key depressed.

a. Selecting and actuating mechanism

The main operating mechanisms of the machine are supported for the most part on or between a right side frame 52 (Fig. 6) and a left side frame 53, which frames are secured to a base 45 (Fig. 12), which base also serves to support the electric driving motor of the machine. The right and left side frames are interconnected by means of various cross-frame members including crossbars 54, 55, 56, 57 (which are shown in cross-section on Fig. 2).

Associated with each order of the keys 29 of the keyboard is a latching slide 350. These slides are provided with apertures 351 through which the key stems 29 extend. These latching slides are normally urged to the front of the machine (toward the left in Fig. 2) by means of springs, not shown. Each key stem 29 carries a cam projection 352 and a notch 353 associated with each aperture. As a key is depressed, the cam forces the latching slide rearwardly (to the right in this figure), thereby releasing any key in that order which may have been latched in a depressed position. When the key reaches its fully depressed position the notch 353 lies opposite the latching slide 350, whereupon the latch is spring-pressed forwardly so that it engages the notch and locks the slide in the depressed position. It can be mentioned here, that if the latching slide 350 is locked against rearward translation, by any suitable means, the key cannot be depressed.

It is conventional in calculating machines to provide means for releasing all of the keyboard latching slides 350 by depression of a single key, such as keyboard clear key 31 of Fig. 1. A suitable keyboard clearing mechanism is shown in the copending application of Anthony B. Machado S. N. 163,431, now abandoned, to which reference is made for full disclosure of this mechanism. However, it can be briefly described by reference to Fig. 8 of the instant application. A keyboard clear bail 355 extends across the front of the keyboard, being pivotally mounted in the frame of the machine by any suitable means such as on a shaft extending through the apertured ears 356. The forward ends of the latch slides 350 are turned downwardly to form ears 354 lying behind the clearing bail 355. Depression of the keyboard clear key 31, by camming means not pertinent to this invention, is operative to cause rocking of the bail 355 (counter-clockwise in Fig. 8) to engage the ears 354 and push all of the ordinal latching slides 350 rearwardly, thereby releasing all of the depressed keys of the keyboard.

The values to be entered into the accumulator numeral wheels 22 may be determined by means of a plurality of similar selecting mechanisms associated with the amount keys 29. As shown in Fig. 2, each order of amount keys cooperates with a pair of similar value selecting bars 58 which are mounted for endwise movement by means of a suitable supporting linkage including links 59 and extending through suitable slots provided therefor in the forward crossbar 54.

Each selecting bar 58 is provided at its rear end with a yoke that engages the grooved collar of a ten-tooth selection gear 60 slidably and nonrotatably mounted on a longitudinally extending square shaft 61 journalled in the crossbars 54, 55 and 56. Hence, the longitudinal movement of the bars 58, as differentially controlled by the numeral keys 29, serves to position the selecting gears 60 in the path of a series of stepped teeth provided on an actuating cylinder 65 secured to a shaft 66 journalled between the crossbar 54 and a transverse supporting bracket 67. For each adjacent pair of key orders, there is provided one longitudinally extending actuator shaft 66 bearing a pair of actuating cylinders 65. Each actuator shaft 66 is provided at its forward end with a bevel gear 68 which meshes with a corresponding bevel gear 69 secured to a transverse power shaft 70 journalled between the side frames of the machine. The shaft 70 is cyclically and uni-directionally operated by means of a clutch controlled driving means, hereinafter to be described, so as to provide a single path of power flow from the electric driving motor to the various power operated mechanisms of the machine.

Each of the square shafts 61 is provided on its rear end with a slidably but nonrotatably mounted spool 71 to which is secured a ten-tooth add gear 72 and a ten-tooth subtract gear 73, which gears are adapted to cooperate with similar ten-tooth gears 74 secured on the lower ends of accumulator numeral wheel shafts 75.

When the machine is in its idle, or full-cycle position, the gears 74 lie midway between the add and subtract gears 72 and 73 so as to permit lateral shifting movement of the carriage. The gears 74, in this case, are free to pass through the space existing between the gears 72 and 73.

In order to enable an amount set up on the keys 29 to be added into the accumulator wheels 22, the spools 71 and gears 72 and 73 may be shifted toward the rear of the machine so as to engage the add gears 72 with the gears 74. This shifting of the gears is accomplished by means of a flat bar, or gate, 76 extending transversely of the machine and lying within the space provided between the add-subtract gears 72, 73. The gate 76 is supported at either end by a pair of similar arms 77 secured to a transverse gate shaft 78 journalled in the side frames 52 and 53. The shaft 78 may be rocked, clockwise as viewed in Fig. 2, in a manner hereinafter to be described, so as to cause engagement of the add gears 72 with the gears 74 or alternatively, the shaft 78 may be rocked counter-clockwise so as to result in engagement of the subtract gears 73 with the gears 74.

b. Tens-transfer mechanism

Secured to the lower end of each of the numeral wheel shafts 75 is a tens-transfer cam 80 which is adapted to cooperate with a transfer lever 81 bearing a stud 82 which is journalled in the main frame bar 83 of the carriage. On the outer end of the transfer lever 81 there is provided a down-turned ear 84 which lies between a pair of flanges 94 provided on the hub 85 of a tens-transfer gear 86 located in the next higher order of the machine. The hub 85 and gear 86 are slidably, but non-rotatably mounted on the square shaft 61, whereby rotation of the gear 86 will be transmitted through the add-subtract gears 72, 73 to the numeral wheel shaft 75. Whenever the accumulator wheel 22 passes from "0" to "9" or from "9" to "0," a nose on the transfer cam 80 will rock the transfer lever 81 and move the ear 84 forwardly so as to move the transfer gear 86 of the next higher order into the path of a single, transfer actuating tooth 87 formed on a disk 88 secured to the shaft 66. The single tooth 87 will thereby cause one step of movement to be given to the square shaft 61 in addition to the normal movement imparted thereto by the actuating cylinder 65. The accumulator wheel 22 will thus be advanced one step so as to effect the tens-transfer from one order to the next higher order as required.

After the tens-transfer has been effected, the transfer gear 86 will be restored to its normal position by means of a restoring cam 90 secured to the actuator shaft 66. This restoring cam operates on the forward end of a detent pin 91 which is mounted for sliding movement in the crossbar 67 and in a transverse supporting bar 92. The pin 91 carries a pair of spaced flanges 93 which embrace one of the flanges 94 provided on the hub 85 of the transfer gear 86 so that when the pin is cammed rearwardly, the gear 86 will be restored to its normal position.

c. Revolutions counter

As shown in Fig. 2, each of the revolutions counter numeral wheels 23 is secured to a longitudinally extending shaft 98 journalled at its rear end in the frame bar 83 and at its forward end in a channel bar 99 which forms a part of the framework of the carriage 21. Secured to each of the shafts 98 is a gear 100 which is arranged to cooperate with a revolutions counter actuating mechanism 101 for operating the numeral wheels 23 in such a manner as to provide a count of the cyclic operations of the calculating machine and also for causing a unit to be transferred from a lower order to a higher order each time a wheel 23 passes through zero.

The revolutions counter mechanism is fully shown and described in the above-mentioned Patent No. 2,229,889 to which reference may be had for a more complete disclosure of this part of the machine.

d. Motor drive

In order to effect registration in the accumulator of the value set up on the amount keys 29, the actuator shafts 66 are operated in a cyclic fashion by means of a clutch controlled drive from the electric motor (not shown) of the machine. As shown in Fig. 3, the armature shaft 105 of the motor has secured thereto a pinion 106 which meshes with an idler gear 107 which in turn meshes with a large gear 108 journalled on the transverse power shaft 70. The gear 108 is provided with a hub to which is secured a driving clutch element, or ratchet (not shown). A driven clutch element 109 is secured to the shaft 70 and carries a pivotally mounted and spring-urged clutch pawl 110 which is provided with a tooth which is adapted to engage with the teeth of the ratchet for establishing a driving connection between the gear 108 and the power shaft 70. The pawl 110 is normally spring-urged into drive-engaging relationship with the ratchet, but is restrained in the open, or full cycle, position by means of a clutch control lever 111 pivotally mounted on a screw 112 fastened to the right side frame 52. The lever 111 carries a roller 113 which seats in a depression formed on the driven clutch element 109 in the full-cycle position thereof, and in all other positions of the clutch element 109 maintains the lever 111 in its clutch-engaging position. It will be seen, therefore, that one or more cycles of the actuator shafts 66 may be determined by proper control of the lever 111.

Simultaneous with the movement of the lever 111 in a clockwise direction, as viewed in Fig. 3, so as to cause engagement of the clutch, the electric circuit for the driving motor will be established. For this purpose the upper end of the lever is connected, by means of a long stud 114 and a link 115 with the upper end of a lever 116 pivotally mounted on a screw 117 secured to the right side frame. The lower end of the lever 116 is provided with a bifurcation which engages a pin 118 provided on the upper end of a lever 119 pivotally mounted on a screw 120 secured to the right side frame 52. On its lower end, the lever 119 is provided with a suitably insulated pin 121 which lies against one leaf of a leaf spring contact 122. Thus, clockwise movement of the clutch control lever 111 will cause counter-clockwise movement of the lever 119 so as to cause the pin 121 to force the contacts 122 into engagement and thereby close the electric circuit for the motor. It will be observed that the roller 113, in maintaining the control lever 111 in its clutch-engaging position throughout the machine cycle, will also serve to maintain the contacts 122 closed so that the motor circuit can be interrupted only in the full-cycle position of the parts.

e. Plus and minus keys

Referring to Fig. 4 of the drawings, it will be observed that the plus key 32 and the minus key 33 are both slidably mounted on a control plate 127 mounted on the right-hand side of the right side frame 52 by means of suitable screws and spacing sleeves. The keys 32 and 33 are provided with roller studs 128 and 129, respectively, which cooperate with the oppositely inclined cam faces 130 and 131, respectively, provided on a gate setting slide 132. This slide is pivotally connected at either end to the upper ends of arms 133 and 136 (Figs. 4 and 5), the arm 133 being pivoted on the control plate 127 while the arm 136 is secured to the righthand end of the gate shaft 78. Hence, when the plus key 32 is depressed, the slide 132 will be moved rearwardly so as to rotate the gate shaft 78 in a clockwise direction, as viewed in Fig. 2, thereby causing the add gears 72 to be engaged with the gears 74 on the numeral wheel shafts 75. In a similar manner, depression of the minus key 33 will cause forward movement of the slide 132, thereby rocking the gate shaft 78 counter-clockwise so as to engage the subtract gears 73 with the gears 74.

In order to initiate operation of the drive mechanism of the machine when either key 32 or 33 is depressed, each of these keys is provided with a half-round stud 137 which is adapted to cooperate with a cam face 138 provided on a cycle-initiating slide 139. The rear end of this slide bears against the long stud 114 so that when either of the keys is depressed, the stud will be moved rearwardly, thereby rocking the clutch control lever 111 (clockwise in Fig. 3) so as to engage the clutch and close the contacts 122. This will cause the electric driving motor of the machine to be energized and the power shaft 70 to be rotated, thereby driving the actuator shafts 66 to which are secured the actuating cylinders 65. Hence, the amount set on the keys 29 will be run into the accumulator wheels 22 in either a positive or negative direction depending on which of the keys 32 or 33 is depressed.

f. Carriage shift mechanism

Means are provided for shifting the carriage 21 selectively in either direction through one or more ordinal spaces, and the shifting means is preferably operated from the actuator shafts 66 under the control of the manually depressible shift keys 27 and 28. These keys, and the mechanism controlled by them, are fully shown and described in U. S. Patent No. 2,380,642, issued to Carl M. Friden et al. on July 31, 1945. The manually controlled shifting mechanism is not only conventional but has no particular connection with the mechanism of my invention. It suffices to mention that the left shift key 27 operates mechanism to cause a rearward translation of the left shift rod 151 (Fig. 6) and depression of the right shift key 28 causes a rearward translation of the right shift rod 156. The push rods 151 and 156 are normally maintained in their forward or inactive positions, as shown in Fig. 6, by means of compression spring (not shown), while the rear ends of the rods carry shifting forks 160 and 161 which engage with annular grooves cut in clutch members 162 and 163. The members 162, 163 are slidably mounted on the rear ends of the two right-most actuator shafts 66 and are provided with clutch teeth 164 and 165 which engage with corresponding notches provided in collars 158 and 159 secured to the rear ends of the actuator shafts 66. The members 162 and 163 are also provided on their rear ends with clutch teeth which are adapted to cooperate with clutch teeth 166 and 167 formed on the forward ends of gear sleeves 168 and 169 when either the member 162 or the member 163 is moved rearwardly by its associated shift fork 160 or 161. Hence, it will be seen that the coupling members 162 and 163 provide a means whereby the actuator shafts 66 may be selectively coupled to the gear sleeves 168 or 169, and thereby provide a power drive for the carriage shift mechanism. Hence, depression of the left shift key 27 operates to move the push rod 151 and the shift fork 160 toward the rear of the machine and thereby cause the coupling member 162 to establish a driving connection from the actuator shaft 66 to the gear sleeve 168. In a similar manner, depression of the right shift key 28 moves the shift rod 156 and shift fork 161 rearwardly to establish a driving connection between the rightmost actuator shaft 66 and the gear sleeve 169.

As seen in Fig. 6, the gear sleeve 168 carries a gear 170 which meshes directly with a larger gear 171 to which is secured a smaller gear (not shown) which meshes with a shift gear 172. The gear sleeve 169 carries a gear 173 which meshes with a wide idler gear (not shown) which meshes with the large gear 171 and causes reverse rotation of this gear. The gear sizes are so chosen as to provide a drive ratio of 1 to 4 between the gears 170 and 173 and the shift gear 172, so that for each rotation of the gear sleeve 168 or 169, the shift gear 172 will be rotated through an angle of 90 degrees.

The shift gear 172 is secured to a shaft which is journalled between the crossbar 56 and a plate 175 mounted on the rear of the machine. Secured to the same shaft as the gear 172 is a drive plate 177 which carries four equally spaced drive pins 178 which are adapted to engage with notches 179 (Fig. 7) provided in a shift rack 180 secured on the rear of the carriage 21. Hence, for each 90 degrees of rotation of the drive plate 177 the carriage will be shifted through a distance equal to the spacing between the notches 179, which is equal to the distance between the numeral wheel shafts 75 (Fig. 2). In other words, the carriage will be shifted one ordinal space on each cycle of operation of the power shaft 70.

The mechanism just described is modified as shown in the patent to Machado, No. 2,653,765, to provide for automatic shifting of the carriage to the right upon depression of the division keys 38 and 39. This shifting continues until the dividend in the carriage is properly aligned with the divisor set in the keyboard. Thereafter, the division mechanism automatically controls shifting of the carriage to the left, order by order as the division operation progresses. Briefly, the shaft 302 (Fig. 6), which is journalled in the right side frame 52 and in the arm 276 of bracket 277, is shifted axially to the left against the force of a compression spring 309 by the initiation of a division operation. The shaft 302 is also rocked (clockwise as viewed from the right-hand side of the machine) by the operation of the overdraft mechanism which will be described in connection with the division controls. Secured to the shaft 302 is a male driving element 390 which is provided with a tooth engaging with a slot in a driven element 391. The driven element is secured to the left-hand end of a sleeve 392 rotatably journalled on the shaft 302. The sleeve 392 is urged to the right by means of a light compression spring 393 but is restrained against such movement by means of a pair of latches 394 and 395 which are pivotally mounted on a screw 396. The latches 394 and 395 are provided with latching shoulders which are urged into engagement with an abutment face provided on a left shift arm 400 which is rigidly mounted on the left-hand end of the sleeve 392. The latches 394 and 395 are urged into engagement with the abutment face of the left shift arm 400 by suitable springs 397 as shown. A right shift arm 403 is also secured to the sleeve 392, being mounted on the right-hand end thereof.

Means are provided for disabling the control of the shift keys 27 and 28 whenever the carriage reaches either of its extreme end positions. For this purpose means are provided for lifting interponents, not shown, between the manual shift control mechanism and the pusher rods 151 and 156 when the carriage reaches either its left end or its right end position. The disablement of the left shift pusher rod is under the control of lever 185, shaft 186, link 190 (Figs. 6 and 7) and a bellcrank lever 191 which is journalled on the gate shaft 78. This bellcrank lever has a rearwardly extending arm 192 which lies beneath the right-hand end of a lever 193 which is pivotally mounted on a screw 194 (Fig. 7) fastened to the crossbar 56. The operation of this lever is fully described in said Patent No. 2,403,273 and need not be described here. Similarly, the right shift mechanism is disabled by a movement of an interponent, not shown, which operates under control of a lever 199 (Fig. 6), loosely journalled on the shaft 186, a pin 201 (Fig. 7), and lever 202. Lever 202 is rocked by lever 204 mounted on the lower end of a lever 206 pivoted on a plate 208 which is secured to the rear face of the crossbar 56 by means of suitable spacer sleeves and screws. The lever 206 has an upwardly extending arm which is provided with a formed-over ear 209 lying beneath an override pawl 210 which is pivotally mounted on the shift rack 180. When the carriage reaches its right end position, the shift pins 178 will cause the pawl to be rocked (clockwise as viewed in Fig. 7) thereby rocking lever 206 to move lever 204 toward the right. The lever 204 is provided with a cam face 216 which lies beneath a roller 217 mounted on the plate 208. Hence, when the lever 204 is moved toward the right, it will be rocked clockwise, thereby elevating the rear end of the lever 202 and disabling the shifting mechanism as explained in said patent.

g. Automatic division mechanism

The machine shown in the accompanying drawings is provided with a mechanism for enabling a dividend set up on the accumulator wheels 22 to be automatically divided by a divisor set up on the amount keys 29. The mechanism provided in the present machine for accomplishing this purpose is similar to that shown in Patent No. 2,327,981 to Carl M. F. Friden, and accordingly, only so much of the automatic division mechanism will be described herein as is necessary for a clear understanding of the present invention.

The automatic division mechanism controls the functioning of the machine so as to cause the divisor to be repeatedly subtracted from the dividend until an overdraft occurs in the accumulator. Thereupon the overdraft will be corrected and the carriage shifted one ordinal space to the left, whereupon the process will be repeated. The number of subtraction cycles effected in each order of the accumulator is registered in the revolutions counter so as to provide a visual representation of the quotient at the end of the problem. During division the machine is controlled by a program control device which becomes effective each time an overdraft occurs in the accumulator. This program device controls the program of operations of the add-subtract gears and the carriage shift mechanism so as to cause a predetermined sequence of operations to occur during uninterrupted cyclic operation of the actuating mechanism of the machine. The division operation is normally initiated by the depression of the division key 38 which causes the program control device to be operatively connected with the add-subtract gate and also with the carriage shift mechanism and, in addition, renders the overdraft control mechanism effective to control the cycling of the programming device.

As shown in Fig. 4, the division key 38 is slidably mounted on the control plate 127 by means of slots in the key stem which cooperate with screws secured to the control plate so as to guide the key for vertical reciprocatory movement. The key is provided at its lower end with an inclined cam face 222 which bears against a roller 223 mounted on a division slide 224. This slide is supported for endwise shifting movement on the control plate 127 by means of elongated slots in the slide which cooperate with studs 225 secured to the control plate. As shown in Fig. 5, the slide 224 is provided with a roller 226 which lies in front of a finger 227 formed on the upper end of a latch 228 pivotally mounted at 229 on the control plate 127. The latch 228 is urged to rotate in a counter-clockwise direction by means of a spring 230 tensioned between the lower end of the latch and a stud 231 mounted on the control plate, so as to normally maintain a shoulder 232 formed on the latch beneath a roller 233 secured to the forward end of a division setting actuator 234. The actuator 234 is pivotally mounted on the control plate at 235 and is urged to rotate in a counter-clockwise direction by means of a strong spring 236 which is tensioned between the actuator and the stud 231. The roller 233 is thereby maintained in engagement with the shoulder 232 of the latch when the parts are in their normal positions. However, when the division key 38 (Fig. 4) is depressed, the cam face 222 will engage the roller 223, thereby moving the slide 224 rearwardly so as to cause the roller 226 to engage the finger 227 and rock the latch 228 rearwardly (clockwise in Fig. 5) so as to remove the shoulder 232 from beneath the roller 233 of the actuator 234. The actuator will thereupon be rocked counter-clockwise by the strong spring 236 so as to cause setting of the division control mechanism hereinafter to be described. The actuator 234 will be restored during the first cycle of operation of the machine by means of a roller 237 mounted on the face of a gear 238 secured to the right-hand end of the power shaft 70. The roller 237 is adapted to engage an inclined cam face 239 formed on an upwardly extending arm of the actuator 234 so as to cause the actuator to be rocked clockwise against the tension of the spring 236 when the machine is cycled.

Lying beneath the forward end of the actuator 234 is a roller 240 (see also Fig. 4) which is mounted on the lower end of a link 241 which is pivotally connected to the forward end of a connecting lever 243. This lever is pivotally mounted on a stud 244 carried by a cam follower arm 245 which is pivotally mounted on the control plate 127 at 246 and urged in a clockwise direction, as viewed in Fig. 4, by means of a spring 247. The arm 245 is provided with an aperture 248 within which is located an eccentric cam 250 mounted on a program control shaft 251. As described in the aforementioned Patent No. 2,327,981, this shaft forms an essential part of the program controlling device and is rotated during division operations to control the setting of the add-subtract gate and the operation of the carriage shift mechanism. These operations are performed in a predetermined sequence so as to cause the machine to carry out a division operation during continuous cycling of the machine.

The lever 243 is provided on its rear end with a bifurcation 252 for engaging a stud 253 secured to the gate setting slide 132. Thus, when the division key 38 is depressed, so as to release the actuator 234 (Fig. 5), the roller 240 will be depressed and the connecting lever 243 will be rocked clockwise, as viewed in Fig. 4. This rocking of lever 243 causes an inclined face 254 formed on the rear side of the bifurcation to engage the stud 253 and cam the slide 132 forward, so as to engage the subtract gears 73 with the gears 74 on the shafts 75 and thereafter cause the stud 253 to become seated in the bifurcation 252. The connecting lever 243 thereby serves as a connection between the follower arm 245 and the gate setting slide 132, so that movements of the arm 245 will be communicated to the slide for the purpose of controlling the add-subtract gears during division operations.

The connecting lever 243 is retained in its operated position throughout the division operation by means of a half-round stud 260 mounted in the rear end of the lever which is adapted to be engaged by a latch 261 (see Fig. 3) pivotally mounted on a stud 259 mounted on the right side frame 52. The latch 261 is urged into latching engagement with the stud 260 by means of a tension spring 262 so that when the lever 243 is rocked upwardly (clockwise in Fig. 4 and counter-clockwise in Fig. 3), the latch will engage the flat of the stud 260 and hold the connecting lever in its operated position until the latch is released at the end of the division operation.

In order to initiate cycling of the machine during division operations, the link 241 (Fig. 4) is pivotally connected at its upper end to the rear end of bellcrank lever 263 which is pivotally mounted on a screw 264 secured to the control plate 127. This bellcrank is provided with an upstanding arm 265 which lies in front of a stud 266 mounted on the cycle initiating slide 139. Hence, when the link 241 is depressed upon the release of the actuator 234 (Fig. 5), the bellcrank 263 will be rocked (counter-clockwise in Fig. 4) against the urgency of a spring 267, thereby causing the slide 139 to be moved toward the rear of the machine so as to engage the clutch and close the motor contact through the means previously described in connection with the plus and minus keys.

It will be observed (see Fig. 5) that the program control shaft 251 extends through the control plate 127 and is provided on its right-hand end with a mutilated gear 270 which is adapted to be moved into and out of driving relationship with a larger mutilated gear 271 which is secured to a gear 272 journalled on a screw 273 mounted in the control plate. The gear 272 in turn meshes with the gear 238 secured on the right-hand end of the power shaft 70, so that when the clutch is engaged and the shaft 70 rotated, the gear 238 will drive the gear 272 and the large mutilated gear 271. The small mutilated gear 270 is normally located out of the plane of the gear 271 so that the program control shaft 251 is normally inoperative. As shown in Fig. 6, the shaft 251 is normally urged toward the left, as viewed from the front of the machine, by means of a spring 275 on the shaft 251 which is compressed between a collar on the shaft and an arm 276 on a bracket 277 secured to the crossbar 67. Hence, the gear 270 is urged to a position where it lies against the right-hand side of the control plate 127 with a notch formed in the periphery of the gear engaged over a pin 278 mounted in the control plate. By means hereinafter to be described, the shaft 251 and gear 270 are shifted to the right at certain times during a division operation so as to move the gear into the plane of the large mutilated gear 271 and thereby establish a driving connection to the shaft 251 from the transverse power shaft 70.

The gear 270 as seen in Fig. 5, has three equally spaced sets of three teeth each which are arranged to cooperate with a single set of two teeth provided on the gear 271. As the latter gear rotates in a counter-clockwise direction during cycling of the machine its two teeth are so positioned thereon as to engage one of the sets of three teeth on the gear 270 just before the end of a machine cycle. Hence, when the small mutilated gear is projected into the plane of the larger gear 271 during the course of a division operation, the gear 270 will be rotated clockwise through one-third of a revolution beginning at the end of the instant cycle, and also through one-third of a revolution beginning at the end of each of the two next succeeding cycles, the gear and shaft 251 being maintained in their right-hand positions by the engagement of the pin 278 with the left-hand face of the gear 270.

The lever 243 (see Fig. 4) bears a stud 280 which lies beneath a forward end of an arm 281 secured to a laterally extending shaft 282 (see also Fig. 6) which is journalled between control plate 127 and the left side frame 53 of the machine. Also secured to the shaft 282 at the left-hand side of the machine is an arm 283 (see Fig. 6) which is provided at its forward end with a stud 284 which lies within an elongated slot provided in the lower end of an overdraft control link 285. This link is pivoted at its upper end on a stud 286 secured to a yoke 287 which is fastened on an extension 288 of the highest order tens-transfer detent pin 91. As mentioned earlier herein, when a transfer is effected from one order of the accumulator to the next, the pin 91 will be moved forwardly as an incident to the forward movement of the transfer gear 86 for the purpose of placing this gear in the path of the transfer actuating tooth 87. Hence, when a transfer occurs which effects a forward movement of the leftmost detent pin 91, the extension 288 thereof will cause the link 285 to be moved forward for a purpose to be hereinafter described.

The forward end of the link 285 is normally held in its depressed, or inactive position by a spring, not shown, but upon depression of the division key and rocking of the connecting lever 243, the shaft 282 will be rocked (counter-clockwise as viewed in Fig. 4), thereby causing the pin 284 to lift the forward end of the link 285 so that it will lie directly behind the lower edge of a division control flag 290 which is pivotally mounted on the control shaft 251. Hence, when the link 285 is moved forward as a result of the forward movement of the leftmost detent pin 91, the flag will be rocked (clockwise as viewed from the right) against the urgency of a spring 291 so as to move an upwardly extending finger 292 on the flag into the plane of a pin, not shown, carried by a cylinder, not shown, which is mounted on the leftmost actuator shaft 66. Hence, as the shaft 66 rotates, the pin will engage the finger 292 and displace the flag (to the right as viewed in Fig. 6). Inasmuch as the flag is prevented from moving laterally on the shaft 251 by means of a collar 295 which is pinned to the shaft 251, this shaft and the small mutilated gear 270 will likewise be displaced to the right so as to bring the gear into the plane of the larger gear 271. Thus, the shaft 251 and the cam 250 thereon (Fig. 4) will be given three steps of movement during the next three cycles of the machine, after which, the gear 270 will drop back over the pin 278 to its inactive position. In the meantime, the overdraft control link 285 will be moved rearwardly so as to release the flag 290 due to the restoration of the detent pin 91 by the restoring cam 90.

When the cam 250 (Fig. 4) occupies the position marked A, which is the position of the cam when the notch in the small mutilated gear 270 engages with the pin 278, the connecting lever 243 will be so positioned as to hold the gate setting slide 132 in its forward position so as to cause the subtract gears 73 to engage the gears 74 on the numeral wheel shafts 75. The machine will therefore be set for subtraction and the value of the divisor set up on the amount keys 29 will be subtracted from the accumulator wheels 22 each time the machine makes one cycle of operation. Toward the end of the cycle in which an overdraft occurs in the accumulator, the shaft 251 will be displaced toward the right under the control of the transfer mechanism as described above. Such displacement positions mutilated program gear 270 in the plane of drive gear 271. The teeth of gear 271 engage the teeth of the mutilated gear as the large gear approaches its full-cycle position (shown in Fig. 5). Thus, as the cycle ends, the shaft 251 is being rotated counter-clockwise 120° to the position marked B, whereupon the cam 250 will rock the follower arm 245 counter-clockwise (Fig. 4), thereby moving the connecting lever 243 toward the rear of the machine so as to cause the add gears 72 to be moved into mesh with the gears 74. Therefore, during the following cycle of operation of the machine, the divisor will be added back into the accumulator so as to correct the overdraft. Beginning at the end of this cycle the program control shaft will be rotated through another 120° to the position marked C (such 120° of rotation actually overlapping the last few degrees of the first cycle and the first few degrees of the second cycle), thereby moving the arm 245 to an intermediate position where the add-subtract gears 72, 73 will be held out of engagement with the gears 74 preparatory to a carriage shifting operation. The arm 245 is arranged to be yieldably maintained in this intermediate portion by means of a spring-urged centralizer arm 297 provided with a V-shaped nose which is adapted to engage in a corresponding notch provided in the upper edge of the arm 245.

In order to cause the carriage to be shifted one ordinal position to the left during the machine cycle following movement of the shaft 251 to position C, a cam 298 (Fig. 6) is secured to the shaft 251, this cam being provided with a node 299. When the shaft 251 is moved toward the right by the action of the pin, not shown, on the flag 290, the node 299 on the cam 298 is moved toward a follower arm 300 which is secured to a hub 301 (Fig. 6) pinned to the transverse shaft 302, rocking of which initiates either a right or a left shift (depending on the position of the sleeve 392) as previously explained. This shaft is arranged to receive axial shifting movements, as has been previously mentioned. The hub 301 is provided with a flange 303 which, together with the follower arm 300, provides an annular groove for receiving a finger 304 provided on a bellcrank lever 305. The bellcrank lever is provided with a forwardly directed arm 308 which lies over the left-hand end of the stud 280 carried by the lever 243. Hence, when the lever 243 is rocked (clockwise as viewed in Fig. 4), the stud 280 will cause the arm 308 to be lifted and thereby rotate the bellcrank 305 (counter-clockwise as viewed from the front of the machine) so as to move the shaft 302 and the follower arm 300 to the left against the opposition of the compression spring 309 mounted on the shaft 302 at the left-hand end thereof (see Fig. 6). This left-hand movement of the follower arm 300 is sufficient to bring the arm into the plane of the node 299 when the shaft 251 occupies its active or right-hand position. The node 299 is so located on the cam 298 as to cause the follower arm 300 to be rocked, and held in the rocked position, when the cam 250 (Fig. 4) occupies the position marked C. Through means previously described, this rocking movement of the arm 300 and shaft 302 causes the right shift clutch to be engaged during the aligning phase of a division operation and the left shift clutch to be engaged during the division phase, and thereby causes the carriage to be moved one ordinal space. At the end of the shift cycle, the cam 250 will be moved from position C to position A so as to again cause the subtract gears 73 to be engaged with the gears 74 and once again cause the divisor to be subtracted from the dividend. When the cam 250 and shaft 251 reach the position marked A the notch in the small mutilated gear will again register with the pin 278 and permit the gear and the shaft to be moved toward the left under the influence of the compression spring 275 (Fig. 6), thereby terminating the operation of the program control shaft 251 until the repeated subtraction of the divisor once again causes an overdraft in the accumulator. Thereupon the program control mechanism will once again be set into operation so as to cause the above-described sequence of operations of the machine.

The calculating machine is provided with a counter reversing key 39 (Figs. 1 and 5) which lies immediately adjacent to the division key 38 and is normally depressed along with this key when a division operation is initiated. Depression of the key 39 causes the revolutions counter to be operated in a reverse, or negative, direction, thereby causing the subtraction cycles, occurring during a division operation, to be counted in a positive sense. The mechanism for accomplishing this result is indicated generally at 316 and for a complete disclosure of this particular part of the machine, attention is invited to U. S. Patent No. 2,294,111, granted to Carl M. F. Friden on August 25, 1942. The counter reversing mechanism 316 is conditioned by a link 317, the forward end of which is pivotally mounted on a lever 318. The lever 318 has a cam face 319, which is engaged by a roller 320 mounted on the lower end of the key 39. Thus, depression of counter control key 39 rocks lever 318 counter-clockwise, and pulls link 317 forwardly to condition the counter control mechanism 316 for unlike, or negative, operation.

The counter-control mechanism 316 is locked in either adjusted position, during a division operation, by means of a locking arm 321, the forward nose 322 of which rocks in front of, or behind, a pin 323 on an interponent lever 324 connecting link 317 to the reversing mechanism 316. The locking lever is positioned in locking relationship by rocking of connecting lever 243, to which it is connected by a suitable pin and slot connection 325.

In machines of this class it is conventional to provide an "add," or single cycle, mechanism which, when set, causes the clearing of the keyboard toward the end of a cycle of operation. In division operations it is desirable to disable the release of the keyboard until the division operation is completed. Such a disabling mechanism is shown in the Patent of Machado, No. 2,653,765 and his copending application S. N. 251,311, and need not here be described.

The counter-control mechanism 316 is also settable from a counter-control button 336 (Fig. 1). The button shown is in its normal, or like counting, position. Forward movement of the button rocks a connecting link 335 (see Fig. 8) which is pivotally mounted on the upper end of an arm 334. The arm 334 is rigidly secured to a transverse shaft 333 which extends across the front of the machine. The right end of this shaft has an arm 332 rigidly secured thereto. This arm carries a long stud 331 on which is pivotally supported a short link 330. The rear end of the link 330 is coupled to the link 317 (see Fig. 5) by a suitable pin-and-slot connection. Thus the counter-control can be set by division key 39 or it can be set by the button 336. It can be mentioned that the control link 335 is customarily provided with a suitable detent to hold the counter-control mechanism in either adjusted position, but that setting from key 39 is held only if the division key 38 is depressed to operate arm 321 just described.

The foregoing description of the division control mechanism is believed sufficient for a clear understanding of the present invention, but reference is made to the Patents Nos. 2,229,889 and 2,327,981, issued to Carl M. F. Friden for a more detailed disclosure of this part of the machine.

It is conventional in the machine mentioned in the foregoing patents, to provide means for terminating the division operation when the true quotient is secured and the carriage is in the extreme left-hand position. It will be recalled that the division control lever 243 is latched in its operative position by a latching member 261 engaging the stud 260 (see Fig. 3). The carriage, not shown in this figure, is provided with a live pawl (as shown and described in the patent of Machado et al. No. 2,653,765) which is adapted to move behind the upper end 385 of the latch member 261, when the carriage moves to the extreme left-hand position. The automatic division program mechanism has set the machine for a series of subtractions as the carriage moves into this extreme left-hand position. When the overdraft occurs, the programming mechanism previously described, becomes effective to rock the control lever 243 forwardly to move the digitation control slide 132 rearwardly to initiate an additive corrective cycle (to the right in Fig. 3). The movement of the control lever 243 to the right rocks the latching member 261 counter-clockwise, whereupon the live pawl mounted on the carriage (and not shown herein) is enabled to rock behind the upper end 385 of the latching member 261. Hence when the connecting, or control, lever 243 is moved forwardly at the end of the add-back cycle, preparatory to the shifting of the carriage in the next cycle, the stud 260 will be pulled off the latch 261. The lever 243 thus is permitted to drop, so as to cause the division operation to be terminated at the end of the shift cycle, which in this position of the carriage is an idle cycle of operation.

h. Division aligner mechanism

Mention has heretofore been made of the patent of Anthony B. Machado et al. Patent No. 2,653,765, relating to a division aligning mechanism used in the Friden fully automatic calculator machine now marketed. A portion of this mechanism has been briefly referred to under the heading of "Carriage shift mechanism" and is operative in the first phase of operation of the division mechanism to shift the carriage to the right until the divisor has been properly and automatically aligned with the dividend. This division aligner mechanism is not directly connected with the mechanism of my invention, but its operation is important to the initiation of a square root extraction. As has been intimated before, I prefer that square root extraction be initiated with the carriage in the extreme right-hand position. There are several reasons for initiating square root extraction from this position, among the most important of which are the fact that one is thereby enabled to secure the utmost accuracy in operation and another is that, by so doing, I am enabled to omit complicated interlocks that would otherwise be required. The radicand will preferably be registered in the extreme left-hand dials of the accumulator register 22, being ordinarily placed there by placing the factor on the left-hand side of the keyboard and registering that value in the accumulator through operation of the dividend entry key 51, with the tabulator keys 50 set for entry in the extreme right-hand position of the carriage. In such a position of the carriage, the division aligning mechanism obviously cannot operate the shifting mechanism to cause a shifting of the carriage any further to the right. However, the division aligning mechanism, with the carriage in this position, does provide for three idle cycles of operation prior to the initiation of the division operation. The extraction of square root is accomplished by subtracting consecutive odd numbers from the radicand in the manner indicated for manual operation already mentioned. The three idle cycles of operation resulting from the use of the division aligning mechanism above-mentioned, can be advantageously used in setting the machine for the extraction of square root by setting the programming mechanism for the progressive changing of the subtrahend, or divisor, as above mentioned. It is therefore believed that a better understanding will be had of my invention if the operation of the division aligning mechanism, particularly when the carriage is in the extreme right-hand position, is briefly mentioned, although it will be understood that the division aligning mechanism is per se not associated with my invention nor necessary for its operation. It will also be understood that for a clear understanding of the division aligning mechanism one should refer to the patent, just mentioned.

The rear ends of the arms 400 and 403 are provided with pressure faces which are adapted to engage the corresponding faces provided on ears 404 and 405, respectively, formed on the shifting forks 160 and 161. When the machine is in its normal, or full-cycle position, the left shift arm 400 is in alignment with the ear 404, while the arm 403 lies to the right of its associated ear 405 and is therefore in an inoperative position with respect to the shifting fork 161 which controls the right shift clutch of the machine.

It has previously been mentioned that initiation of a division operation causes the shifting of the shaft 302 (Fig. 6) to the left, thereby moving the latches 394 and 395 which are indirectly carried by the shaft 302 toward the left. The latches in turn pull the sleeve 392 toward the left to align the right shift arm 403 with the ear 405, so as to operate the right shift clutch upon rocking of sleeve 392, and arm 400 is moved out of alignment with ear 404 (thereby disabling operation of the left shift clutch). By this means, the rocking of shaft 302, under the control of the programming shaft 251 as above-mentioned, is effective to cause a right shift to the carriage instead of a left.

Also, the shifting of the shaft 302 toward the left is operative to move a slide 406, which is mounted for lateral sliding movement on brackets 409 and 276. The right-hand end of the slide 406 is notched as indicated at 412 (Fig. 7) to embrace the edge of the left shift arm 400. Thus shifting of the sleeve 392 also causes shifting of the slide 406 to the left. The left-hand end of the slide 406 is provided with an inclined camming face 413 which overlies a tail 414 on flag 290. Hence, when the sleeve is shifted to the left, along with the shaft 302 at the beginning of a division operation, the slide 406 will likewise be shifted to the left and cam face 413 will cam the tail 414 downwardly, thereby rocking the finger 292 on the flag into alignment with the pin (not shown) carried on a cylinder mounted on the left-hand actuator shaft 66. The flag 290 is held in its rocked, or active, position by the slide 406 so that the program control shaft 251 will be cammed to the right during the first cycle of operation, thereby initiating the division program mechanism above-described, but with a shift of the carriage to the right instead of to the left. At the end of the third cycle, the shaft 251 will be released for movement to the left and immediately the flag 290 will be operated to cause it to be shifted to the right to initiate another series of division operations. Thus the program control shaft 251 will be repeatedly operated by a false, or artificial, overdraft caused by the rocking of the flag 290 by the slide 406. This shifting of the carriage to the right will be continued until both of the latches 394 and 395 have been tripped by mechanism now to be described, so as to release the sleeve 392 to the action of its spring 393. Thereupon the left-hand shifter arm 400 will move into alignment with the ear 404 on the shift fork 160, which will cause the left shift clutch to be engaged each time the shaft 302 is rocked. At the same time the slide 406 will be moved toward the right so as to release the tail 414 of the flag and thereby permit the flag to be placed under the control of the overdraft control link 285. Hence, once the latches 394 and 395 have been operated so as to release the sleeve 392 the program control mechanism will function in its normal manner to bring about an automatic division operation, i. e., cause the dividend to be divided by the divisor in the conventional manner.

The latch 395 is released by rocking of a bail 452, the arms 451 and 453 of which are freely pivoted on shaft 282 (see Fig. 6). This bail is provided on its right-hand end with a finger 453 the upper end of which lies behind the left-hand end of the latch 395. Hence, the rocking of the bail 452 (counterclockwise when viewed from the right) will release the latch 395. The bail is operated by means of arm 451 thereof, which is pivotally connected to a link 450 that is operated by a mechanism which senses the zero or non-zero condition of the left-hand register dials 22. This sensing mechanism is not here shown but it is believed sufficient to mention that the sensing mechanism is so constructed that when the carriage is in its extreme right-hand position the sensing mechanism will be operated to cause a rocking of the bail 452 and release latch 395.

It can also be mentioned that the latch 395 is somewhat shorter than the latch 394 so that when the latch 395 is released the spring 393 will cause the sleeve 392 and shift arms 400 and 403 secured thereto, to escape slightly to the right until it contacts the latching face of the longer latch 394. Consequently, once the sensing mechanism for the numeral wheels has been artificially caused to sense a zero, the shifter arms and sleeve 392 will be permitted to escape slightly to the right so as to thereafter be under the control of the longer latch 394 alone.

The latch 394 is adapted to be released under the control of the highest order transfer pin 91. For this purpose the over-draft control link 285 (Fig. 6) carries a stud 454 which lies above an arm 455 formed on the left-hand end of a bail 456 which, like the bail 452, is freely pivoted on the shaft 282. The arm 455 is provided with a suitable nose, not shown, which is adapted to be engaged by the pin 454 when the link 285 is moved forwardly in response to a tens-transfer affecting the highest order transfer pin 91. The arm 455 will thereby be rocked (counter-clockwise as viewed from the right). At its right-hand end the bail 456 is provided with a finger 460 which lies behind the left-hand end of the long latch 394.

When a transfer occurs which affects the highest order pin 91, the finger 460 will be moved forward so as to rock the long latch 394, thereby releasing the sleeve 392 and the shift arms 400 and 403 to the influence of the spring 393 which will thereupon shift the assembly to the right so as to bring the arm 400 into line with the ear 404 on the left shift fork 160. This will effectively reverse the direction of carriage shift under the control of the program control mechanism and at the same time will cause the slide 406 to release the tail 414 on the flag 290 so as to enable the flag to be controlled by the over-draft control link 285 as in a normal division operation. The division control mechanism will thereafter operate in a normal manner until the carriage reaches its extreme left-hand position where the pawl on the carriage will cause the latch 261 to be disabled. Means are also provided for tripping the long latch during a carriage shifting operation with the carriage in its extreme right-hand position. As shown in Fig. 7, the bail 456 is provided with an upstanding finger 470 which lies in front of a lever 472 pivoted at 473 on an extension of the plate 208. The lever 472 is also provided with a rearwardly extending arm which carries a roller 476 that lies beneath the left-hand end of the lever 204 (right-hand end in Fig. 7). Consequently, when the lever 204 is shifted toward the left as a result of an operation of the override pawl 210, the left-hand end of the lever 204 will be forced downwardly due to the cooperation of the roller 217 with the inclined cam face 216 and thereby cause the lever 472 to be rocked, thereby engaging the tail 470 to rock the finger 460 forwardly and cause the long latch 394 to be released. The release of the long latch 394 by the lever 472 occurs during the attempted shift, or third, cycle. Thus there will be three idle cycles of operation upon the initiation of a division operation with the carriage in the extreme right-hand position.

As will be explained more fully hereafter, in the preferred form of my invention I provide automatic locks against operation of the square root mechanism except when the operation is started with the carriage in its extreme right-hand position. With the carriage in this extreme right-hand position the release of the division control mechanism, which mechanism is utilized in the extraction of square root, will condition the machine for shifting of the carriage to the right. However, the carriage is in that position, and with the division aligning mechanism described in said Machado patent, three cycles are utilized to release the both latches 394 and 395 to permit the sleeve 392 to be shifted to the right by means of the spring 393. This shifting of the sleeve 392 on the shaft 302 brings the left shift arm 400 into alignment with its associated ear 404, although the shaft 302 is held in its adjusted position to the left. Thereafter overdrafts in the mechanism will be effective to cause a left shift of the carriage, the same as in conventional division. As mentioned before, these three cycles are utilized in the preferred form of my invention to condition the square root control mechanism for automatic operation of the machine in a modified division operation.

II. SQUARE ROOT MECHANISM

The mechanism heretofore described for the most part is conventional, and is shown in the patents and applications previously referred to. My invention relates primarily to a mechanism which is adapted to be inserted in such a conventional machine, and which is operable, in continuous operation, to control the automatic extraction of the square root of a radicand registered in the accumulator dials 22. It will be understood that the machine shown in the drawings and patents above mentioned, is used to illustrate a preferred form of machine to which my invention can be applied, but my invention is not limited thereto for it could be applied to any conventional calculating machine, with certain minor changes.

The extraction of a square root can be considered as the performance of a division operation with a progressively changing divisor, i. e., the division by consecutive odd numbers, the divisor being changed between each continuous cycle of operation of the machine. The extraction of square root can also be considered as the subtraction of consecutive odd numbers. The two ideas are basically the same, as normal division is the repeated subtraction of a constant value (the divisor). In my preferred form of invention I utilize the conventional division mechanism to maintain the machine in a continuous subtractive operation, continuing the subtraction to an overdraft which enables the division control mechanism to cause the multicycle operation of adding back the value subtracted to correct the overdraft, shifting the carriage one order to the right and finally initiating another continuous subtraction operation. It will be understood that this division operation is modified in two respects:

1. The divisor being subtracted from the accumulator dials 22 is constantly changing in order to subtract consecutive odd numbers in consecutive cycles of operation, which change must take place, or must be made, during the portion of the cycle of operation preceding the digitation operation, and—

2. The reducing of the selection mechanism value by "1" after the correction of each overdraft, and before the shifting of the carriage conditions the selection mechanism for operation in the next order.

These modifications are explained in the Table of Manual Operations Required for the Extraction of Square Root previously mentioned herein.

The first steps of manual extraction of square root, and also one of the first steps of the extraction of square root by manual control of a calculating machine, is the setting-off of the factor in groups of two to the left of the decimal in the radicand and beginning operation under the right-hand figure of the leftmost group. Similarly, one of the first operations that an automatic machine must perform, in the extracting of square root, is to select the order in which the operation will begin. That is, if the radicand is 625., the operation must begin in the order under the "6." On the other hand if the factor is 62.5, then the operation must begin under the "2." It would be obvious that this initiation of operation could be handled by placing the factor in the register beginning either in the register dial of the highest order of the keyboard or in the dial aligned with the next to the highest order of the keyboard, and beginning machine operation in the next to the highest order. Such a method, however, requires a mental operation on the part of the operator and is therefore apt to involve error in the entry of the factor in the correct orders of the machine. While this method is perfectly feasible, I prefer to place the factor in the leftmost register dials and to automatically determine whether the operation will begin in the 10th or the 9th order of the actuating mechanism (assuming that the machine is a ten bank machine as shown in Fig. 1). I prefer to handle this problem by use of what might be called decimal point keys to initiate the division operation.

1. Initiating keys

It will be obvious that all square root operations could be initiated by the depression of a single key, or operation of a single lever. However, I prefer to place a plurality of keys along the front of the keyboard, in line with the keyboard decimal markers 43, and depress the key aligned with the decimal point of the radicand. In my preferred form, the radicand is set into the left-hand keys of the keyboard and then transferred into the register dials, as by depression of the dividend entry key 51 with the "9" tabulator button 50 locked down. Then the control key in line with the decimal point of the radicand is depressed to initiate the extraction operation in the proper order. As shown in Fig. 1, I provide a plurality of decimal point, or initiation, keys 500, each aligned with the decimal point marker 43 between the respective orders of the keyboard. In my preferred construction, the keys 500 to the right of the odd numbered orders of the keyboard (that is to right of the 1st, 3rd * * and 9th orders) initiate the extraction of the square root in the 9th order of the selection mechanism. On the other hand, the square root initiating keys 500 to the right of the even orders of the keyboard (that is, 2nd, 4th * * and 10th) initiate the extraction of square root in the 10th order of the selection mechanism. The mechanism for this will be explained shortly but for the moment it is desirable to point out that pointing-off of the radicand into the proper groups of two takes place automatically from the depression of the key 500 located in line with the decimal point marker 43 of the radicand when it was inserted in the keyboard for transferring into the dials 22 by the depression of the dividend entry key 51.

In order to facilitate the placing of the decimal point in the answer, I prefer that the keys be numbered as shown in Fig. 1. When the decimal point is to the right of either the 10th or the 9th order, the keys to be depressed will be marked "9" and the counter decimal point marker 44 can be slid along its rail until it is in line with the tabulator key 50 marked "9." This automatically gives the proper decimal point in the root, for there is a single group of two digits to the left of the decimal point in the radicand and therefore will be a single digit to the left of the decimal point in the answer. Similarly, if the decimal point lies to the right of either the 8th or the 7th orders, the appropriate square root initiating keys 500 are marked "8," and if the decimal point marker 44 is slid on its rail to be in alignment with the tabulator key 50 marked "8," the decimal point in the root will be properly marked off, as in that case there are two groups of two in the radicand. In the same manner the square root initiating keys 500 to the right of the 6th and 5th orders are marked "7," those to the right of the 4th and the 3rd orders are marked "6" and those to the right of the 2nd and 1st orders are marked "5." The square root initiating key 500 to the left of the 10th order is marked "0" (which is used as an indication for "10") and is used when the square root of a decimal value is being taken. In this case the decimal marker 44 is placed in line with the "0" tab key 50 and as many zeros will appear in the counter dials 23 as necessary to give a correct answer. In cases where the square root of a decimal is being taken, the decimal point is located to the left of the keyboard and the radicand is entered on the keyboard from that decimal point. Thus, if the decimal is .625, the "6" will be entered in the 10th order, the "2" in the 9th and the "5" in the 8th. On the other hand, if the decimal is .0625, the "6" will be entered in the 9th order, the "2" in the 8th and the "5" in the 7th. In all such instances, the "0" key 500 will be depressed to initiate the extraction of square root, which causes the operation to begin in the 9th order of the machine. It is interesting to note that although the extraction of square root of whole or mixed numbers may begin in either the 10th or the 9th order, the operation always begins in the 9th order for a decimal radicand. Thus, the "0" key 500 is always used in extracting the square root of a decimal, the radicand being placed in the keyboard with the aligned decimal marker 43 used to indicate the decimal point thereof, and the root appearing in the counter dials 23 will have the proper number of zeros in the root.

The square root keys 500 are pivotally mounted on bellcranks 503 (see Fig. 8) which are pivotally mounted on a cross-shaft 501 journalled in suitable bearings in the side frames of the machine. The bell cranks 503 are provided with tails 504 adapted to abut against a second cross-shaft 502, which second shaft is also suitably journalled in bearings in the side frames of the machine. The bellcranks and their associated keys 500 are urged in an upward direction by light springs 505 tensioned between the tail 504 of each bellcrank and the counter-control shaft 333. The bellcranks 503 are held in proper spaced relation on the shaft 501 by means of collars 506 pinned to the cross-shaft 501 and by the levers 510 and 511.

Each key bellcrank 503 has associated therewith a lever 510 or 511. The levers 510 are pinned, or otherwise rigidly secured, to the shaft 501 and cooperate with the square root keys 500 to the right of the odd orders of the keyboard. The levers 511, on the other hand, are pinned, or otherwise rigidly secured, to the shaft 502 and cooperate with the bellcranks 503 to the right of the even numbered orders. Each lever 510 carries a stud 512, and each lever 511 carries a stud 513, which studs are adapted to engage the underside of bellcranks 503, and thereby cause rocking of either lever 510 or lever 511, and their respective shafts 501 or 502, upon depression of the respective square root control key 500. It can here be noted that rocking of shaft 501 is operative to initiate operation of the square root mechanism in the 9th order, while rocking of shaft 502 is operative to initiate operation in the 10th order.

It will be understood that the square root initiating keys 500 are held in an upright position by the apertures in the cover through which they extend and are urged in an upward direction by the springs 505. Depression of such keys operates the bellcranks and they in turn rock the levers 510 or 511, to rock the control shafts 501 or 502 as the case may be.

2. Pin setting levers

The left end of shaft 501 carries an arm 518 rigidly secured thereon, on the free end of which arm is pivotally mounted a rearwardly extending link 520. Similarly, shaft 502 carries an arm 519 pinned, or otherwise rigidly secured, to the left end thereof, the free end of which arm is pivotally secured to the front end of a rearwardly extending link 521. The rear ends of the links 520 and 521 are pivotally secured to the bellcrank latches 522 and 523, respectively, as shown in Fig. 9. These two bellcrank latches are pivotally mounted on the left-hand control plate 144, by any suitable means, such as screw 525. The outer latch 522 is provided with an ear 524 which extends over the inner latch 523, so that rocking of the outer latch 522 clockwise will also rock inner latch 523 in the same direction, while the inner latch 523 is free to rock by itself. Both latches are provided with latching shoulders 526 which are adapted to be engaged by studs 532 on outer pin lever 530 and inner pin lever 531, and both latches are urged into engagement with their respective studs (counter-clockwise in Fig. 9) by springs 527, one tensioned between the outer latch 522 and pin lever 530 and another tensioned between the inner latch 523 and inner pin lever 531.

The two pin levers 530 and 531 are pivotally mounted on the control plate 144 by any suitable means, such as screw 533. The two levers are urged in a counter-clockwise direction by relatively strong springs 534 and 535, respectively, and are held against rocking from the force of such springs by the two bell-crank latches 522 and 523 previously mentioned. The upper arm of the outer, or two-pin, lever 530 is provided with an inwardly turned ear 536 adapted to cam a pin 606 on the pin wheel 600 inwardly, upon rocking of the lever. Similarly, the inner lever 531 is provided with an inwardly turned ear 537 which is adapted, upon rotation of the lever, to cam another pin 606 on the pin wheel 600 inwardly. The inner lever 533 also has an upwardly extending arm 538 which is provided with a latching stud 539 and with an inwardly turned ear 540. The outer lever 530 has a stud 541 riveted on the inside thereof which contacts the forward edge of the inner lever 531, so that restoration of the inner lever to its normal, or latched, position also restores the outer lever 530 to its latched position.

It is obvious that the inner (one-pin) lever 531 is rocked in all extractions of square root, that is, it is rocked by depression of any of the square root keys 500. The outer (two-pin) lever 530, on the other hand, is released only in those operations in which the extraction of square root is to begin in the 9th order instead of in the 10th.

The release of the inner, or one-pin, lever 531 by depression of a square root control key 500 is used to initiate operation of the machine, that is, to close the motor switch, cause engagement of the clutch and release the division control mechanism while setting a modifying mechanism to cause certain operations not normally caused in connection with division. This initiating means comprises a long link 545 (see Fig. 9) the rear end of which is pivotally secured to an upper portion of the inner lever 531. The forward end of the link is pivotally secured to a depending arm 546 pinned to a short shaft 547 extending from the control plate 144 to the main frame plate 53. Thus, the link is pulled rearwardly and the arm 546 and shaft 547 are rocked clockwise by the counter-clockwise rocking of the lever 531. The shaft 547 is, therefore, rocked with the initiation of every square root operation. Rocking of this shaft serves three immediate purposes: (1) to set the counter control for unlike registration of the counter dials 23 (if not in that position), so that during the ensuing operation, the machine, while operating in a negative direction, will count positively in the register 23; (2) to initiate a division operation; and (3) to clear the keyboard.

3. Counter-control setting

The first purpose is secured by mounting an arm 548 on the short shaft 547 (see Fig. 8). This arm 548 carries a stud 549 which lies immediately to the rear of the arm 334 of the counter-control mechanism. Thus the clockwise rocking of the shaft 547 (when viewed from the left as shown in Figs. 8 and 9), causes rocking of the arm 334 in a clockwise direction, thereby pulling link 335 forwardly and setting the counter-control button 336 in its forward, or unlike registration, position. The arm 334 is mounted on the counter-control shaft 333, as previously mentioned, and rocks the arm 332, also pinned to the shaft 333. The rocking of the arm 333 pulls the link 330 forwardly and sets the counter for unlike registration, as previously mentioned.

4. Initiation of division

The rocking of the short shaft 547 is also utilized to initiate a division operation. This is accomplished by means of a short arm 553 also rigidly mounted on the shaft 547 (see Fig. 8). The lower end of this arm carries a pin 554 which is embraced by a slot 555 in an arm 556. The arm 556 is rigidly mounted on a transverse shaft 557 suitably journalled in brackets attached to the base of the machine. The right-hand end of the shaft 557 carries an arm 558, as shown in this figure. Referring now to Fig. 12, it will be seen that the arm 558 carries a pin 559 upon which is mounted the forward end of a link 560. The rear end of the link 560 is pivotally mounted on the lower end of a two-armed lever 561, the lever being pivotally mounted on a stud 562 extending outwardly from the control plate 127. The upper end of the upper arm of the lever 561 carries a roller 563 which is adapted to engage the camming face 564 of a bellcrank 565. The lower arm of the bellcrank 565 is pivotally connected to a short link 566, the rear end of which is pivotally connected to a camming arm 567. The camming arm is mounted on the screw 229 which mounts the latch 228, previously mentioned. The first portion of the rocking of the two-armed lever 561, by the means described, rocks the bellcrank 565 clockwise, thereby pulling the link 566 and arm 567 forwardly sufficiently far to just pass the roller 233 mounted on the division control trigger 234. The arm 567 serves an important purpose in square root extraction as it modifies the operation of the division mechanism, in that it conditions the machine for a clearing operation of the square root control mechanism at the termination of the division operation proper as will be hereafter described. It is only necessary to move it slightly forward of the roller 233 as the subsequent initiation of a division operation, i. e., release of trigger 234, will cam this arm 567 forwardly a distance sufficient to cause operation of the parts which it controls. The two-armed lever 561 also has an integral inwardly extending ear 658 adapted, after movement of the arm 561 sufficient to set the arm 567, to engage a roller 569 on the latch 228 previously mentioned. By the means just mentioned, the depression of a square root control key 500 and the consequent spring-powered operation of the inner pin setting lever 531 causes the rocking of the shaft 547 which sets the counter and also rocks the shaft 557 to initiate a division operation.

5. Keyboard clear

Finally, the rocking of the shaft 547 as above described also operates the clearing bail 355 to clear the keyboard of any values that might be therein. It will be obvious that, as it is necessary in the extraction of square root to positively set the selection slides with each cycle of operation, the machine would be jammed if a keyboard value were inserted and locked in the keyboard prior to the initiation of the extraction of square root. It is therefore essential that the keyboard be cleared before beginning of the extraction of square root. I prefer that this be done at the initiation of the operation, at the time of setting of the pins in the pin wheel, as by the rocking of the shaft 547. The shaft 547 carries an arm 573 rigidly secured to the right end thereof. This arm 573 extends downwardly and lies in front of an extension 574 on the keyboard clearing bail 355. The keyboard clearing bail 355, as mentioned previously, is pivotally mounted in the side frames of the machine and, when rocked, engages the turned-under ears 354 at the forward end of the individual key latches 350. Thus, the rocking of the inner pin lever 531, by means of the shaft 547 and arm 573, rocks the keyboard clearing bail 355 to erase all values from the keyboard, simultaneously with the energizing of the motor and the engaging of the main clutch.

6. Safety latches

The inner pin setting lever 531 is normally latched against release by a second latch 580 (see Figs. 9 and 10). The latch 580 has a shoulder 581 adapted to engage the pin 539 on the upper end of the inner pin setting lever 531. The latch 580 is pivotally mounted on a stud 582 affixed to the left control plate 144. An arm 583 is also pivotally mounted on the stud 582, and is shown in the drawings as lying inside of the latch member 580. The latch arm 580 has an inwardly turned ear 584 and the arm 583 has a corresponding inwardly turned ear 585, the two ears being connected by a spring 586, as shown in Fig. 10. Thus, the two arms 580 and 583 normally act in unison, so that if the inner arm 583 is rocked clockwise the latch arm 580 is also rocked clockwise to position the shoulder 581 behind the pin 539 and lock the pin setting lever 531 against release. On the other hand, if arm 583 is rocked counter-clockwise, then latch arm 580 also rocks counter-clockwise to unlatch pin 539 and lever 531—to permit operation of the latter. The arm 583 is normally urged counter-clockwise by a suitable spring 587 tensioned between it and a stud on the control plate. Rocking of arm 583 and latch 580 under the urgency of the spring 587 normally is prevented by two means: one, under the control of the carriage so as to prevent operation of square root in all carriage positions except the extreme right-hand position; and the second, under the control of the square root control cam shaft (later to be described) in order to prevent operation of the square root mechanism unless such mechanism is in a proper cleared position.

The control from the carriage position will first be described. The inner arm 583 is connected by a short link 588 to a bellcrank 589 pivotally mounted on a stud 590 on the control plate. The bellcrank 589 has a relatively long ear 591 that extends to the right so as to underlie the front carriage rail 99 when the carriage is in any position other than the extreme right-hand position. The carriage rail 99 rocks the bellcrank and its integral ear counter-clockwise as viewed from the left (as in Fig. 10), thereby rocking the arm 583 forwardly (clockwise). The tension of spring 586 pulls the latching arm 580 forwardly or clockwise in Fig. 10, thereby latching the inner pin lever 531 in its inoperative position. This prevents the release of the pin lever in any position of the carriage except the extreme right-hand position. Blocking operation of the inner pin lever 531 prevents the closing of the motor switch, the engagement of the motor clutch, and prevents the setting of the division control mechanism. It might also be mentioned that the outer pin arm 530 is provided with a stud 541 that engages the forward edge of the inner lever 531. Thus, the blocking of the operation of the inner lever likewise prevents operation of the outer one. Parenthetically it is preferred that square root be initiated only with the carriage in the extreme right-hand position for several reasons: (1) to insure accuracy and full capacity, and (2) there are certain advantages through simplification of safety interlocks which otherwise might be quite complicated.

When the carriage is in its extreme right-hand position, the bellcrank 589 is free to rock upwardly under the urgency of spring 587 which urges the arm 583 rearwardly. Thus, the arm 583 and the latch arm 580 are free to rock, under the urgency of the spring 587, counter-clockwise thereby freeing the inner pin lever 531 from the latch 580 and enabling the operation of the square root mechanism.

This latching mechanism is also under the control of the angular position of the square root cam shaft in order to prevent operation if the square root mechanism is not in a proper condition. To secure this control, I prefer to provide a roller 592 on the upper end of the arm 583. The roller 592 is associated with a centralizing disk 614 mounted on the cam shaft 615. As it will be explained hereafter, the cam shaft is rotated from the home, or full-cycle, position shown in Figs. 9 and 10 upon operation of the square root mechanism. The centralizing plate 614 has an arcuate notch 613 adapted to fit the roller 592, so as to permit the arm 583 to rock counter-clockwise when freed from the control of the front carriage rail 99, if the cam shaft 615 is in its full-cycle position. However, rotation of the cam shaft 615 from such full-cycle position rotates the plate so roller 592 no longer registers with notch 613, thereby blocking rearward rocking of the arm 583 to unlatch pin setting arm 531. Further, the first cycle of operation in square root causes rotation of shaft 615, and consequently disk 614, which rocks the arm 583 clockwise, thereby rocking the latch arm 580 clockwise so as to engage the pin 539 when the pin setting arm 531 is restored to its normal position. Such restoration occurs during the first cycle of operation of the machine after initiation of square root, as will be explained hereafter.

7. Pin wheel

The pin levers 530 and 531 are operative, when released for rearward movement as above described, to set the pins of a pin wheel 600, the construction of which is best shown in Fig. 11. The pin wheel 600 is rotatably mounted on the control plate 144 by any suitable means such as screw 601. This pin wheel comprises a gear wheel 602 adapted to be driven by a pinion 599 mounted on the left end of the drive shaft 70. In my preferred form of construction, I provide a gear ratio between the pinion 599 and the pin wheel 600 of 1 to 4 so that the pin wheel will rotate through an arc of 90° for each cycle of operation of the machine. Thus, in the figure shown, the pinion 599 will have eight teeth and the gear wheel 602 will have 32 teeth. Associated with the gear wheel 602 is a plate 603 held in spaced relationship to the gear 602 by a plurality of spacing rivets 604—thus forming the two members into an integral structure. The pin wheel is provided with a plurality of aligned apertures 605 extending through both the gear 602 and the plate 603. These aligned apertures form suitable seats for sliding pins 606. Each of the pins is provided with a pair of centralizing grooves 607 around which is threaded a suitable tension spring 608 to hold any pin in its adjusted position. It might be mentioned that in their normal, or inoperative, positions the pins 606 do not extend through the plate 603 and that they become operative to control square root extraction only when they are projected through the plate 603. For purposes of exemplification, it will be assumed that the pin 606 standing in the position closest to the drive pinion 599 is in the 0° position. It will be seen by referring to the drawings (Fig. 9 particularly) that the pin 606 standing in the 0° position will be engaged by the camming ear 537 of the inner pin lever 531, the pin lever being operative to cam the pin inwardly (to the right in Fig. 11) so as to cause the pin 606 to project beyond the plate 603. It will also be obvious that the outer pin lever 530 will operate through the camming ear 536 to cause the pin standing in the 270° position to also be pushed through the plate, if the outer pin lever 530 is operated in the initiation of square root. The spring 607 holds the pins in their adjusted position until forced in one direction or the other so that when a pin is projected by the camming ears 536 or 537, it will retain such projected position until positively forced back into its normal position.

It can be mentioned at this point that a restoring cam 609 is secured to the control plate 144 angularly intermediate the 180° and 270° pin positions. Thus, a projected pin is restored to its inoperative position during the third cycle of operation, or in the event two pins are projected, then the first one is restored during the third cycle of operation and the one originally in the 270° position is restored during the fourth cycle of operation.

It can also be mentioned here that the inner pin setting arm 531 is restored to its normal, or inoperative, position during the first cycle of operation. It will be latched in its restored position by latch arm 580 (and also by latch 523 if the square root key is released), as the first cycle of operation causes a 60° rotation of shaft 615 and plate 614. Restoration is secured by the pin in the 90° position (which cannot be projected through the pin wheel) engaging the ear 540 on the upper end of pin setting lever 531 to rock it forwardly (clockwise in Fig. 9) to its normal position. Restoration of pin setting lever 531 also restores its companion lever 530 (if the latter has been unlatched) by means of stud 541 on lever 530.

8. Cam shaft feed

In the mechanism of my invention it is necessary to make progressive selections, order by order, during the extraction of square root (which, as indicated above, can be considered either as a divisional operation with a progressively changing divisor or as the continuous subtraction of successive odd numbers). For the purpose of controlling the order in which the selection is being made, I provide a cam shaft 615 (see particularly Figs. 10 and 15). This cam shaft controls the order in which the selection is being made and its operation will be explained in detail hereafter under the heading of "Selection control mechanism." For the present it should be noted that at the beginning of a square root operation it is necessary to select the order in which the first selection will be made —in the 10th order if the number has a single digit in the left-hand group and in the 9th order if the number has two digits in the left-hand group. Thereafter the operation of the shaft 615 will be under the control of the carriage.

In order to properly set the cam shaft 615 at the beginning of a square root operation, I provide a bellcrank cam follower 616 associated with the pin wheel 600 (see Figs. 10 and 18). The bellcrank 616 is pivotally mounted on the control plate 144 by any suitable means, such as screw 617. The bellcrank has a nose which projects into the path of travel of the projected pins 606, lying between the zero and 90° position, as it is desirable that the cam shaft 615 be positioned for the 10th order operation in the first cycle of operation. The bellcrank, as shown in Fig. 18, is urged into the path of the pins by a suitable yieldable means, such as spring 628 tensioned between a stud on a link 660 mounted on the bellcrank and the frame plate. The bellcrank 616 has an upwardly extending arm 618 which is provided with a slot 619. Associated with the upper arm 618 is an arm 621 rigidly secured to a ratchet hub 622 rotatably mounted on the shaft 615. The arm 621 carries a long pin 620 which is embraced by the slot 619, whereby the rocking of the bellcrank 616 rocks the arm 621 and its integral hub 622. The hub 622, as shown in Fig. 15, is provided with six ratchet teeth. Associated with hub 622 is a second ratchet hub 623, the teeth of the two hubs acting together to form a ratchet drive for the shaft 615 from the operation of the bellcrank 616. This drive, which is used during the first one or two cycles of operation after the initiation of a square root operation, must be yieldable as thereafter the cam shaft is under the control of the carriage shifting mechanism. Therefore, the second hub 623 is provided with a slot 626 which engages a projection 627 integral with a collar, or hub, 642 pinned to the shaft 615. A compression spring 625 lies between the collar 624 and the second hub 623, whereby the second hub is pushed (to the left in Fig. 15) to engage the first hub 622.

It can be mentioned here that the first operation or rotation of the shaft 615 must be a half step in order to bring the highest, i. e., the 10th, order control mechanism into condition for operation. As mentioned previously, satisfactory results can be secured by controlling the square root selection mechanism for the first six orders on the left and thereafter going into a straight division operation. I therefore have six cams on the cam shaft to control the operation in the highest six orders of the machine and have a neutral position half way between the first and the last step. Therefore it is necessary to feed a half step to initiate the square root operation, and after the operation is finished and the mechanism cleared, the cam shaft will be stopped in a centralized position half way between the sixth and the first position. This feeding arrangement is easily secured by providing that the two ratchet hubs 622 and 623 are a half step apart in the centralized position. This is secured by the carriage operated drive means to be described next. It is obvious that if the two ratchets are a half step apart, the first operation of the bellcrank 616 will be to feed the cam shaft 615 half a step and in the second operation thereof to feed it a full step, or one-sixth of a revolution. It is also obvious that if two pins have been projected through the pin wheel (by the simultaneous operation of the two pin setting levers) the bellcrank 616 will be rocked a full 60° step the second time (by the second pin), which will rock the shaft 615 a full 60° and thereby rock the control mechanism from the 10th to the 9th order of the keyboard.

The cam shaft 615 thus is rotated 30° or 90° from the rotation of the pin wheel at the start of the square root operation, during the conditioning phase of square root operation. It has previously been mentioned that the projected pins 606 are restored to their inoperative position after they pass the 180° mark, actually late in the third cycle of operation, and that only two pins can be projected at the most. It is possible for the shaft 615 to be rocked only twice from the pin wheel 600 at the 30° and sometimes also the 90° positions. Thereafter the shaft is rotated 60° toward the end of each ordinal shift of the carriage by means operated by the shifting of the carriage.

As shown in Fig. 15 (which shows the carriage in its extreme left-hand position, at the termination of a square root operation), the front carriage rail 99 of the carriage is provided with a number of projections 635 on the extreme left-hand end thereof. These projections 635 are arranged ordinally and are effective to rotate a mutilated gear wheel 636 (see Figs. 15 and 17) as the carriage shifts from the extreme right-hand position toward the left, for the other orders during which the square root control, or programming mechanism, is operative. These projections or teeth 635 are so arranged that they engage the points of the gear wheel, or star wheel, 636 immediately before the end of the shift. As shown in Fig. 17, this star wheel 636 is a 6-tooth gear with one tooth removed, as at 633. This mutilation is to provide for the termination of cam shaft rotation in the 5th order selection mechanism. The 5th order may be reached after six or five ordinal automatic selections by the square foot control mechanism, the number depending upon whether operation began in the 10th or the 9th orders. Operation of the shaft must terminate in the 5th order of the selection mechanism, irrespective of the number of steps by the pin wheel control before the movement of the carriage becomes effective to position the cam shaft, and the mutilated gear 636 is a simple means of accomplishing such variation.

It will be recalled that the extraction of square root will begin either in the 10th or the 9th order and the progressive changing of the keyboard value will terminate in the 5th order. However, the cam shaft must be cleared to the zero position in order to clear the control mechanism and prevent jamming of the machine, so that it is necessary that regardless of the steps required, the wheel 636 be in full-cycle position at the end of each operation. The gear 636 is centralized with the mutilated portion uppermost and rocked just sufficiently that the first tooth will be engaged by the leftmost projection as the carriage shifts from the extreme right-hand position towards the left. It will be understood that before square root can be initiated the carriage will be shifted to the right and the leftmost tooth 635 will lie to the right of the gear wheel 636.

It will be seen by referring to Figs. 20 and 21, that the gear wheel 636 normally lies out of the plane of the teeth 635. This gear wheel 636 is slidably mounted on a square shaft 637 journalled in brackets 638 and 639 mounted on an auxiliary frame plate 145. The hub 640 of the gear 636 has an annular groove 641 which engages a pin 642. The pin is mounted on an arm 643 which arm is pivotally mounted on a stud 644, also on the auxiliary plate 145. The arm 643 is spring-urged rearwardly (in a clockwise direction, as shown in these figures) by a suitable spring 742, and is latched in the inoperative position shown in these figures. Mechanism controlling the clutching of the programming mechanism drive shaft to the drive shaft 70, to be described hereafter, also releases the arm 643, thereby moving the gear 636 into the plane of the teeth 635. Thereafter the shifting of the carriage toward the left will cause rotation of the gear 636 and square shaft 637 through the steps necessary for the extraction of square root, leaving the gear in the home, or inoperative, position after operation in the six orders covered by the square root control mechanism. A helical gear 645 is mounted on the inner end of the square shaft 637 (to the left in Figs. 20 and 21) which gear meshes with a second helical gear 646 (Fig. 15). The second helical gear is mounted on a stub shaft 647 that is journalled in the auxiliary plate 145 and the end 648 of the bracket 638. Also rigidly secured to the shaft 647 is a small pinion 649 which is enmeshed with a similar pinion 650 rigidly secured to the cam shaft 615.

It is obvious that after the arm 643 has been released, thereby permitting the gear 636 to move into the plane of the teeth 635, shifting of the carriage will rotate the gear 636 and consequently the cam shaft 615. It will be understood that as I provide six orders in the programming device for square root, it is necessary to rotate the cam shaft 615 one full step or one-sixth of a revolution for each order of the program mechanism.

The cam shaft feeding means heretofore described is thus operative to give the cam shaft 615 a half a step, or 30° of angular rotation, in the first cycle of square root operation (i. e., the portion of operation taken by the pin in the 0° position moving to the 90° position). This, as will be explained hereafter, conditions the square root selection mechanism for operation in the 10th order. If two pins have been depressed by the simultaneous rocking of the two pin setting levers 530 and 531, the second pin will also rock the bellcrank 616 to give the cam shaft 615 a second angular movement of a full step, or 60°. This latter step conditions the machine for operation in the 9th order as is necessary when the left-hand group in the radicand consists of two digits. Thereafter the arm 643 is released, permitting the gear 636 to move into the plane of the teeth 635, and that places the cam shaft under the operation of the shifting of the carriage.

The cam shaft 615 is held in any adjusted position by a suitable centralizing mechanism which can be of any desired construction. For purposes of exemplification, I show a star wheel 860 (see Fig. 26) which is engaged by a ball 861 that is spring-urged into engagement with the valleys of the star wheel by a suitable spring 862. The spring and ball detent is carried by any suitable means, such as casing 863.

I prefer to provide a mechanism for driving the cam shaft 615 to its home, or centralized, position at the end of the square root operation. It will be recalled that this centralized position is a half step ahead of the final position of the cam shaft, such position being determined by the last movement of gear 636. The mechanism for doing this is shown particularly in Figs. 19 and 20 and comprises a single tooth gear 755 rigidly secured to the shaft. This single tooth is undercut as shown in Figs. 19 and 20. A live pawl 756 is adapted to engage this single tooth. The live pawl 756 is pivotally mounted on an arm 757, which in turn is pivotally mounted on the stub shaft 647. The live pawl is urged into engaging position with respect to the single tooth gear 755 (counter-clockwise in Figs. 19 and 20) by a suitable spring 758 tensioned between an ear on the live pawl and a stud on its supporting arm 757. A bifurcated link 760 is also pivotally mounted on the arm 757, extending rearwardly therefrom. The bifurcation 761 on the rearward end of the arm 760 engages a stud 762 mounted on the rockable arm 643. A suitable tension spring 759 rocks the arm 757 rearwardly (clockwise in Figs. 19 and 20) to hold the assembly tightly against the stud 762. It can be mentioned that the arm 643 carries a cam bracket 710 and roller 713 which are rocked forwardly (counter-clockwise in these figures) by the cam plate 714 mounted on the front carriage rail 99 in a position to engage the roller 713 when the carriage is in its extreme left-hand position. This is the position in which the carriage is located at the end of a square root extraction operation. Thus, at this time the arm 643 is rocked forwardly (counter-clockwise in these figures), thereby displacing gear 636 from the plane of teeth 635 and simultaneously rocking the arm 757 and live pawl 756 forwardly to positively centralize the cam shaft 615. By this means, the cam shaft 615, which was left in the 6th, or final, position by the mutilated gear, is advanced half a step by the movement of the carriage to the extreme left-hand position. Such a half-step movement of shaft 615 rotates the driven ratchet 623 half a step with respect to the driving ratchet 622, so that the first rocking of bell-crank 616 gives the necessary half step to the cam shaft 615.

9. Keyboard lock

The rocking of the bellcrank 616 in the first cycle of operation of the machine, as the pin in the 0° position goes to the 90° position, also is effective to lock the keyboard against the insertion of values therein. This is accomplished by means of the mechanism shown in Figs. 9, 10 and 8, which includes a link 660, the rear end of which is pivotally mounted on the bellcrank 616 as shown in Fig. 10. The forward end of the link is pivotally secured to an arm 661 (Figs. 8 and 9) which is pivotally mounted on a transverse shaft 662. The arm 661, as shown particularly in Fig. 8, carries a forwardly extending cam arm 663. When the bellcrank 616 is rocked counter-clockwise by the pin wheel the cam 663 is pulled rearwardly, thereby engaging the rounded nose of a keyboard locking bar 664—pushing it to the right in Fig. 8.

The keyboard locking bar 664 could extend across the full width of the keyboard, but I prefer to attach it to the decimal marker restoring slide 670 described in Machado S. N. 163,431, now abandoned, and cause this slide to also lock the keyboard latches. This end can be accomplished by forming an integral arm 671 on the slide 670, which arm engages a suitable slot in the keyboard locking slide 672 described particularly in the copending application of Machado just mentioned. The keyboard locking slide 672, as described in said application, is provided with alternate ears 673 and valleys 674. Normally the turned-over ears 354 of the key latches 350 lie in the valleys 674 of the slide 672 and are therefore free to be displaced rearwardly. However, if the slide 672 is moved to the right, the ears 673 lie behind the respective ears 354 on the key latches, so that movement of the key latches is impossible. It will be recalled that the keyboard was cleared upon the initiation of the square root mechanism, so that by the time the machine has started to cycle and the bellcrank 616 has been rocked, the keyboard is clear and the translation of the bar 664, slides 670 and 672 (to the right in Fig. 8) move the ears 674 behind the corresponding ears on the key latches. The latches are therefore rendered immovable, and it is impossible to insert a value into the keyboard.

A latching arm 675 is pivotally mounted on the right end of the decimal marker restoring slide 670 and is urged downwardly (clockwise in Fig. 8) by a suitable spring 676 tensioned between the arm and one of the transverse shafts. The latching arm is provided with a shoulder 677 adapted to engage a slot 678 in the right side frame 52 (see Fig. 3). The translation of the bar 664, spacing slide 670 and the latching arm 675 to the right (Fig. 8) causes the thick part of the arm which normally rides in the slot 678 to pass over the plate 52, thereby permitting the shoulder 677 to drop to the right of the plate and latch the assembly in its right-hand position. Latching of the arm in this position holds the keyboard locks in locking position, thereby preventing entry of a value into the keyboard until the completion of the square root operation.

The latching arm 675 is provided with an extension 679 which overlies and engages a bellcrank 680 (see Figs. 8 and 12) pivotally mounted on the transverse shaft 502. It will be recalled that at the beginning of the square root operation the shaft 557 is rocked to move link 560 rearwardly and cam arm 567 forwardly. The rocking of cam arm 567 by the division trigger 234 sets the square root clearing mechanism in condition for operation when the division operation terminates in the extreme left-hand position, as will be described hereafter. The linkage so operated causes a forward translation of a link 681 that is pivotally secured to the bellcrank 680, thereby rocking the bellcrank (clockwise in Fig. 12) to permit the arm 675 to become latched against the right side plate 52. At the termination of the clearing of the square root mechanism, the link 681 is pulled sharply toward the rear (to the right in Fig. 12), thereby rocking the bellcrank 680 and lifting the arm 675. The lifting of arm 675 unlatches the keyboard lock slide 672, and restores normal operation of the keyboard.

10. Selection mechanism drive

It will be recalled that the extraction of square root is accomplished by the continuous subtraction of consecutive odd numbers beginning with "1," "3," etc., which is the same as division by a progressively changing divisor of the same numbers. It is therefore necessary to provide a feed mechanism for setting the various ordinal selection slides to select a value of "1" on the first cycle of operation and to thereafter select "3," "5," etc. to a maximum of "17" (which subtraction gives a root value of "9," which is the highest possible in an order of the root). Such a selection must also provide for a tens-carry as the selection mechanism goes from a value of "9" to "11," which carry must be effective to raise the value in the higher order by "1" and to change the value in the particular order from "9" to "1." This selection requires a single step on the first cycle of operation and a double step thereafter. This feed can perhaps be best secured by a ratchet driving device. The drive shaft 685 for the square root programming mechanism extends transversely across the left side of the machine at the rear of the main frame, as shown in Figs. 10, 15, 18, etc. This shaft is journalled in the left-hand control plate 144 and the right-hand plate 771 of the square root programming mechanism (Fig. 16).

In the preferred form of my invention the necessary drive is secured from a cam 686 mounted on the main drive shaft 70, as shown in Figs. 10 and 18. The cam 686 rocks a drive arm 688 through the medium of a cam follower roller 687 rotatably mounted on the drive arm 688. The arm 688 (as shown in Fig. 9) is pivotally mounted on a bolt 689 carried by an auxiliary bracket 690 and is urged by a suitable spring 700 toward the cam 686. It is thus obvious that the arm 688 rocks constantly whenever the machine is in operation.

The upper end of the arm 688 is provided with a slot 691. The slot 691 embraces a pin 692 carried by a short arm 693, which arm is secured to a driving ratchet 694 rotatably mounted on the drive shaft 685 (see Fig. 15). Associated with the driving ratchet 694 is a driven ratchet member 695, pinned on, or otherwise rigidly secured to, the drive shaft 685. The two ratchet members are urged into engagement with each other by a suitable compression spring 699 mounted on the shaft 685 and lying between the driving member 694 and the left control plate 144. It can be noted that, in the preferred form of my invention, these two ratchet members are provided with five teeth each. It is common in machines of this kind for the feed gears to be 10-tooth gears, for in a decimal system it is necessary to feed in increments of one-tenth. It is therefore necessary in a square root mechanism to feed an increment of one-tenth (one tooth) on the first cycle of operation, and to move the selection slides one unit space, and thereafter to feed two teeth (two unit spaces). This is most efficiently secured by providing a 5-tooth ratchet clutch arrangement in order to provide for the feeding of two unit spaces in each order except the first. The feed of one unit space in the first order is secured by backing the driving member 695 off half a tooth space at the termination of a square root operation, or upon the shifting of the carriage from order to order.

The shaft 685 is held in a centralized position by a suitable centralizer which can be of any suitable type. For purposes of illustration I show the 36° centralizer as comprising a star wheel 696 which is engaged by a spring-pressed ball 697 mounted in a suitable casing 698 (Fig. 10).

The engagement and disengagement of the ratchet members 694 and 695 is under the control of a clutch bail 705 (see Figs. 15, 18 and 19). This bail 705 is provided with two bent-over arms, the right-hand arm 706 of which is rotatably mounted on shaft 685 and the left-hand arm 707 of which is loosely mounted in an annular slot on the driving ratchet member 694. The driving ratchet 694 and bail 705 are normally urged to the right (to clutch-engaging position) by a suitable compression spring 699, as shown. The arm 706 of the bail 705 is provided with a suitable notch 717 which engages a pin 708 carried by link 709. The link 709 is loosely mounted on cam shaft 615 and drive shaft 685, and its only purpose is to hold the bail 705 against rotation. It is obvious that the shifting of the bail 705 will control the engagement of driving ratchet member 694 with driven ratchet member 695. For this purpose the right-hand arm 706 of the bail is bent as shown in Fig. 15, to provide a camming face 710. This cam face co-operates with a cam bracket 711, which has an angular camming edge 712 adapted to cooperate with the camming ear 710 to force the clutch bail to the left. It is obvious from Fig. 15 that as the bracket 711 is rocked forwardly the clutch bail 705 is pushed to the left, or to its disengaged position. The cam bracket 711 carries a roller 713 which is adapted to be engaged by cam plate 714 mounted on the front carriage rail 99. Thus, as the carriage is shifted to its extreme left-hand position, the cam plate 711 is pushed forwardly and latched, as will soon be described, in the forward position. In this position the cam is disengaged and the drive feed is disabled.

The bail 705 is also under the control of the overdraft mechanism, as is shown in these same figures. Associated with the highest order transfer gear 86 is a bellcrank 716. The overdraft in the highest order of the keyboard causes the gear 86 and its integral flange 94 to be pushed forwardly thereby rocking the bellcrank 716 (clockwise in Fig. 15). The bellcrank is provided, as shown, with a suitable lip, or ear, 718, which engages a flange 94. The bellcrank is also provided with a slot which engages the tail of the right arm 706 of the clutch bail 705, as is shown in Figs. 18 and 19. Thus, whenever an overdraft occurs in the highest order of the machine, the bellcrank 716 is rocked (clockwise in Fig. 15) urging the clutch bail 705 to the left to disengage the feed clutch. The transfer gear and its integral flange are restored in the same cycle, but the bellcrank 716 remains in its rocked position until the clutch 694, 695 is again engaged.

The cam plate 710 is normally latched in a clutch disengaging position. As a matter of fact, the plate is always latched in a clutch-disengaging position until the third cycle of a square root extraction operation, and is temporarily latched in the clutch-disengaging position simultaneous with each overdraft and remains so until the operation in the next order commences, and remains latched when rotation of cam shaft 615 terminates with termination of operation in the fifth order. In connection with the latter contingency, the cam plate 714 engages the roller 713 to hold the plate forwardly during clearing in the terminal position. The mechanism for latching this plate in its inoperative position is shown particularly in Fig. 20. The plate 710 is mounted on the upper end of the arm 643, which also controls the axial displacement of the mutilated gear 636. This arm 643 carries a latching arm 720 pivotally mounted thereon by any suitable means such as the stud 642 which also engages the annular groove in the hub of the gear 636. The latching arm 720 is provided with a shoulder 723 adapted to engage the square stud 724 mounted on the control plate 144. The latching arm 720 is urged upwardly by a suitable tension spring 722, as shown. The latching arm 720 is provided with a forwardly extending nose 725 which is utilized to release the arm against the tension of spring 722 during the third cycle of the square root operation. Thereafter the latching arm is free of the stud 724, permitting the arm 643 to rock to the rear (clockwise in Fig. 20) in which position it remains until the arm is cammed forwardly by the plate 714 engaging the roller 713.

The means for releasing the latching arm 720 is shown particularly in Figs. 9, 15 and 20. Referring first to Fig. 9, it will be seen that an arm 730 is pivotally mounted on the control plate 144 by any suitable means such as stud 731. This arm is urged rearwardly into the path of projected pins 606 on the pin wheel 600 by a spring 743 tensioned between the arm and a stud (not shown) on the control plate 144. This arm is provided with a cam edge 732 (see also Fig. 11) adapted to be engaged by a projected pin shortly after the start of the third cycle of operation and prior to the restoring of the pin to its normal position by the cam 609. The upper end of the arm 730 is pivotally connected to a rearwardly extending link 733, the rearward end of which is loosely mounted on an arm 734. The arm 734 is rigidly secured to a transverse shaft 735 extending from the control plate 144 to the left frame plate 53.

Referring now to Fig. 15 it will be seen that rigidly mounted on the shaft 735 is an arm 736. Adjacent the arm 736 is a short arm 738, pivotally mounted on the shaft 735. The arm 736 is provided with a turned-over ear 739 and the short arm 738 is provided with a similar ear 737. A spring 740 tensioned between the two ears urges the two arms to operate together. The short arm 738 carries a stud 741 which engages the extension 725 of the latching arm 720. It is thus obvious that during the third cycle of operation the projected pin will engage the cam surface 732, thereby rocking the arm 730 (clockwise in Fig. 9). This rocking of the arm 730 causes the shaft 735 to rock (counterclockwise in Fig. 9, clockwise in Fig. 20), thereby depressing the arm 736. Rocking of the arm 736 causes the short arm 738 likewise to rock (clockwise in Fig. 20), thereby releasing the latching arm 720 and permitting the arm 643 to move rearwardly under the force of the compression spring 742 compressed between the helical gear 645 and the hub 640 of the mutilated gear 636. The rearward movement of arm 643 and its integral cam plate 710 releases the clutch bail 705 and permits it to move to the right to cause engagement of the two ratchet clutch members 694 and 695. The rocking of the arm 730 is timed to occur after the driving stroke of lever 688, so that while the bail 705 is released during the third cycle of operation, the drive shaft 685 and its clutch 694, 695 is conditioned for operation in the third cycle but is not actually driven until the fourth.

The arm 736 extends rearwardly, as shown in Fig. 19, and carries a roller 750 intermediate its ends, which roller is vertically aligned with the cam shaft 615. A six-pointed star wheel 751, the teeth of which are blunted as shown, is rigidly secured to the cam shaft 615 in the same plane as the roller 750. It will be recalled that the home position of the cam shaft 615 is one-half a step between the final and first angular positions thereof, and that the shaft is rocked the half step during the first cycle of operation. As shown in Fig. 19, the star wheel 751 is mounted on the shaft 615 so that in the home position of the shaft one of the blunted teeth of the star wheel 751 engages the roller 750, thereby rocking the arm clockwise and holding it in that position. Upon the first cycle of operation the cam shaft is rotated half a step or 30° so that the roller will lie between adjacent teeth on the star wheel 751, thereby permitting the arm 736 to rise. During each subsequent partial rotation of the cam shaft 615 to condition a lower order for control of the selection mechanism, the arm 736 will be rocked downwardly by the tooth of the star wheel 751 and will immediately rock upwardly from the force of the tension spring 743 secured to the arm 730.

The rearward end of the arm 736 also carries a stud 752 adapted to cooperate with the right-hand arm 706 of the clutch bail 705. When the clutch bail is in its right-hand, or operative, position the stud 752 will engage the lower edge of the right-hand arm 706, preventing the roller 750 from engaging the valley between adjacent teeth of the star wheel 751. However, when the clutch bail 705 is moved to the left to the disengaged position by the overdraft bellcrank 716, the arm 736 is urged to rise by the force of spring 743, thereby blocking the return of the clutch bail 705 to its right-hand, or operative, position upon the correction of the overdraft. The stud 752 blocks the return of the clutch bail 705 for nearly two cycles of additive correction of the overdraft and most of the cycle during which the carriage is shifted one step to the left. During the first part of the shifting step the movement of the carriage operates to back off the shaft 685 half a step, as will hereafter be described, in order to reduce the selection value in the keyboard by "1" and also to reset the drive shaft 685 in its half-step position so that when it becomes engaged it will operate to feed a "1" into the selection mechanism of the next lower order. Late in the shifting phase, or cycle, the teeth 635 on the front carriage rail rock the mutilated gear 636 one step, or 60°, which rotates the cam shaft 615 a single step of 60°. This angular movement of the cam shaft rotates the star wheel 751 from one valley to the next, thereby rocking the arm 736 downwardly to release the clutch bail 705 from the blocking engagement of stud 752. The force of clutch spring 699 will move the ratchet hub 694 and bail 705 to the right before the arm 736 can be restored to its raised position, so that stud 752 will again engage the lower edge of the right-hand arm of the clutch bail. It can be noted that rocking of arm 736 is not sufficient to release latch arm 725, such rocking being considerably less than that caused by rocking of arm 730.

11. *Square root programming mechanism*

The programming mechanism for controlling the extraction of square root is mounted in a gear box which, as shown in Figs. 15 and 16, lies behind the keyboard and in front of the carriage 26. In my preferred form of invention the gear box will provide mechanism for automatically and positively controlling the selection of values in the six orders on the left side of the keyboard. In the extraction of square root, after the process has been carried through the leftmost six orders, the machine may automatically go into a conventional division operation to complete the extraction. As indicated above, this gives results that are accurate to nine significant figures and in most cases accurate to ten significant figures.

The programming mechanism, as shown in Figs. 15 and 16 and also in Figs. 22 to 25, inclusive, is rather complex. It is operated to selectively set the values in the selection mechanism, order by order, corresponding to a division by a progressively changing divisor of consecutive odd numbers and, upon an overdraft, initiating a series of steps including adding the last selected value to correct the overdraft, backing-off of the last value set in the selection mechanism to the next lower even number, and initiating the divisional operation in the next lower order. This mechanism is, as shown, mounted in a gear box, or frame, which comprises a left-hand frame plate 770 and a right-hand frame plate 771. The two end plates 770 and 771 are rigidly mounted on a relatively thick base plate 772. The mechanism is preferably divided into ordinal groupings by a plurality of separator plates 773 and half plates 774. The separator plates 773 and 774 are provided with front and rear legs 775 (see Fig. 24) which fit into milled grooves 776 in the base plate 772. In order to lock the plates into their proper position the legs 775 are extended to form ears 777 which are bent slightly after assembly to lock the plates into engagement with the base plate 772. The upper part of the gear box is securely tied together by a suitable tie rod 778 and held in proper spaced relationship by spacers 779. The gear box is mounted upon the carriage frame by suitable brackets such as 780 on the left-hand frame plate 770 and bracket 781 on the right-hand frame plate 771.

The various frame plates are slotted on the forward edge as at 785 (see Fig. 24) to provide apertures for the cam shaft 615. They are also slotted in the upper rearward edge as at 786 to provide apertures for the drive shaft 685. The forward edge is also slotted at 787 at an intermediate elevation to provide an aperture for the clearing shaft 962 and on the rearward edge at 788 to provide apertures for an intermediate drive, or idler, shaft 803.

A. *Cam shaft operation.*—As shown in Figs. 15 and 24, the cam shaft 615 lies in the upper forward corner of the gear box. This shaft, it will be recalled, is rotated through an angle of 30° at the initiation of square root operation and is thereafter given successive rotations of 60° in the same direction in order to select the order in which the selection mechanism will be operative. That is, the angular position of the cam shaft 615 controls the order in which the progressive change of the selection mechanism is operative to subtract consecutive odd numbers. For this purpose the cam shaft 615 is provided with a single tooth cam 795 in each order of the program mechanism (see Figs. 15, 16 and 22). As shown in these drawings, the cam teeth are provided with a sloping edge on the forward side and drop off sharply at the rear. These cams are pinned, or keyed, or otherwise rigidly secured, to the cam shaft 615, and are angularly spaced around the shaft so that the teeth are progressively 60° spirally around the shaft. As shown in Fig. 15 the 10th order cam 795 (the one on the extreme left), is 30° to the rear (clockwise when viewed from the right) of its associated cam follower 796, when the mechanism is in its full-cycle position (as occurs after the termination of the square root extraction). It can be noted that the various cam followers 796 are aligned one with another, but that the cams 795 are progressively staggered around the shaft relatively to the cam followers 796. The cam followers, as shown in the drawings, comprise a single tooth plate, the cam nose of which is formed as a complement of the nose of the cam 795. The cam followers are loosely mounted on the shaft 715 and are urged to the left, or into engagement with the cam 795, by a suitable compression spring 797 placed between the cam follower and the separator plate 773 to its immediate right. It will be seen that as the cam shaft 615 is given its first half step, or 30°, of rotation forwardly (counter-clockwise when viewed from the right), the 10th order cam follower 796 will be forced to the right against the compression of its spring 797. When the shaft 615 is given its next angular movement, which comprises a full step, or 60°, the nose of the 10th order cam will have passed by the nose of its cam follower, so that the 10th order cam follower can return to its left, or disengaged, position and the cam follower in the 9th order will have been pressed to the right. This operation takes place throughout the length of the gear box during the square root extraction, and controls the selection of the order in which the selection mechanism will be operated by the drive shaft.

A yoke arm 798 is rigidly secured to the cam follower 796 and extends downwardly and rearwardly as shown in Fig. 24. The rearward end of the yoke is bifurcated, as shown at 802 to engage an annular groove 799 in a long hub 800 (see Fig. 23). The long hub 800 is rotatably mounted on a shaft 803, and extends from one of the half separator plates 774 through the full separator plates 773 of the next lower order. An idler gear 801 is rigidly mounted on the hub 800, or is formed integrally therewith. The idler gear is chamfered as shown in Fig. 25 in order to facilitate sliding engagement with the driving mechanism next to be described. Thus, the idler 801 is pushed to the right as its cam follower 796 is engaged by the associated cam 795—whereby the idlers 801 are successively urged into operative position, order by order, as the carriage shifts from one order to another.

B. *Drive shaft mechanism.*—The drive shaft 685 extends transversely across the gear box, as shown in Figs. 15 and 16. A plurality of gears 805, one in each order, are pinned to the drive shaft 685. In the drawings the drive gear 805 is shown formed with a long integral hub which is pinned to the shaft, but the hub serves no particular purpose and can be omitted if desired. The drive shaft is held against longitudinal displacement by suitable collars 807 (Fig. 15). It will be recalled that this drive shaft is given a single step of movement during the fourth cycle of operation and thereafter is given two steps of movement, until the overdraft mechanism is operated to disengage the clutch members 694 and 695. Thus, all of the drive gears 805 are driven synchronously with each cycle of machine operation in square root. However, the selection mechanism in one order only will be affected by the rotation of the drive shaft 685.

It will be recalled that the idler gears 801 are successively urged to the right, beginning with the highest order and descending order by order, by means of the cams and yokes above mentioned. If the operation begins with the selection mechanism operating in the 10th order (which occurs when there is a single number in the leftmost group of the radicand), the first cycle of operation will cause the leftmost cam 795 to push its associated cam follower 796 to the right, conditioning the highest order selection mechanism for operation. This operation of the cam members 795, 796 pushes the idler 801 in the highest order to the right, whereby it will be enmeshed with the drive gear 805 of that order and will rotate when the drive shaft is rotated. The second cycle of operation would then be an idle one and in the third cycle of operation the drive shaft is conditioned for operation. In the fourth cycle the drive shaft would start to rotate (a single step in this cycle) and will drive the selection mechanism a single step. On the other hand, if the leftmost group of the radicand consists of two digits, then operation begins in the 9th order. In that case the first cycle of operation causes rotation of the cam shaft 615 a half step, or 30°, to cause the 10th order (leftmost) cam 795 to push its associated follower to the right. In the second cycle of operation, as two pins have been set on the pin wheel, the cam shaft 615 is given a full step of rotation which rotates the 10th order cam to disengage its follower and to rock the 9th order cam (second from the left) into engagement with its cam folower. This results in the meshing of the idler 801 in the 9th order with its drive gear 805. Thereafter the drive gear feeds the 9th order idler 801 a single step in the fourth cycle and thereafter in successive increments of "2" as long as the machine is operating in that order.

The idler gear 801 is constantly enmeshed with a gear 812 (see Fig. 23) rotatably mounted on a transverse shaft 810. The gear 812 is formed with an integral long collar 813 and a second gear 811 as shown in Fig. 23. The two gears 812 and 811 preferably have their teeth aligned so that both the gears with which both mesh are operated in synchronism as if idler 801 were directly driving the gear driven by gear 811. It can be mentioned at this point that the second gear 811 is primarily for purposes of a carry from one order to the other, as occurred in steps 9 or 20 of the problem in manual operation given earlier. The gear 811 is constantly in mesh with a gear 814 rotatably mounted on a transverse shaft 815 (see Fig. 24). The gear 814 has an integral collar 816, which collar has secured thereto a second gear 817 (see Figs. 23 and 25). Intermediate the two gears 814 and 817 is a pair of mutilated gears 819 and 820. The mutilated gear 819 lies on the left end of the collar 816 and has four teeth, while the gear 820 lies on the right-hand end of the collar and provided with three teeth.

It will be recalled that there are two selection slides 58 for each order, one serving the "1" to "5" keys and the other the "6" to "9" keys. The mutilated gear 819 is is adapted to cause the feeding of the selection slide 58 for the "1" to "5" keys while the gear 820 serves the "6" to "9" selection slide in that order. A bifurcated rack 825 is associated with the mutilated gear 819 and a similar rack 826 is associated with mutilated gear 820. The two racks have upper and lower legs 827 and 828 which slide in parallel grooves 829 and 830 cut in the base bar 772. Each slide is urged rearwardly by a spring 831 tensioned between a stud 832 on the forward end of the slide and a bar 833 which is held in a groove 834 on the rear of the base plate, as is shown in Fig. 24. The slides are therefore constantly urged rearward by the force of their respective springs, but are fed forwardly by their respective mutilated gears 819 and 820 as the gears 814 and 817 and integral connecting collar 816 are rotated by the gear 811. It can be mentioned that the gears of the gear train just described are 10-tooth gears so that for the first step of rotation of the drive shaft 685, the gear 814 is given a single step, or one-tenth of a revolution. This causes the first tooth on the mutilated gear 819 to engage the teeth 835 on the upper edge of the rack 825 and push it forward a distance equivalent to the movement of the selection slide 58 when a value of "1" is entered into selection. In the next cycle of operation the gear train is given two steps of movement, thereby causing the mutilated gear to advance two teeth and move its associated rack 825 forwardly to a position equivalent to the setting of selection slide 58 when the "3" key is depressed. When the value goes beyond "4," the last tooth on the mutilated gear 819 lies behind the last tooth on the associated rack 825 and as the gear goes to its "5" position the last tooth pushes the last tooth on the rack to place the rack in the "5" position. On the next cycle, the movement beyond the "5" position causes an overthrow of the slide as the gear teeth go beyond engagement with the rack, thereby permitting the slide 825 to return under the force of its spring 831 to its rearward, or inoperative, position. In the fourth cycle of driving operation the mutilated gear 820 has rotated sufficiently that its teeth engage the teeth of rack, or slide, 826 whereby the latter is moved forward two spaces to the equivalent of the "7" position. In the next cycle of operation the gear would be driven to the "9" position. If a further cycle is required before an overdraft, the mutilated gear 819 will have rotated sufficiently to again pick up its rack 825 to force it forwardly to the "1" position. However, when this occurs it is also necessary to carry a "1" to the next higher order of the selection mechanism.

The collar 800 carries a single tens-carry tooth 840 so located thereon that when the idler gear 801 is pushed to the right (to the left in Fig. 23) to engage the drive gear 805 the tens-carry tooth will lie in the plane of the gear 811 of the next higher order. The tooth is so placed angularly on the collar 800 (see Fig. 24) that it operates to give its associated gear 811 a single step of movement as the mutilated gear 820 passes the "9" position and the mutilated gear 819 drives its rack 825 forwardly to the "1" position. By this means a tens-carry is effectively, accurately, and positively secured every time the selection goes from "9" to "11." It can be noted here that if a transfer causes an overdraft in that cycle of operation, the reduction of "1" is made in the lower order and the transfer is not disturbed. That is, the transfer occurs as the selection value progresses from "9" to "11." If that transfer causes an overdraft, the "11" is reduced to "10"—which does not disturb the transfer in the higher order as the reduction by "1" is accomplished in the lower order.

It can be mentioned at this point that a second tens-carry is never required as the most that can ever be subtracted in this process is the value of "19." The subtraction of "19" gives a value of "100" and therefore goes from a two digit figure into a third, which can never take place. Therefore, a single tooth on the hub is all that is required to give the necessary tens-transfers.

The mutilated gear assemblies which include gears 814 and 817 are held in their adjusted position by any suitable detent. For purposes of illustration I show a ball detent which comprises a ball 845 pressed by the force of compression spring 846 into engagement between adjacent teeth of the gear 817. The detent assembly is held in a casing 847 mounted on the separator plates.

The bifurcated slides, or racks 825 and 826 are rigidly secured to their corresponding selection slides 58. It will be noted in Fig. 24 that the lower forward edge of the selection racks 825 or 826 is provided with a small notch 850. This groove embraces an ear 851, which is clamped by a screw 854 to clamping blocks 852 and 853. The associated slide 58 is clamped between the two clamps 852 and 853 as shown in Fig. 28. Therefore, the slides, or racks, 825 and 826 are in effect integral with their corresponding selection slides and movement of the racks and the selection slides is thus secured and prevents any overthrow in fast automatic selections. It can be noted that in ordinary operations of the machine the selection slides will normally be moved manually. This, of course, simultaneously positions the racks 825 and 826. Such movement, however, does not effect the operation of the machine as the mutilated gears 819 and 820, in their normal, or full-cycle, position, are out of mesh with the teeth 835 on these two racks. Therefore, the movement of the racks will not rotate the gears, or jam the mechanism in any way.

The racks and selection mechanism will be fed to an adjusted position by the mechanism just described. In one of the cycles of operation the value selected will be greater than the amount standing in the corresponding order of the accumulator 22, thereby causing an overdraft to rock the overdraft bellcrank 716 (Fig. 15). As above explained, the rocking of this bellcrank causes disengagement of the clutch members 694 and 695, thereby disengaging the feed of values into the selection mechanism. It will be recalled that during the operation of the square root mechanism the machine has been operating under the control of the division mechanism also. Thus, the overdraft causes the displacement of the division control shaft 251 to the right, thereby initiating the three-stage program under the control of the mutilated gear 270. It will be recalled also, that this program gear causes: (1) an additive cycle to correct the overdraft; (2) a shift cycle to shift the carriage one step to the left; and (3) a return to the subtractive position to reinitiate a continuous subtraction operation. The shifting of the carriage to the left operates through the mutilated gear 636 and cam shaft 615 to cause the cam 795 in the next lower order to engage its cam follower 796, thereby disengaging the drive to the selection mechanism in the order previously operated and conditioning the drive mechanism for operation in the next lower order. Thereafter the process is repeated to an overdraft, when the carriage is stepped an additional movement to the left.

The movement of the carriage to the left also operates mechanism which reduces the value standing in the selection mechanism from the odd number which caused the overdraft to the next lower even number. This is secured by means of a cam plate 870 rigidly mounted on the front rail 99 of the carriage (see Fig. 15). This cam plate is provided with rounded teeth 871 lying between adjacent ordinal positions of the carriage. Associated with the cam plate is a cam follower 872 (Figs. 16 and 26) mounted on a rockable arm 873 pivotally mounted on the right frame plate 771. The arm 873 is provided with a slot 874 which embraces a pin 875 mounted on a ratchet clutch member 876. The ratchet clutch member 876 is rotatably mounted on the drive shaft 685 (Fig. 16) and is obviously rocked by the rocking of arm 873, which occurs whenever the carriage moves one order in those carriage positions controlled by the square root mechanism. Associated with the ratchet member 876 is a complementary ratchet member 877 pinned to the drive shaft 685. A compression spring 878 normally urges the two ratchet members apart. The arm 873 is normally pulled rearwardly (clockwise in Fig. 26) by a suitable spring 879. The ratchet members 876 and 877 could have ten teeth each so that the rocking of the arm 873 will cause the rotation of the shaft 685 a single unit in a reverse direction, or the ratchets can have five teeth each and the driving member 876 be stepped half a step forward of the driven ratchet member 877.

The rocker 873 is pivotally mounted on a long stud 880 extending to the right from the right-hand frame plate 771. The rocker 873 is free to slide along the stud 880 as well as rock on it as a pivot. Thus, the shifting of the carriage to the left causes a tooth 871 of the cam on the carriage to engage the follower 872 on the arm 873. In view of the fact that the spring 879 is relatively strong, the carriage will slide the arm 873 along the stud 880 before rocking it against the tension of the spring. The arm 873 will therefore push the driving ratchet 876 to the left, against the pressure of spring 878, until the ratchet 876 engages driven ratchet 877. When this point is reached, the movement of arm 873 along the stud 880 is blocked and the tooth 871 will rock the cam follower arm 873 to cause the ratchets to rock the shaft 685 in a reversed direction for a single step. This sets the driven ratchet 695 on the left end of the shaft 685 half a step out of alignment with its driving ratchet 694 so that the first cycle of operation in the next lower order will cause the insertion of a value of "1" therein. The reverse rocking of the shaft 685, by the ratchets 876 and 877 also causes a reduction of the value set in the selection slide from the odd number, which caused an overdraft, to the next lower even number as required by the rules for the extraction of square root, this operation taking place just prior to the rotation of gear 636. In either event the operation of the cam 870 and the cam follower 872 rotates the shaft 685 a single unit space in a reverse direction, thereby reducing the value set in the selection mechanism to the next lower even number and at the same time conditioning ratchet 695 to feed only one step, or 36°, in the next operation of the feed shaft.

It can be noted that as the positive selection of the values progresses across the selection mechanism from left to right, order by order, the machine will exhaust the capacity of the square root programming mechanism. In the preferred form of my invention I provide six orders of selection mechanism so that the four right-hand orders are not controlled by the square root mechanism. It has previously been mentioned that for all practical purposes it is satisfactory to go into a regular division operation after five or six orders have been positively selected as described. As the operation sometimes begins in the 9th order and sometimes in the 10th, I have provided a minimum of five orders for the latter contingency. As the machine operates, a value is set in each order and locked therein by the detent 845. As the carriage shifts one order to the right, the cam shaft is given a sixth of a full rotation, thereby enabling the selection mechanism in the next lower order. When the operation reaches the 5th order of the machine (which in my preferred embodiment is the lowest order of the square root control mechanism), the machine continues to operate in division but without further change in the divisor. There is no mechanism required to put the machine in division as the start of the square root operation results in the release of the division initiating trigger 234 and the initiating of a divisional operation. Thus, in effect, the machine overruns the capacity of the square root control mechanism and continues its operation in conventional division.

I recognize that the mechanism just described for controlling progressive selection for only the higher six orders will not operate satisfactorily for decimal radicands having nine ciphers ahead of the first significant figure. For such problems the square root control mechanism could be increased to provide positive and progressive selection through eight orders instead of six. However, such problems are so rare that from the practical point of view it is better to put the significant figure on the left side of the register and mentally insert the proper number of ciphers before the first significant figure of the root.

12. Clearing square root programming mechanism

It will be recalled that the initiation of the division operation, by releasing the spring-powered trigger 234, and consequent rocking of connecting lever 243, causes the rocking of shaft 282 (Figs. 4 and 12). It will also be recalled that the connecting lever 243 is latched in its operating position by the latch arm 261 (Fig. 3), which latch is disengaged when the carriage shifts to the extreme left-hand, or terminal, position. These two operations are utilized in controlling the clearing of the square root control, or programming, mechanism. It will also be recalled that the initiation of a square root operation causes the rocking of shaft 557 (clockwise in Fig. 12) to push the link 560 rearwardly. This link 560 rocks the bellcrank 561 to first cam the arm 567 forwardly or counter-clockwise, under the roller 233 on the trigger 234, and also pushes the latching arm 228 rearwardly to release the trigger 234. The rocking of arm 567 is used, in conjunction with the rocking of shaft 282, to condition the clearing mechanism for operation upon the termination of the division phase of the operation. At this point it may be recalled that the termination of division causes the reverse rocking of the shaft 282.

The mechanism for this operation is shown particularly in Fig. 12. A rearwardly extending link 890 is pinned to the arm 567 and is provided at its rear end with a slot 891. Slot 891 embraces a pin 892 on a bellcrank latch member 893. The bellcrank 893 is pivotally mounted on the frame plate by any suitable means, such as stud 894, and is urged in a counterclockwise direction by spring 895. The link 890 is normally urged to the rear to hold the arm 567 in an inoperative position by spring 896, as shown. It will be obvious that the first stage of rocking of the shaft 557, which, through the linkage shown, rocks the arm 567 forwardly to underlie the roller 233, simultaneously pulls the link 890 forwardly so that the pin 892 will engage the rear end of the slot 891. The subsequent action of the shaft 557 and the link 560 in urging the latch 228 rearwardly to release the trigger 234 follows immediately. When the trigger 234 is released, the roller 233 will engage the rear edge of the arm 567 and cam it forwardly at the same time that the division operation is initiated. This additional forward movement of the link 890 rocks the latching bellcrank 893 clockwise.

The latching arm 893 is provided with a suitable shoulder 897, as shown. The shoulder 897 is adapted to engage a pin 901 carried on the lower end of a power lever 900. The lever 900 is pivotally mounted on the frame plate 127 by any suitable means, such as stud 902. This power lever is provided with an upper nose 904 and is spring-urged in a counter-clockwise direction by a relatively strong spring 905. Associated with the lever 900 is an arm 907 rigidly mounted on the shaft 282 (which, it will be recalled, is rocked by the connecting lever 243 at the beginning of a division operation and is returned at the end thereof). The arm 907 thus will rock upwardly (clockwise in Fig. 12) at the beginning of a divisional operation, thereby raising a stud 906 carried in the forward end thereof into engagement with the face of nose 904 on the upper end of lever 900. This blocks the counter-clockwise rocking of the lever 900 in a partially-rocked position in which it cannot be re-engaged by the latch arm 893 until it is positively restored, in which condition it is able to move forwardly as soon as the arm 907 is rocked counter-clockwise. This rocking of the arm 907 occurs at the termination of the division operation, so that the power lever 900 is then able to complete its forward movement.

A forwardly extending link 910 is pivotally mounted on the power arm 900 by any suitable means, such as stud 909. The forward end of the link 910 is pivotally secured to a two-armed lever 912 by any suitable means, such as stud 911. The two-armed lever in turn is pivotally mounted on the auxiliary control plate 127 by any suitable means, such as stud 913. It is obvious that the two-armed lever 912 will be rocked (clockwise in this figure) upon the release of the power arm 900, and will be given a further clockwise movement at the termination of the division operation and the release of the power arm 900 for its second step of movement.

It can be noted here that the link 681, which controls the positioning of the finger 680 that holds the latching arm 675 in a raised position, is also pivotally mounted on the pin 911. Thus the link 681 is also pushed forwardly, permitting the finger 680 to rock downwardly (clockwise) and the arm 675 to drop into engagement with the right side frame—thereby locking the keyboard against the insertion of values therein as previously described.

At the termination of a division operation the arm 907 is raised to release the power arm 900 for its second step of movement, thereby giving the two-armed lever 912 an additional increment of movement. This additional increment is utilized to: first, close the clutch and keep the motor engaged; and second, to cause engagement of the clear clutch. In order to accomplish the first purpose an ear 920 is formed on the link 115 (Fig. 3). The rearward edge of the upper part of the arm 912 engages this ear 920, so that the second increment of movement of the arm 912 forces the link 115 to the rear to keep the main clutch 109 engaged.

The rocking of the two-armed lever 912 also is effective to cause engagement of the clear clutch and thereby clear the square root control mechanism and return it to its original inoperative, or home, position. This is accomplished by means of a link 922. The link is provided with a slot 923 which embraces a pin 921 carried on the upper end of the two-armed lever. The link and arm are connected by a tension spring 924 which acts to yieldingly urge the link in accordance with movement of the arm 912. The rear end of the link 922 is bifurcated, as shown at 925 to embrace a pin 926 carried on the upper arm of a clutch control bellcrank 930. The bellcrank 930 and the link 922 are yieldingly held together by a suitable spring 927.

The bellcrank 930 is pivotally mounted on the control plate 127 by any suitable means, such as screw 931. The lower arm of a bellcrank carries a pin 932 which engages an annular slot 933 in a shiftable collar 934. The collar 934 is slidably mounted on a square shaft 935. A mitre gear 936 is pinned or otherwise rigidly secured to the square shaft. This gear meshes with a corresponding mitre gear 937 which is rigidly secured to a large pinion 938, both being rotatably mounted on a shaft 956. The pinion 938 meshes with a second pinion 939 rigidly secured to the drive shaft 70. Thus, the mitre gear 936 rotates constantly with the operation of the machine, in all operations thereof.

The shiftable collar 934 carries a single tooth 940 which is adapted to engage a single complementary notch 945 formed in a collar 946. The collar 946 is rotatably and non-slidably mounted on the cylindrical upper end 949 of the square shaft 935. A mitre gear 947 is attached to, or integral with, the collar 946, and meshes with a second mitre gear 948 that is pinned or otherwise rigidly secured to a clear shaft 950 (see Figs. 16 and 26).

The full rocking of the two-armed lever 912 rocks the bellcrank 930, which raises shiftable collar 934 so that the single tooth 940 thereon will engage the complementary notch 945 in the collar 946 to drive it and shaft 950. The engagement of the clutch members which comprise the collar 934 and the collar 946 takes place during the second stage of the operation of the two-armed lever 912, i. e., after the division operation has been terminated. I might mention at this point that I prefer to use a single tooth clutch in order to positively secure initial engagement of the clutch members and their final disengagement at the full-cycle position of the square root control mechanism so that at the termination of every operation the gears of the square root mechanism will be completely disengaged and the mechanism at rest.

I prefer to provide means associated with the clutch to positively prevent its disengagement except in the full-cycle position. For this purpose I provide a bellcrank 955 pivotally mounted on shaft 956, which supports the assembly of the mitre gear 937 and pinion 938. The bellcrank is urged into engagement with the clutch mechanism (clockwise in Fig. 12) by a suitable spring 957. The bellcrank carries an ear 958 adapted to engage the groove 933 of the collar 934. The upper flange is provided with a camming notch 959 (see Fig. 14), which permits the collar 934 to drop when it is in the full-cycle position and thereby permit disengagement of the ear 958 and the groove 933 at the full-cycle position. It will be understood that when the collar is in its lower position, the bellcrank will rock in and out with the rotation of the collar 934. However, when the collar is raised to its upper, or engaged, position, the groove 933 can then engage the ear 958 to hold the collar in its upper position until the cycle is completed and the bellcrank 955 released.

The clearing shaft 950 extends leftwardly from the control plate to the adjacent right-hand plate 771 of the gear box containing the square root programming mechanism (see Figs. 16 and 26). On the left end of the shaft is a small pinion 960 which meshes with a larger gear 961 rigidly secured to clear shaft 962. It can be mentioned that in the preferred form of my invention I provide a gear ratio between the pinion 960 and gear 961 of "1" to "4," thereby requiring four cycles of operation to complete the clearing of the mechanism. This gear reduction is desirable as I have found that clearing at relative slow speeds permits elimination of stop mechanisms that are complicated and costly. Clearing involves not only returning the various gear trains to their zero position, but must also enable the selection slides to be returned to their zero, or normal positions.

The shaft 962 extends throughout the full length of the gear box, and carries a pinion 963 in each order of the gear box. These pinions are held in proper spaced relationship by suitable spacing hubs 964. The clear gears 963 are relatively narrow and are adapted to lie on one side of the gears 814 previously mentioned. The clear gears 963 are normally ten-tooth gears with one tooth removed, as at 965. The cooperating gear 814 has a single tooth mutilated as shown at 966 to provide a tooth only half the width of the gear, being of a width sufficient to enable the gear 963 to rotate therein. In the home, or full-cycle position of clear gear 963, its mutilation 965 lies opposite the gear 814 so that gear 814 is free to rotate during the operation of the square root control mechanism. Further, the gear 963 lies within the cutaway portion 966 of the one tooth on the gear 814, so the gear 963 can rotate freely during the clearing operation if the gear 814 stands in its home, or zero, position. If, on the other hand, the gear 814 has been rotated from its zero position by the insertion of a value therein, then the teeth of gear 963 will engage the full teeth of the gear 814 and rotate the latter gear until it reaches its zero position. As this gear is held by the ball detent 845 previously mentioned, it will stop when it comes to its zero position and is no longer positively driven by the clearing gear 963. The detent action of the ball 845 will be sufficient to stop the gear in its zero position because the rotation of the shaft 962 is relatively slow due to the gear reduction from shaft 950. Thus, the various gears of the gear train will be returned to their normal or completely disengaged position.

I prefer to provide a centralizing mechanism related to the clear shaft 962. This can be of any suitable form but for purposes of illustration I show a cam 970 mounted on the right-hand end of the shaft 962 (see Fig. 2). This cam is provided with a depression 971 which is adapted to be engaged by a stud 972 carried on an arm 973 which is urged upwardly by a suitable means such as spring 974 into engagement with the edge of the cam 970. This centralizer effectively centralizes the shaft 962 to its correct full-cycle position and holds it there during other operations of the machine.

The return of the shaft 962 to its home position is utilized to disengage the clutch and break the motor switch in order to stop the operation of the machine. This can be accomplished by means of a roller 980 mounted on the cam 970. An arm 981 rigidly secured to a sleeve 982 rotatably mounted on clear shaft 950 (see also Fig. 16) is associated with the roller 980 so as to be rocked by the roller just before the termination of the fourth cycle of operation of the machine after the end of the divisional operation, or just before the cam 970 returns to its home position, as shown in Fig. 2. The right end of the sleeve is provided with an arm 983 rigidly secured thereto (see Figs. 13 and 16). A forwardly extending link 984 is pivotally connected to the arm 983 and extends forwardly to embrace the long stud 985 riveted to the two-armed lever 912. Thus, as the cam 970 reaches its full-cycle position, the roller 980 rocks the arm 981 which in turn pushes the link 984 forwardly (see Fig. 12) to forcibly rock the lever 912 counter-clockwise when viewed from the right. The rocking of the arm 912 counter-clockwise operates through link 631 to release the keyboard latch 675. It also operates through link 910 to re-cock the spring-powered lever 900 in its full-cycle position. Also the rocking of the lever 912 counter-clockwise releases the ear 920 on clutch operating link 115, so that the clutch may become disengaged and the motor switch opened to terminate operation of the machine.

The rocking of the arm 912 upon termination of square root operation also restores the counting mechanism to its positive, or like counting position. This is secured by means of a short link 990, also pivotally mounted on the stud 985. The link 990 is provided with a slot 992 that embraces a pin 991 mounted on the counter-control link 317. Thus, as the operation is completed and the arm 912 is restored to its inactive position, the counter is set to its original position.

III. OPERATION

It is believed that the operation of my invention will have been understood from the description above. It can be mentioned briefly that the radicand is set into the accumulator register 22 with the carriage in its extreme right-hand position. Preferably this will be done by placing the value in the keyboard, preferably on the left side thereof, and depressing the dividend entry key 51, with the tabulator buttons 50 set for the rightmost position of the carriage. Thereafter, the square root control key 500 aligned with the decimal point of the factor is depressed to initiate operation of the machine. The first result of the depression of a square root control key 500 is to push the pins 606 on the pin wheel 600 into their operative position. One or two such pins are set depending upon whether the placing of the decimal point results in the leftmost group having one or two digits.

With a single digit in the leftmost group of numbers a single pin is depressed, thereby rocking the bellcrank 616 a single time in the first cycle of machine operation. If there are two digits in the leftmost group of the radicand then two pins are depressed, and the bellcrank 616 is rocked twice in the first two cycles of operation. The setting of the pins 606 in the pin wheel 600 also causes the initiation of a divisional operation, such operation being modified to the extent that the clear clutch conditioning arm 567 is moved forwardly so as to be rocked sharply upon initiation of operation of the division mechanism by falling of the trigger 234. At the same time the counter is set for unlike registration with respect to the accumulator, and the keyboard is cleared. The first cycle of operation of the machine locks the keyboard in a cleared position so that values cannot be entered thereinto during the automatic extraction of a root, although termination of such an extraction automatically unlocks the keyboard.

The first cycle of operation, resulting in the first rocking of the bellcrank 616 rotates the cam shaft 615 a half a step, or 30°, to rotate the 10th order (leftmost) cam 795 to operative position. This cams the 10th order cam follower 796 to the right, thereby clutching the gears of the 10th order of the square root selection mechanism to the drive shaft 685. In the event two pins have been depressed, then the second cycle will disable the 10th order selection mechanism and enable the 9th order. Thereafter, the drive shaft clutch 694, 695 is enabled and first rocks the drive shaft 685 a single step on the 4th cycle of operation and thereafter two steps each time, to provide for the entry of the values "1," "3," "5," etc., into the selection mechanism.

When an overdraft occurs, the divisional control shaft 251 is shifted to the right, thereby initiating the program of the single additive corrective cycle to add back the value causing the overdraft, then shifting the carriage one step to the left, and finally initiating a subtractive, or divisional, operation in the next lower order of the machine. The carriage shifting operation is effective, first, to reverse the drive shaft a single step to reduce the value set in the selection mechanism to the next lower even number, and second, to rock the cam shaft 615 a single step to bring the cams of the next order into alignment. In this manner the selection of consecutive odd numbers progresses from left to right across the keyboard until the capacity of the square root control mechanism has been exhausted. Thereafter, the machine operates in a conventional divisional operation.

After the carriage has shifted to its extreme left-hand position, the division mechanism is conditioned for disablement upon the termination of the corrective cycle after an overdraft. At this time the shaft 282 rocks counter-clockwise to release the spring-powered arm 900, thereby enabling it to spring forward and rock the two-armed lever 912 clockwise. Such rocking of the lever holds the clutch in engaged position and consequently holds the power switch closed. Its operation also causes engagement of the clear clutch with the consequent rotation of the clear shaft and the clearing of the mechanism back to the zero position. At the end of the clearing mechanism the cam roller 980 rocks the link 984 forwardly to relatch the power arm 900 in its static position to disable the clutch and release the power switch, to reset the counter mechanism, and to release the keyboard latch. The machine is then in a condition to operate in any desired manner for any other problem.

It can be mentioned that the subtraction of consecutive odds numbers used in my machine is, in effect, the automatic subtraction of the squares of consecutive numbers from the original value standing in the register, or, what is saying the same thing, the subtraction of squares in their consecutive order. In effect one is subtracting the square of "1" and when that is successful then subtracting the square of "2" from the original value (which is secured by the subtraction of "1" and "3"). When the subtraction of the square of "2" is successful the square of "3" is then subtracted from the original value, which value ($3^2$) is secured by three cycles of operation, namely minus 1, minus 3 and minus 5.

Another variation of a method for extracting square root suitable for use in connection with an automatic mechanism similar to that outlined above, is as follows:

Insert the radicand into the accumulator register and then starting in the order to the right of that falling below the right-hand digit of the leftmost group of two, subtract "5" twice. Then subtract "15" twice (the "1" is in the same order as the right-hand figure of the leftmost group and the "5" remains in the next lower order). In the next cycle subtract "25" twice. Assuming the radicand is 625, in this method one would place a "5" in the order below the "2" rather than a "1" below the "6" and subtract twice—which in effect is subtracting the first odd number. In the second step, the "5" remains under the column of the "2" and the "1" is placed in the column of the "6" and the machine again operated twice subtractively—which in effect is subtracting "3." Similarly, the subtraction of "25" twice is the equivalent of the single subtraction of "5" in the preferred method. At any time an overdraft occurs the machine must be reversed once or twice in order to add back the values causing the overdraft and restore the machine to the condition in which it was prior to the cycles causing the overdraft. It is obvious that this method has certain difficulties in the double cycles feature, and the complications that arise from endeavoring to restore the machine to its prior condition before a change in the keyboard value. This method also has the disadvantage that while the root appears on the keyboard the value appearing in the counter dials is twice the true root. If a visible root is desired it is necessary to divide the counter value by "2." However, if the value in the keyboard is to be used in the next cycle of operation it represents the true root and can be so used. It should be noted that this method operates essentially on the method of subtracting consecutive odd numbers and is believed to be essentially the same as the method outlined above. Mechanism to carry out this method is similar in arrangement to that shown above and is intended to be included within the scope of the claims which follow.

The automatic extraction of square root in my preferred form, as above outlined, provides the correct root, or answer, in the counter dials 23. However, twice the root will stand in the selection mechanism. It would be possible to automatically extract the square root, even though the counters 23 were not operated, by transferring the value standing on the selection mechanism into the register and dividing by "2." Normally, it would be desired to have a visual representation of the root, such as appears in the counter dials 23, but the variation could be used if operation were terminated without clearing. In such a case, double the root stands in the selection mechanism, and can be used if necessary. This variation, also, is intended to be included within the scope of the claims which follow.

It will be understood also by those skilled in the art that the square root could be extracted by my method by the use of complements. In such a method the radicand would be entered into the accumulator by subtraction in order to insert in the accumulator the complement of the radicand. Thereafter consecutive odd numbers would be added thereto in the same manner that odd numbers are subtracted from the radicand in the method described in detail. It will be obvious to those skilled in the art that a machine for extracting the square root by such a complemental method would be essentially the same as the machine herein described, that is, it would have equivalent mechanisms to those described for carrying out the equivalent steps. It is intended that any such method be included within the scope of this invention and in the claims which follow.

It can also be mentioned that it would be entirely feasible to construct the mechanism of my invention so that the square root control keys 500 would condition the machine for operation, but that actual operation would be initiated by depression of the division key 38. In such an instance, the square root keys 500 would operate in a manner similar to that disclosed above except that the connection required to initiate operation of the division mechanism would be omitted. Thus (see Fig. 12) the mechanism could be the same as shown, except that the ear 568 on the two-armed lever 561 would be omitted. Thus the square root control key would set all the conditioning mechanism as required and the actual initiation of operation would be secured by the depression of division key 38.

These and other obvious modifications of my invention are intended to be included within the scope of the claims which follow.

I claim:

1. In a calculating machine having a plurality of ordinally arranged selection members positionable to represent various digital values, an accumulator, an automatic division mechanism for dividing a dividend factor set in said accumulator by a divisor factor set in the selection members, and a motor, means driven by said motor concurrently with operation of said division mechanism and operative to position the selection member of a preselected order to positions corresponding to a predetermined numerical progression.

2. In a calculating machine having an ordinally arranged accumulator register, an ordinally arranged keyboard, a plurality of ordinally arranged accumulator drive members positionable by the keyboard and operative to control entry of corresponding numerical values into the respective orders of the register, feed means operative to change the value position of a preselected ordinal drive member in accordance with a predetermined numerical progression during a continuous series of operations of the drive members, and means for terminating operation of said feed means in one order of said drive members and initiating its operation in an adjacent order.

3. In a calculating machine having a register, a plurality of ordinally arranged selection members positionable to control entry of digital values into the register, actuating means for entering values set in the selection members into said register additively or subtractively, and a motor means: means operated from said motor means for positioning a selected selection member in accordance with a predetermined numerical progression during a series of continuous subtraction operations, and means for sequentially selecting the selection member to be so progressively positioned.

4. In a calculating machine having a register, a plurality of differentially settable selection members associated with said register, a drive motor and means operated by said motor for cyclically inserting the value set in said members into said register: means operated from said drive motor concurrently with operation of said inserting means for differentially setting the selection members to values corresponding to the differences of the squares of consecutive numbers in sequential cycles of operation.

5. In a calculating machine having an automatic division mechanism including a plurality of differentially settable value selecting members in which the divisor is set, and a motor driving means, means operated by said motor to progressively change the setting of the value selecting members to represent consecutive odd numbers in sequential cycles of operation of the division mechanism.

6. In a calculating machine having a register, a plurality of ordinally arranged settable selection members, cyclically operable value entering means controlling entry of values into said register from said selection members, and a drive means, means cyclically operated from said drive means for setting the selection members to successive values corresponding to a predetermined numerical progression concurrently with operation of the value entering means.

7. In a calculating machine having a selection mechanism, a shiftable accumulator, and an automatic division mechanism operable to continuously subtract a value set into the selection mechanism to an overdraft, then correctively add back the overdrafting value into the accumulator and shift the accumulator in a direction to bring the next lower order thereof into alignment with the selection mechanism, means supplemental to the division mechanism for progressively adjusting the selection mechanism in sequential cycles of subtractive operation to consecutive odd numbers.

8. In a calculating machine having a shiftable register, a plurality of settable value entering members, and an automatic division mechanism operable to continuously subtract a value set into the value entering members from a value set in the register to an overdraft, then correctively add back the overdrafting value into the register and then shift the register to the next ordinal position, value changing means for changing the setting of the value entering members, and means for automatically operating said value changing means in a predetermined numerical progression concurrently with operation of the division mechanism.

9. In a calculating machine having a register, a selection mechanism, a reversible value entering machanism operable to enter a value set in the selection mechanism into the register additively or subtractively, drive means for such value entering mechanism, means for shifting the relative decimal position of the register and the value entering mechanism, an overdraft sensing means, and means operated by the sensing means to reverse the direction of operation of the value entering mechanism and to operate the shifting means for a single step of movement, the improvement which comprises means driven from said drive means for changing the value set in the selection mechanism in a predetermined progression during the successive cycles of a continuous multicyclic operation of the drive means.

10. In a calculating machine having an ordinally arranged register, an ordinally arranged value entering mechanism operable to enter a value set therein into the register additively or subtractively, means for shifting the relative decimal position of the register and the value entering mechanism, an ovedraft sensing means, and means operated by the sensing means to reverse the direction of operation of the value entering mechanism and to operate the shifting means, the improvement which comprises a plurality of ordinally arranged adjustable value changing means for selected orders of the value entering mechanism, drive means for said value changing means, and means for selectively connecting preselected ordinal value changing means to said drive means.

11. The apparatus of claim 10 comprising also means for counting the cycles of operation of said value entering mechanism.

12. The apparatus of claim 10 comprising also ordinally arranged means for retaining the value changing means of the associated order in each adjusted position.

13. The apparatus of claim 10 comprising also means operated from said sensing means to disengage the connecting means in one order and engage it in another.

14. The apparatus of claim 10 comprising also means operated by said sensing means to disengage said connecting means and means associated with said shifting means and operated therewith for engaging the connecting means in another order.

15. The apparatus of claim 10 comprising also means associated with said shifting means and operated therewith for changing the value last selected by the value changing means by a predetermined amount.

16. In a calculating machine having an ordinally arranged register, a plurality of differentially positionable selection means settable to positions representing digital values ordinally arranged with respect to said register, value transmitting means operable to enter values into said register as determined by the differential position of said selection means, means for shifting the relative decimal position of the register and the value transmitting means, an overdraft sensing means, and means operated by the sensing means to reverse the direction of operation of the value transmitting means and to operate the shifting means, the improvement which comprises a selection positioning means for selected orders of the selection means, drive means for said selection positioning means, means for actuating said drive means for a predetermined increment of motion in a first cycle of operation and a different increment of motion in each succeeding cycle, and means for selectively connecting preselected selection positioning means to said drive means.

17. The apparatus of claim 16 wherein the means for actuating said drive means is operative to transmit a single increment of motion in the first cycle of operation and a double increment of motion in each succeeding cycle.

18. In a calculating machine having an ordinally arranged accumulator, a tens-transfer mechanism associated with said accumulator, a sensing means operated by a tens-transfer in a predetermined order of the accumulator, and a reversible value entry means for entering values into the accumulator, the combination which comprises value changing means operative to adjust the value entry means in a selected order to consecutive odd numbers beginning with "1" during a continuous operation of the machine, means for selecting the decimal order in which the value changing means is operative, and means controlled from said sensing means and operable to reverse the direction of operation of the value entry means for a single cycle, to shift the relative decimal position of the accumulator and the value entry means, to reduce the value standing in the value entry means by "1," and to operate the means for selecting the decimal order.

19. In a calculating machine having an ordinally arranged accumulator, a tens-transfer mechanism associated with said accumulator, means for sensing a tens-transfer in a predetermined order of the accumulator, an ordinally arranged selection mechanism, an actuating mechanism, and a cyclically operable drive means for said actuating mechanism, means driven by said drive means for adjusting the selection mechanism in a selected order in a predetermined progression during continuous multicycle operation, means for selecting the order in which the means for adjusting the selection mechanism is operative, and means controlled from said sensing means for progressively operating said selecting means.

20. In a calculating machine having a shiftable carriage; an ordinally arranged accumulator mounted in said carriage; a carriage shifting means; an ordinally arranged selection mechanism operative to control entry of digital values into the accumulator; and an automatic division mechanism including means for cyclically entering subtractively a value set into the selection mechanism, an overdraft sensing means, and means operated by said overdraft sensing means to correctively add back the overdrafting value into the accumulator and operate the carriage shifting means to shift the carriage to the next lower ordinal position: the improvement which comprises means operated concurrently with the division mechanism for progressively adjusting the selection mechanism in a selected order to a value of "1" on the first cycle of a division operation in an order and to increase the previously adjusted value by "2" in each cycle thereafter, means controlled from the operation of the overdraft sensing means for reducing the value standing in the selection mechanism by "1"; means for effecting an increase of "1" in the next higher order selection mechanism upon an increase in value in the selected order from "9" to "1," and means for terminating operation of the means for progressively adjusting the selection mechanism in one order and initiating its operation in another order.

21. In a calculating machine having a shiftable carriage; an ordinally arranged accumulator mounted in said carriage; a carriage shifting means; an ordinally arranged selection mechanism operative to control entry of digital values into the accumulator; and an automatic division mechanism operable to continuously subtract a value set into the selection mechanism, and including an overdraft sensing means, means operated by said overdraft sensing means to correctively add back the overdrafting value into the accumulator and to operate the carriage shifting means to shift the carriage to the next lower ordinal position; the improvement which comprises value changing means for progressively adjusting the selection mechanism in a selected order to a value of "1" on the first cycle of operation in such order and to increase the previously set value by "2" in each cycle thereafter, initiating means operative to initiate operation of the value changing means in a first or in a second decimal order of the selection mechanism, means controlled by the overdraft sensing means for reducing the previously set value by "1"; means for effecting an increase of "1" in the next higher order selection mechanism upon an increase in value in the selected order from "9" to "1," and means controlled by the division mechanism for selecting the order in which the value changing means is operative.

22. In a calculating machine having a shiftable carriage, an ordinally arranged accumulator mounted in said carriage, a carriage shifting means, an ordinally arranged selection mechanism operative to control entry of digital values into the accumulator, and a cyclically operable value transmitting means operative to enter values determined by the selection mechanism into the accumulator, the improvement which comprises means for cyclically adjusting the selection mechanism in selected orders in accordance with a predetermined numerical progression during a multicyclic operation of the transmitting means, means for effecting a tens-carry between adjacent orders of the selection mechanism, and means operated in synchronism with shifting means for selecting the order in which the means for adjusting the selection mechanism is operated.

23. In a calculating machine having a shiftable carriage, an ordinally arranged accumulator mounted in said carriage, an overdraft sensing mechanism associated with said accumulator, a carriage shifting means, an ordinally arranged selection mechanism operative to enter digital values into the accumulator positively or negatively, means operated by the overdraft sensing mechanism to reverse the direction of operation of the selection mechanism for a single corrective cycle and operate the shifting means to shift the carriage to the next lower ordinal position, the combination which comprises means for adjusting the selection mechanism in a selected order to a value of "1" on the first cycle of operation in such order and to increase the previously adjusted value by "2" in each succeeding cycle thereafter, means for reducing the adjusted value by "1" upon operation of the overdraft sensing mechanism; means for effecting an increase of "1" in the next higher order selection mechanism upon an increase in value in the selected order from "9" to "1," and means operated in synchronism with the shifting means for terminating operation of the means for adjusting the selection mechanism in one order and initiating its operation in another order.

24. In a calculating machine for the extraction of square root having an accumulator and an ordinally arranged positionable value entering mechanism for entering values into said accumulator, a value changing means for progressively adjusting the position of said value entering mechanism comprising a drive means, ordinal interponents positionable to connect said drive means to the respective orders of the value entering mechanism, and means for progressively positioning said interponents in connecting position.

25. A calculating machine for the extraction of square root comprising an accumulator, a differentially positionable and ordinally arranged selection means for determining the value to be entered into the accumulator, an ordinally arranged means for adjusting the position of the ordinally associated selection means, a cyclically operable drive means for said adjusting means, ordinal interponents positionable to connect said drive means to the respective adjusting means, means for sequentially positioning said interponents in connecting position, and means for driving the drive means a single increment of motion on the first cycle of operation after an interponent has been connected to the driving means and thereafter driving said drive means two increments of motion in each succeeding cycle during the period such interponent is connected thereto.

26. A calculating machine for the extraction of square root comprising a carriage, a carriage shifting means, an accumulator in said carriage, an ordinally arranged and digitally positionable selection means for entering values into said accumulator, an ordinally arranged value adjusting means operative to adjust the digital position of said selection means progressively during continuous operation of the machine, a drive means for said value adjusting means, ordinally arranged interponents for connecting the ordinally related value adjusting means to said drive means, means for sequentially positioning said interponents in connecting position, said last mentioned means including a cam shaft, ordinally arranged cams mounted spirally on said shaft, ordinally arranged cam followers associated with said cams, means positioned by said cam followers for positioning the ordinally related interponents in connecting position, and means operated by the carriage shifting means for rotating said cam shaft.

27. A calculating machine for the extraction of square root comprising a carriage, a carriage shifting means, an accumulator mounted in said carriage, an ordinally arranged selection means for entering values into said accumulator, a drive shaft operable to normally rotate through a predetermined angular movement with each cycle of machine operation, ordinally arranged interponents positionable to operatively connect said drive shaft to an ordinally associated selection means, means for ordinally positioning said interponents in connecting position, said last mentioned means including a cam shaft, ordinally arranged cams mounted spirally on said shaft, cam followers associated with said cams, means positioned by each cam follower for positioning an interponent in connecting position with its ordinally associated selection means, means operated by the carriage shifting means for rotating said cam shaft, and means operated by the carriage shifting means for modifying the amount of angular movement of said drive shaft in the following cycle of operation.

28. In a calculating machine for the extraction of square root, said machine having a register, a register shifting means, an overdraft sensing means, and an ordinally arranged reversible value entering means, a cyclically operable ordinally arranged value adjusting means for adjusting the value entering means to correspond to successive odd numbers, and connecting means for operatively connecting a predetermined order of said value entering means to said value adjusting means; means controlled by said overdraft sensing means for disabling the value adjusting means, for causing a reverse cycle of operation of said value entering means, for operating the register shifting means, for reversibly operating said adjusting means to reduce by "1" the value standing in the value entering means, and for positioning the connecting means to disconnect one order of said value entering means from said value adjusting means and to connect another order of said value entering means to said value adjusting means.

29. The apparatus of claim 28 comprising also a control means operable to initiate operation of the connecting means in a predetermined order of the value adjusting means, and a second control means operative to initiate operation of said connecting means in an order of the value adjusting means adjacent to said predetermined order.

30. In a calculating machine for the extraction of square root having a register, an ordinally arranged digitally adjustable selection mechanism, reversible value entry means for entering a value from said selection mechanism into said register, means for operating said value entry means additively or subtractively, means for shifting the relative decimal position of the register and the value entry means, and an overdraft sensing means associated with said register; the combination which comprises a cyclically operable value adjusting drive means for continuously adjusting the selection mechanism in accordance with a predetermined numerical progression, ordinal connecting means operable to connect said value adjusting drive means to a predetermined order of said selection mechanism and to succeeding orders in sequence, program means operated by said overdraft sensing means for operating said value entry means to add back the value which caused the overdraft, for operating the shifting means, and for disengaging one connecting means and engaging another; and a transfer means for effecting an increase of "1" in the next higher order selection mechanism upon increase of the value in the predetermined order from "9" to "0".

31. In a calculating machine for the automatic extraction of square root the combination which comprises an ordinally arranged register, ordinally arranged value entry means for controlling entry of values into the respective orders of the register, means for shifting the relative ordinal positions of said register and said value entry means, a programming mechanism operative to control operation of the value entry means to extract the square root of a value set in said register, a manually positionable member operative to initiate operation of the programming mechanism in a predetermined order of said value entry means, and a second manually positionable member operative to initiate operation of said programming mechanism in an adjacent order of said value entry means.

32. In a calculating machine having an accumulator, an ordinally arranged settable selection means for controlling the entry of values set therein into the accumulator, a reversible value entry means for entering a value set in said selection means into said accumulator, means for operating said value entry means additively or subtractively, means for shifting the relative decimal positions of the accumulator and the value entry means, an overdraft sensing means, and means operated by said overdraft sensing means for reversing the direction of operation of said value entry means, for operating said shifting means and for reinitiating operation of the value entry means, means for automatically changing the value set in the selection means comprising a drive shaft, means for operatively connecting said drive shaft to said ordinal selection means sequentially, drive means for rocking said drive shaft a predetermined angular increment, clutch means for connecting said drive shaft to said drive means, means controlled by said overdraft sensing means for opening said clutch, means for reversibly rotating said shaft during the shifting operation one-half of said predetermined increment, and means for re-engaging said clutch.

33. A calculating machine for the extraction of square root comprising an accumulator, an ordinally arranged selection means, reversible value entering means for entering values set in the selection means into the accumulator additively or subtractively, drive means for said value entering means, means for shifting the relative decimal positions of the accumulator and the value entering means, an overdraft sensing means, means operated by said overdraft sensing means for reversing the direction of operation of said value entering means and operating said shifting means, a drive shaft, means driven by said drive means for cyclically rocking said drive shaft a predetermined angular increment, clutch means for connecting said drive shaft to said rocking means, means operated by said overdraft sensing means for opening said clutch, means for reversibly rotating said shaft during the operation of the shifting means half of said predetermined increment, means operated by the shifting means for re-engaging said clutch, a cam shaft, ordinally arranged cams mounted spirally on said shaft, cam followers associated with said cams, and means positioned by said cam followers for operatively connecting said drive shaft to said selection means in a predetermined ordinal sequence.

34. The apparatus of claim 33 comprising also an ordinally arranged keyboard, a plurality of decimal point indicators between adjacent orders of the keys of said keyboard, and square root control keys aligned with said decimal point indicators, the keys lying to the right of the even numbered orders of keys being operative to position said cam shaft in a predetermined angular position and the keys lying to the right of the odd numbered orders of keys being operative to position said cam shaft in a predetermined second angular position.

35. The apparatus of claim 33 comprising also transfer means for effecting an increase of "1" in the value set in an order of the value selection means upon increase of the value in the adjacent lower order beyond "9".

36. The apparatus of claim 33 comprising also means for counting the number of cycles of operation in each decimal position of the accumulator with respect to said value entering means.

37. A square root computer comprising a mechanical digital calculator having starting means, a presettable register, number entry means, control means responsive to the starting means for causing the calculator to perform a first series of subtractions of a subtrahend in the number entry means from a minuend preset in the register ending when an overdraft occurs, to then perform an addition for correcting the overdraft, to then shift the relative decimal position of the register and the number entry means and thereafter to perform a second series of subtractions ending when a second overdraft occurs, and counting means for counting the number of subtractions in each series, in which said number entry means includes a stepped-tooth gear corresponding to each decimal order thereof and a pinion on a shaft parallel thereto and selectively meshable with different circumferences of said stepped-tooth gear, and comprising number changing means initially controlled by said starting means and afterward jointly controlled by said counting means and said control means and operatively connected to said number entry means for causing a pinion to mesh with the five odd-numbered circumferences of the stepped-tooth gear in turn in rotational sequence during the successive subtractions of a series of subtractions.

38. A square root calculator comprising a manually operated starting means, a presettable register, a selection mechanism, means for shifting the relative decimal position of the register and the selection mechanism, control means responsive to the starting means for causing the calculator to perform a first series of subtractions of a subtrahend in the selection mechanism from a minuend preset in the register ending when an overdraft occurs, to then perform an addition for correcting the overdraft, to then operate said shifting means, and thereafter to perform a second series of subtractions ending when a second overdraft occurs, counting means for counting the number of subtractions in each series, a number changing means operatively connected to said selection mechanism, drive means for cyclically operating said number changing means to cause a predetermined progressive change in the value standing in the selection mechanism, and means operated by said starting means for initiating operation of said drive means.

39. In a mechanical digital calculator, a square root computer comprising a manually operated starting means, a presettable register, number entry means, an overdraft sensing means, control means responsive to the starting means for causing the calculator to perform a first series of subtractions of a subtrahend in the number entry means from a minuend preset in the register, means operated by said overdraft sensing means to terminate such series of subtractions, to then perform an addition for correcting the overdraft, and to then shift the relative decimal position of the register and initiate another series of subtractions, counting means for counting the number of subtractions in each series, and a number changing means initially controlled by said starting means and afterward jointly controlled by said overdraft sensing means and said control means and operatively connected to said number entry means for progressively changing the value standing in said number entry means to consecutive odd numbers in each series of subtractions.

40. A square root computer comprising a presettable register, settable ordinal value selection means, means for entering the value set in the value selection means reversibly into the register, means for shifting the relative decimal position of the register and the value selection means, a control means operable to initiate a continuous series of subtraction operations in which a value set in the value selection means is subtracted from the value preset in the register, an overdraft sensing means, means operated by said sensing means for terminating such series of operations and initiating a single additive cycle of operation, for then operating the shifting means and thereafter initiating another series of operations, counting means for counting the number of operations in each ordinal series, a value changing means operable to adjust the value selection means to progressively change the value set in predetermined orders of said selection means, means controlled by the sensing means for terminating operation of the value changing means in one order and initiating such operation in another order, and means controlled by said sensing means for reducing the value then set in the selection means by "1."

41. In a calculating machine for the extraction of square root by the continuous subtraction of successive odd numbers, said machine having a register, ordinally arranged and differentially positionable selection members, means for shifting the relative decimal position of the register and selection members, a value changing means including longitudinally shiftable gears associated with selected orders of said ordinal selection members for cyclically changing the differential position of the selection members of such selected orders to successive odd numbers during a multicyclic subtraction operation, means for sequentially shifting one such gear at a time into operative position with respect to the ordinally related members, an overdraft sensing means, and means operated by said sensing means for adding back the value which caused the overdraft, and for operating said shifting means: means for effecting a carry of "1" from the order in which the value changing means is operative to the next higher order selection member upon increasing of the value in the order in which the value changing means is operative from "9" to "1" which comprises a collar nonrotatably mounted on each such gear and extending into a plane adjacent to the gear of the next higher order, a single tooth on such collar adjacent the plane of the gear of the next higher order and angularly positioned to engage the teeth of the higher order gear as the collar rotates through the "9" to "1" positions, said shifting means being operable to shift said tooth longitudinally into the plane of the gear of the next higher order.

42. A square root computer comprising a manually operated initiating member, a presettable accumulator register, a plurality of ordinally arranged value selection members, means for entering values set in said selection members into said accumulator register additively or subtractively, means for shifting said accumulator register with respect to said selection members, a division programming means initially operated by said initiating member, said programming means including means for detecting a ten-transfer in a predetermined order of said register, and means operated by said detecting means for operating said program means to effect a division operation including a shifting of the accumulator register with respect to said value selection members, counting means for counting the number of operations in each ordinal position of said accumulator register, a number changing means initially operated by said initiating member and operatively connected to said selection members, and means for cyclically operating said number changing means to cause a predetermined progressive change in the value set in the selection members.

43. In a calculating machine having an ordinally arranged register, a plurality of ordinally arranged settable value selection members, and means for shifting said register denominationally with respect to said selection members, means operated by the shifting means for reducing the value set in said value selection members by "1."

44. In a calculating machine having an accumulator and a plurality of ordinally arranged value selection members differentially positionable to control the entry of values into the accumulator, a motor drive means, means driven by said motor drive means for differentially positioning said selection members in a predetermined value progression; means for effecting an increase of "1" in the setting of the next higher order selection members upon a change in the setting of an order after a value of "9" has been reached.

45. A square root computer comprising a mechanical digital calculator having starting means, a presettable register, number entry means, means for shifting the relative decimal position of the register and the number entry means, control means responsive to the starting means for causing the calculator to perform a first series of subtractions of a subtrahend in the number entry means from a minuend preset in the register ending when an overdraft occurs, to then perform an addition for correcting the overdraft, to then operate the shifting means and thereafter to perform a second series of subtractions ending when a second overdraft occurs, and counting means for counting the number of subtractions in each series, in which said number entry means includes a stepped-tooth gear corresponding to each decimal order thereof and a pinion on a shaft parallel thereto and selectively meshable with different circumferences of said stepped-tooth gear, and comprising number changing means operatively connected to said number entry means for causing a pinion to mesh with the five odd-numbered circumferences of the stepped-tooth gear in turn in rotational sequence during the successive subtractions of a series of subtractions.

46. A square root computer comprising a mechanical digital calculator having starting means, a presettable register, differentially positionable number entry means, means for shifting the relative decimal position of the register and the number entry means, control means responsive to the starting means for causing the calculator to perform a first series of subtractions of a subtrahend in the number entry means from a minuend preset in the register ending when an overdraft occurs, to then perform an addition for correcting the overdraft, to then operate the shifting means and thereafter to perform a second series of subtractions ending when a second overdraft occurs, and counting means for counting the number of subtractions in each series, and number changing means initially controlled by said starting means and afterward controlled by said control means and operatively connected to said number entry means for positioning the latter in predetermined differential positions corresponding to a predetermined numerical progression during the successive subtractions of a series of subtractions.

References Cited in the file of this patent

UNITED STATES PATENTS

| | | |
|---|---|---|
| 809,075 | Rechnitzer | Jan. 2, 1906 |
| 2,063,962 | Turck | Dec. 15, 1936 |
| 2,255,622 | Landsiedel | Sept. 9, 1941 |
| 2,274,575 | Anderson | Feb. 24, 1942 |
| 2,318,591 | Couffignal | May 11, 1943 |
| 2,327,981 | Friden | Aug. 31, 1943 |
| 2,394,924 | Luhn | Feb. 12, 1946 |
| 2,493,862 | Durfee | Jan. 10, 1950 |
| 2,502,360 | Williams | Mar. 28, 1950 |
| 2,628,031 | Ellerbeck | Feb. 10, 1953 |